United States Patent [19]

Naruo et al.

[11] Patent Number: 5,627,741

[45] Date of Patent: May 6, 1997

[54] POWER SUPPLY APPARATUS

[75] Inventors: Masahiro Naruo; Takashi Kanda; Tomoyuki Nakano, all of Kadoma, Japan

[73] Assignee: Matsushita Electric Works, Ltd., Osaka, Japan

[21] Appl. No.: 597,404

[22] Filed: Feb. 8, 1996

[30]     Foreign Application Priority Data

Feb. 15, 1995 [JP] Japan .................. 7-027140

[51] Int. Cl.[6] ................................ H05B 37/00
[52] U.S. Cl. ............................................. 363/89
[58] Field of Search ................... 363/89, 46, 25–26, 363/34, 37, 133–134, 80–81, 79, 126; 323/222, 272, 282, 284, 286, 205, 207, 239, 351, 271; 307/125, 141

[56]         References Cited

U.S. PATENT DOCUMENTS

| | | | |
|---|---|---|---|
| 5,229,690 | 7/1993 | Ohnishi et al. | 315/226 |
| 5,517,399 | 5/1996 | Yamauchi et al. | 363/89 |
| 5,532,528 | 7/1996 | Lammers | 363/322 |
| 5,532,918 | 7/1996 | Mayrand et al. | 363/89 |
| 5,559,682 | 9/1996 | Kanouda et al. | 303/21 |
| 5,566,062 | 9/1996 | Quisenberry et al. | 363/78 |
| 5,568,041 | 9/1996 | Hesterman | 323/207 |
| 5,572,416 | 11/1996 | Jacobs et al. | 363/89 |
| 5,572,417 | 11/1996 | Vinciarelli et al. | 363/222 |

*Primary Examiner*—Aditya Krishnan
*Attorney, Agent, or Firm*—Burns, Doane, Swecker & Mathis, L.L.P.

[57]                 ABSTRACT

A power supply apparatus in which a full-wave rectifier is connected to an A.C. power source, a load circuit as a parallel circuit of a smoothing capacitor connected in parallel to a load is connected to outputs of the full-wave rectifier through a switching element and a capacitor, and a control means for adjusting a voltage across the capacitor is provided in parallel to the capacitor to cause a sum of voltages across the capacitor and smoothing capacitor to be proportional to an input voltage and to cause a voltage corresponding to a difference between the input and output voltages to appear across the capacitor to apply a desired constant voltage to the load, whereby an envelope line of an input current becomes proportional to the input voltage under control of switching elements. Thereby power conversion can be realized with use of a small number of switching elements, the arrangement of a control circuit can be simplified, and a peak current at the time of adjusting the voltage across the capacitor can be made small.

26 Claims, 29 Drawing Sheets

POWER SUPPLY APPARATUS

BACKGROUND OF THE INVENTION

The present invention relates to power supply apparatuses and more particularly, to a power supply apparatus in which high frequency switching operation causes energy to be supplied to a load to thereby suppress distortion in an input current.

DESCRIPTION OF RELATED ART

For better understanding of the present invention, explanation will first be made as to an arrangement of a prior art power supply apparatus as a boost type converter which includes an active filter circuit. In the power supply apparatus, and A.C. power is full-wave rectified by a rectification circuit, to which a series circuit of an inductor and a switching element is connected, a load circuit including a smoothing capacitor and a load is connected to a junction point of the inductor and switching element through a diode. The switching element is controlled by such a PWM control circuit as to detect an input current and to send a control signal to cause an input current to be proportional to an input voltage. When the switching element, is in its ON state, the inductor is excited to store input energy in the inductor. Thereafter, the turning OFF of the switching element causes the input to be connected to the inductor in series, so that energy is supplied to the load circuit. At this time, the input current increases when the switching element is in its ON state, while the input current decreases when the switching element is in the OFF state. When the input current is detected to control the switching element, harmonics distortion in the input current can be suppressed.

Such a prior art power supply apparatus as mentioned above, however, has a problem that the inductor must be big to limit the input current, thus resulting in that the resultant power supply apparatus becomes large in size.

Proposed in U.S. Pat. No. 5,229,690 is a discharge lamp lighting system which includes a power supply apparatus without any inductor. In the power supply apparatus, A.C. power is full-wave rectified by a rectification circuit, to which a series circuit of a discharge lamp and a switching element, a series circuit of a first diode and a smoothing capacitor is connected in parallel to the switching element, and a second diode is connected between a junction point of the first diode and smoothing capacitor and a positive terminal of the rectification circuit. With this power supply apparatus, when the switching element is turned OFF, the smoothing capacitor is charged through the discharge lamp so that, at the time of a low input voltage, the energy stored in the capacitor is used to suppress input harmonics.

However, the above power supply apparatus has a limit in suppressing the input harmonics, because substantially no input current flows in the vicinity of a zero-cross point of the input voltage.

Also disclosed in U.S. patent application No. 08/412,540 is a power supply apparatus using a switched capacitor circuit, wherein A.C. power is full-wave rectified by a rectification circuit which is connected at its output ends with a series circuit of a first switching element and a first capacitor, and a series circuit of a second capacitor and a load circuit is connected in parallel to the first capacitor through a second switching element. A first control means is provided to control the amount of charges to be sent and charged from a power source to the first capacitor or to control the amount of charges to be supplied and discharged from the first capacitor to the load according to an input voltage so that a voltage across the first capacitor after the charges are discharged to the load becomes similar in waveform to an full-wave rectified output, whereby the envelope line of the input current waveform can be made similar to the input voltage waveform to thereby suppress harmonics components in the input current. A second control means acts to adjust a voltage across the second capacitor to supply a constant voltage to the load circuit.

This power supply apparatus, however, is disadvantageous when it is desired to make the apparatus small in size, since the control means for suppressing the harmonics components in the input current and for supplying a stable voltage to the load circuit must be separately provided.

In this way, any of the above prior art power supply apparatuses disadvantageously has a limit in making the apparatuses small in size and in suppressing the input harmonics.

SUMMARY OF THE INVENTION

It is therefore an object of the present invention to provide a power supply apparatus which can eliminate the above problems in the prior art, and can realize its miniaturization and effective suppression of input harmonics.

In accordance with an aspect of the present invention, a full-wave rectifier is connected to an A.C. power source, a load circuit as a parallel circuit of a smoothing capacitor connected in parallel to a load is connected to outputs of the full-wave rectifier through a first switching element and a capacitor, and control means for adjusting a voltage across the capacitor is connected in parallel to the capacitor to cause a sum of voltages across the capacitor and across the smoothing capacitor to be proportional to an input voltage and to cause a voltage corresponding to a difference between the input and output voltages to appear across the capacitor to apply a desired constant voltage to the load, whereby an envelope line of an input current becomes proportional to the input voltage under control of the first switching element. In the present invention, it is preferable that the control means for adjusting the voltage across the capacitor include an inductor. For example, the capacitor is connected at its one end to one end of the inductor through a second switching element, and the inductor is connected at the other end to the other end of the capacitor through a first diode. Further, the capacitor is connected at the other end to one end of the smoothing capacitor, a second diode is connected between the other end of the smoothing capacitor and one end of the inductor, and a third switching element is connected between the other end of the smoothing capacitor and the other end of the inductor. The control means connects the inductor and first diode to the capacitor through the second switching element in series to adjust the voltage across the capacitor and to temporarily store the energy in the inductor when the input voltage is higher than a set output voltage, connects the smoothing capacitor through the second switching element, inductor and third switching element to the capacitor from the voltage stabilization means to charge the capacitor and adjust the voltage thereacross and to store the energy in the inductor when the input voltage is lower than the set output voltage, and supplies the energy stored in the inductor to the load circuit through the second and first diodes as soon as adjustment of the voltage across the capacitor is completed to turn OFF the second and third switching elements.

Preferably used as the above capacitor is a capacitor which is relatively less in the heat generation amount to voltage fluctuations and is low in loss. Also preferably used as the above smoothing capacitor is a capacitor which has a relatively large capacitance. However, the present invention is not restricted to these examples but any elements may be so long as they have practical electrostatic capacitances.

With the power supply apparatus of the present invention, as mentioned above, the power conversion circuit is made up of a combination of the capacitor, smoothing capacitor and first switching element, so that the sum of the voltages across the capacitor and smoothing capacitor becomes similar in waveform to the input voltage to thereby suppress the input harmonics distortion, and the capacitor for storing therein the voltage corresponding to the difference between the input and output voltages is connected in series with the input voltage to supply a constant voltage to the load. Since the control means for adjusting the voltage across the capacitor for storage of the difference voltage therein includes the second and third switching elements and inductor and first and second diodes, the peak current at the time of adjusting the voltage across the capacitor can be reduced. Further, since the energy held in the inductor is regenerated in the load circuit, the loss and heat generation of the power supply apparatus can be made both less. With use of a small number of switching elements and a small-sized capacitor and an inductor, in this way, power conversion can be realized to supply a constant output voltage. In addition, since the power supply apparatus of the present invention requires a small number of switching elements, the arrangement of the control circuit can be made simple and thus the entire power supply apparatus can be made small in size.

BRIEF DESCRIPTION OF THE DRAWINGS

The detailed arrangement and operation of the present invention will become apparent from the detailed explanation, with reference to the accompanying drawings in which.

Figure 1:
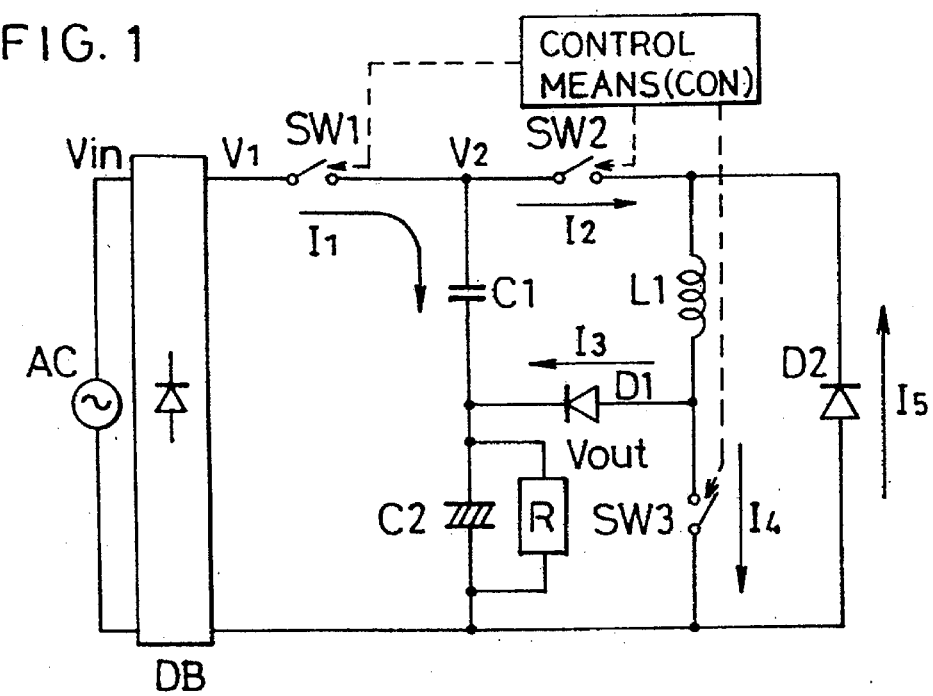
FIG. 1 is a circuit diagram of a first embodiment in accordance with the present invention.

While the invention is susceptible of various modifications and alternative constructions, certain illustrated embodiments thereof has been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DESCRIPTION OF THE PREFERRED EMBODIMENTS

The present invention will be detailed with reference to the drawings showing many embodiments thereof.

EMBODIMENT 1

Referring to FIG. 1, there is shown a circuit diagram of a first embodiment in accordance with the present invention. In the present embodiment, an A.C. power source AC is connected with a full-wave rectifier DB, which in turn is connected at its output terminals with a series circuit of a first switching element SW1, a capacitor C1 and a parallel circuit of a smoothing capacitor C2 and a load R. Connected across the capacitor C1 is a control means for adjusting a voltage across the capacitor C1. The control means comprises an inductor L1, second and third switching element SW2 and SW3, and first and second diodes D1 and D2. Connected to the capacitor C1 in parallel is a series circuit of the second switching element SW2, inductor L1 and diode D1. Connected between a junction point of the inductor L1 and diode D1 and ground is the third switching element SW3. For the purpose of supplying the remaining energy of the inductor L1 to a load circuit, the second diode D2 is provided between a junction point of the second switching element SW2 and inductor L1 and ground. The first, second and third switching elements SW1, SW2 and SW3 are arranged to suitably operate under a control circuit CON.

Figure 4:
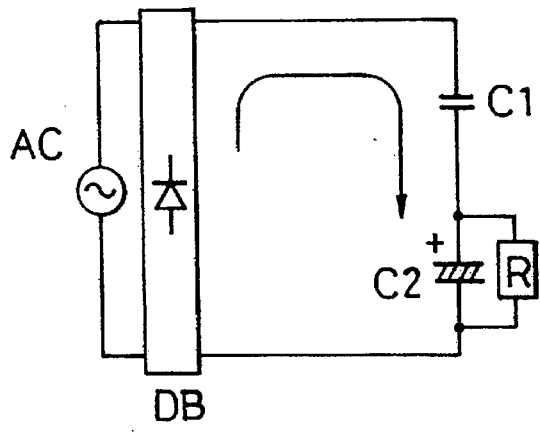
FIG. 4 is an equivalent circuit showing a first state of the first embodiment of the invention of FIG. 1.
Figure 2:
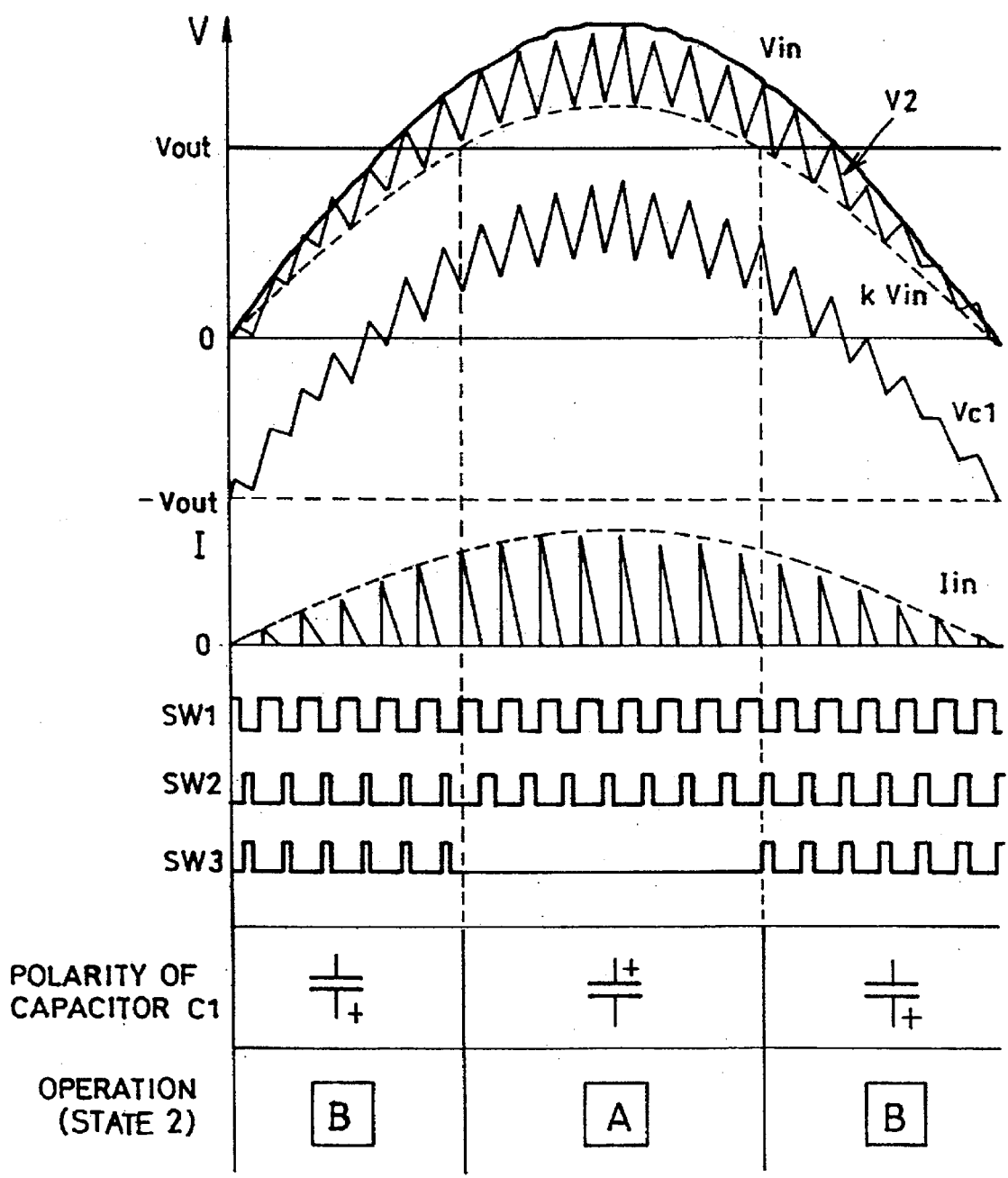
FIG. 2 shows waveforms of signals appearing at various points in the first embodiment of the present invention.
Figure 3:
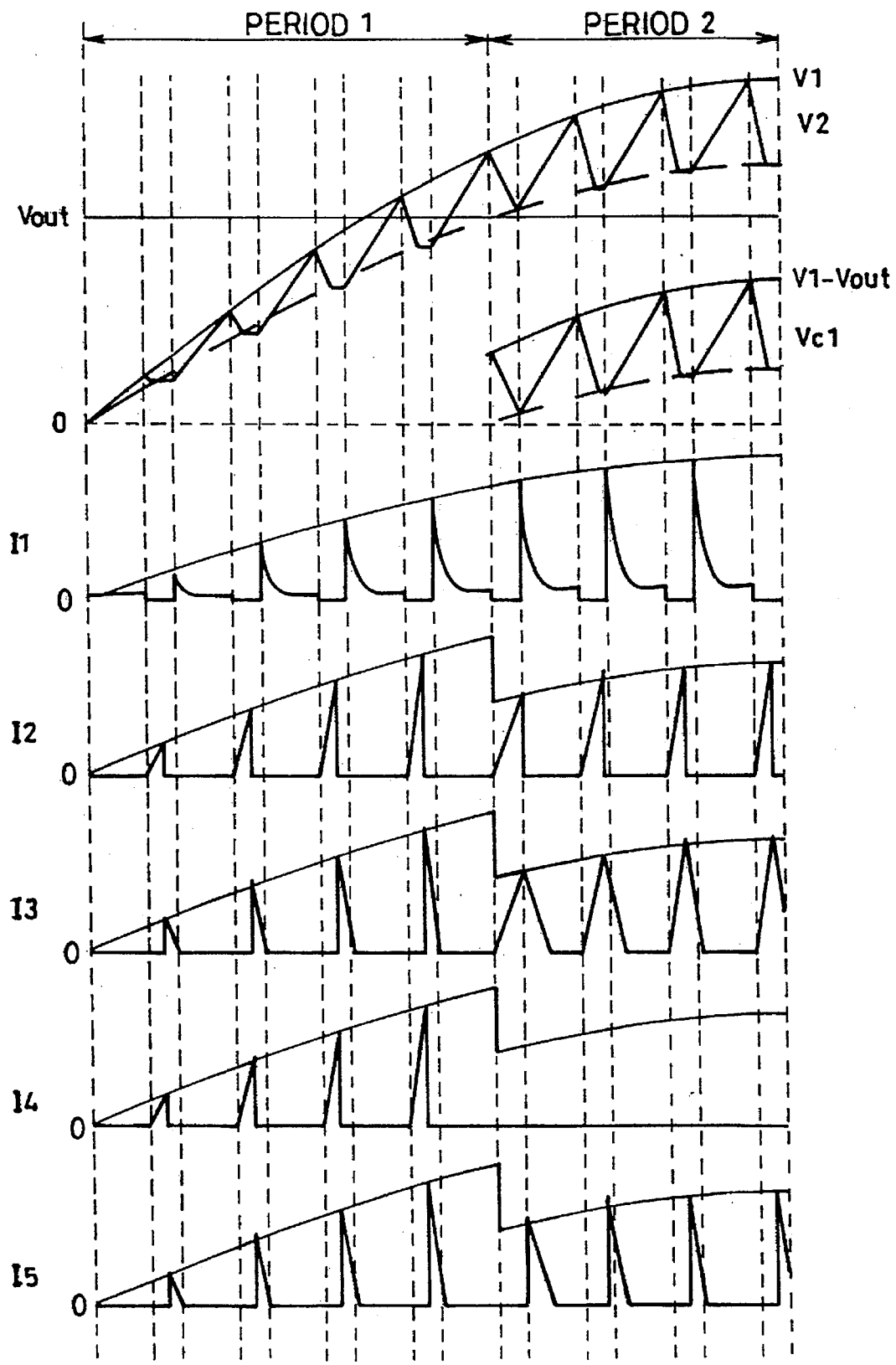
FIG. 3 shows waveforms of currents flowing through respective elements in the first embodiment of the present invention.

FIG. 2 shows waveforms of signals appearing at points in the present embodiment, and FIG. 3 shows waveforms of currents I1 to I5 flowing through associated elements. In the operation of the present embodiment, a voltage Vin applied from the A.C. power source AC is rectified at the full-wave rectifier DB and output as a pulsative voltage V1. The first switching element SW1 is turned ON by a control signal received from the control circuit CON so that a voltage V2 corresponding to a sum of the voltages across the capacitors C1 and C2 is charged up to the input pulsative voltage V1, which operation will be referred to as state 1 and which equivalent circuit is shown in FIG. 4.

Figure 5:
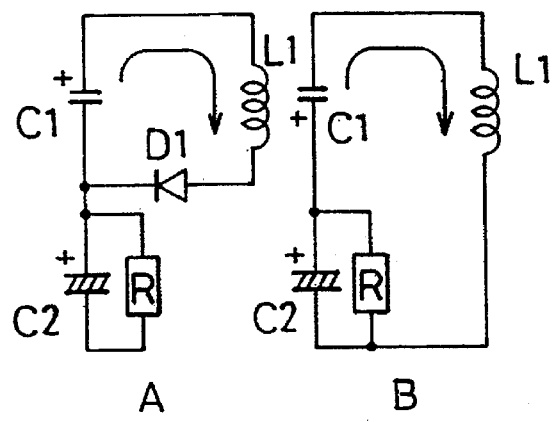
FIG. 5 is an equivalent circuit showing a second state of the first embodiment of the invention of FIG. 1.

Explanation will then be made as to the operation of the power supply apparatus after the first switching element SW1 is turned OFF. In a mountain part of the input pulsative voltage V1 in which the voltage V1 is higher than an output voltage Vout, only the second switching element SW2 is turned ON. This results in that the capacitor C1 is connected to the inductor L1 so that part of the energy of the capacitor C1 is moved to the inductor L1 and stored therein in the form of magnetic energy, which operation will be referred to as state 2A. In a valley part of the input pulsative voltage V1 in which the voltage V1 is lower than the output voltage Vout, the second and third switching elements SW2 and SW3 are turned ON. This causes the capacitor C1, smoothing capacitor C2 and inductor L1 to be connected each other so that energy stored in the smoothing capacitor C2 is partly moved to the inductor L1 and stored therein in the form of magnetic energy while the capacitor C1 is charged in its reverse direction. Which operation will be referred to as state 2B. And the states 2A and 2B are shown in FIG. 5 as equivalent circuits respectively.

Figure 6:
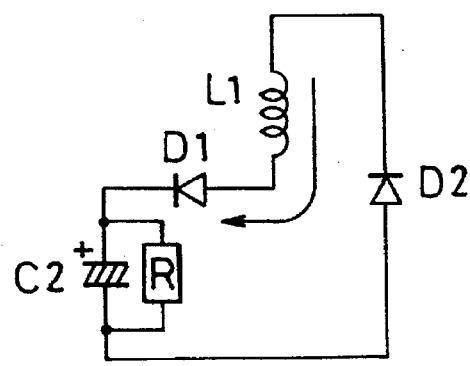
FIG. 6 is an equivalent circuit showing a third state of the first embodiment of the invention of FIG. 1.

A current flowing through the inductor L1 has a resonance waveform and in the illustrated example, oscillates very finely with a resonance period determined by the capacitor C1 (and C2) and the inductor L1 and thus the current variations are depicted substantially linearly. Through the above operations, the energy temporarily stored in the inductor L1 causes the second diode D2 to be turned ON as soon as the second switching element SW2 (and the third switching element SW3) is turned OFF, whereby the energy is all sent to the load circuit through the diode D1, which operation will be referred to as state 3 and which equivalent circuit is shown in FIG. 6. As the operations of the states 1, 2 and 3 are repeated, a voltage across the smoothing capacitor C2 gradually increases. The states 1 and 3 may be designed to be executed at the same time as necessary.

In the present embodiment, in this way, the excessive energy stored in the capacitor C1 is sent to the load circuit through the inductor L1 to effectively adjust the voltage across the capacitor C1. Further, the capacitor C1 functions to store therein a differential voltage between the input pulsative voltage V1 and output voltage Vout in such a manner that, when the first switching element SW1 is turned ON, the input pulsative voltage V1 is connected in series with the capacitor C1 to supply a constant voltage to the load circuit. The ON time of the second switching element SW2 (and the third switching element SW3) is controlled so that the voltage V2 corresponding to the sum of voltages across the capacitors C1 and C2 immediately prior to the turning ON of the first switching element SW1 becomes similar in waveform to the full-wave-rectified output V1, whereby the envelope line of the waveform of the input current can be made similar to that of the input voltage to suppress input harmonics distortion. Further, when this similitude ratio is changed by adjusting the ON time of the second switching element SW2 (and the third switching element SW3), this causes the peak value of the input current to vary, whereby the output voltage is increased or decreased. It will be appreciated from the fact that the output voltage of this circuit in the power supply apparatus can be adjusted.

As has been explained above, the A.C. power source AC is connected with the full-wave rectifier DB which in turn is connected at its output terminals with the first switching element SW1, capacitor C1 and smoothing capacitor C2 in series therewith, the load R is connected in parallel to the smoothing capacitor C2, the control means including the inductor L1, second and third switching elements SW2, SW3, and diodes D1, D2 is connected in parallel to the capacitor C1, so that the control means controls the voltage across the capacitor C1. As a result, there is provided a small-sized power supply apparatus which can suppress the input harmonics distortion and adjust the input current value and output voltage, which, when an operational frequency is set high, allows the respective capacitors, inductors and switching elements to be made small in size, and which can generate a desired constant voltage.

EMBODIMENT 2

Figure 7:
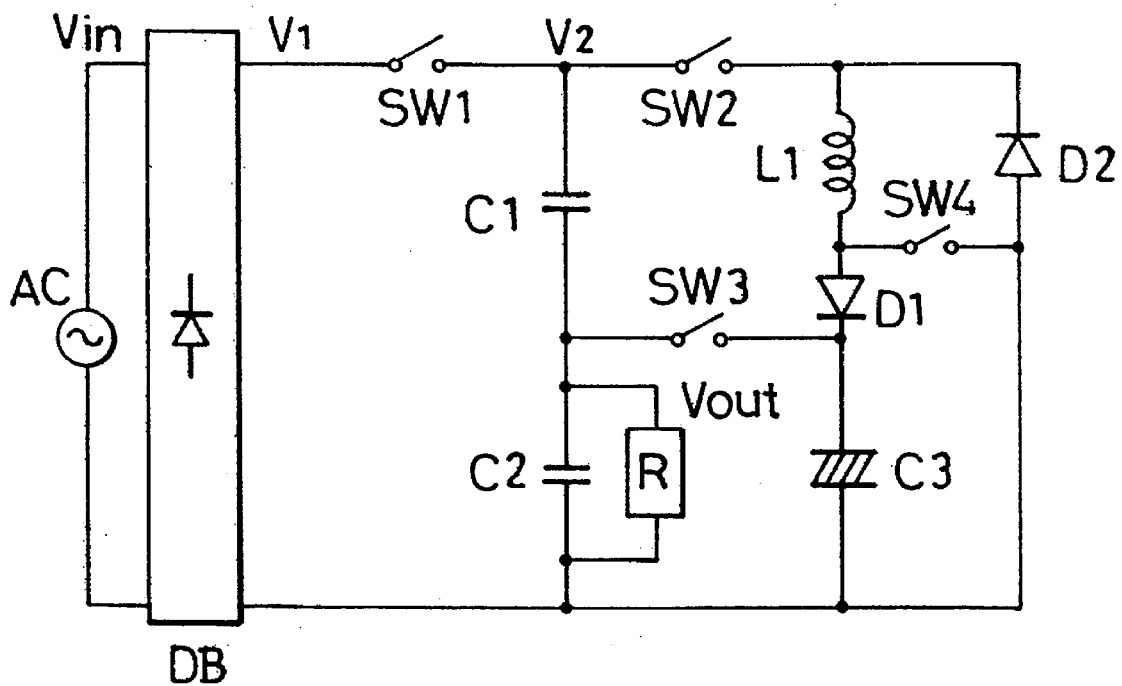
FIG. 7 is a circuit diagram of a second embodiment in accordance with the present invention.
Figure 8:
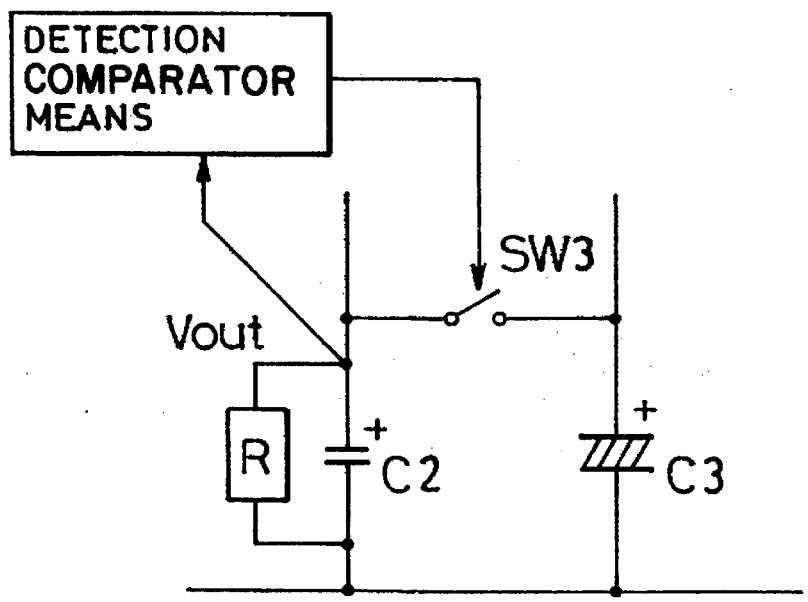
FIG. 8 is a diagram for explaining the ripple reducing operation of the second embodiment of the invention of FIG. 7.

A second embodiment of the present invention is shown in FIG. 7. In the present embodiment, the A.C. power source AC is connected with a full-wave rectifier DB which in turn is connected at its output terminals with a series circuit of the first switching element SW1, capacitor C1 and smoothing capacitor C2, the load R is connected in parallel to the smoothing capacitor C2, and a control means for adjusting the voltage across the capacitor C1 is connected across the capacitor C1. The control means comprises the inductor L1, switching elements SW2, SW3 and SW4, the diodes D1 and D2, and a power storage capacitor C3. Connected in parallel to the capacitor C1 is a series circuit of the second switching element SW2, inductor L1, diode D1 and third switching element SW3. The switching element SW4 is provided between a junction point of the inductor L1 and diode D1 and ground. For the purpose of sending energy remaining in the inductor L1 to the load circuit, the second diode D2 is provided between a junction point of the second switching element SW2 and inductor L1 and ground. For the purpose of storing the energy, the power storage capacitor C3 is provided between a junction point of the diode D1 and third switching element SW3 and ground. The energy of the power storage capacitor C3 is sent to the load circuit through turning ON and OFF of the third switching element SW3, as shown in FIG. 8.

Figure 9:
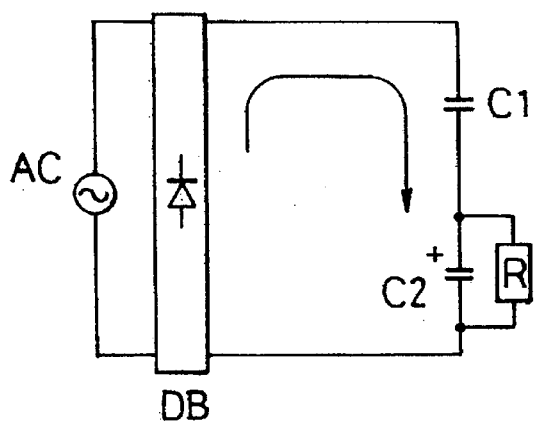
FIG. 9 is an equivalent circuit showing a first state of the second embodiment of the invention of FIG. 7.

The operation of the present embodiment will be explained below. The A.C. voltage Vin applied from the A.C. power source AC is first rectified at the full-wave rectifier DB and then output as the input pulsative voltage V1. When the first switching element SW1 is turned ON by a control signal received from the control circuit, the voltage V2 corresponding to the sum of voltages across the capacitors C1 and C2 is charged up to the input pulsative voltage V1, which operation will be referred to as state 1 and which equivalent circuit is given in FIG. 9.

Figure 10:
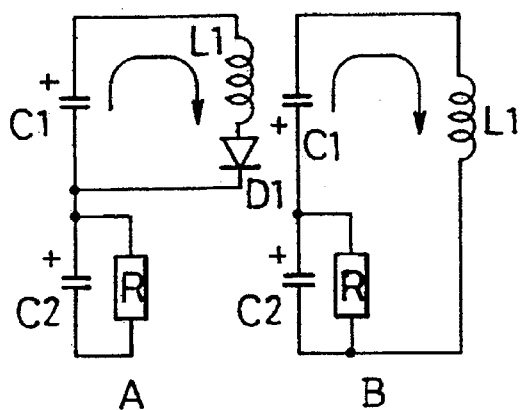
FIG. 10 is an equivalent circuit showing a second state of the second embodiment of the invention of FIG. 7.

Explanation will next be made as to the operation of the power supply apparatus after the first switching element SW1 is turned OFF. In a mountain part of the input pulsative voltage V1 in which the voltage V1 is higher than the output voltage Vout, the switching elements SW2 and SW3 are turned ON. This results in that the capacitor C1 is connected to the inductor L1 so that the energy of the capacitor C1 is partly moved to the inductor L1 and stored therein as magnetic energy, which operation will be referred to as state 2A. In a valley part of the input pulsative voltage V1 in which the voltage V1 is lower than the output voltage Vout, the switching elements SW2 and SW4 are turned ON. This results in that the capacitors C1 and C2 are connected to the inductor L1 so that part of the energy of the smoothing capacitor C2 is moved to the inductor L1 and stored therein as the magnetic energy while the capacitor C1 is reversely charged in its reverse direction, which operation will be referred to as state 2B. And the states 2A and 2B are shown in FIG. 10 as equivalent circuit respectively.

Figure 11:
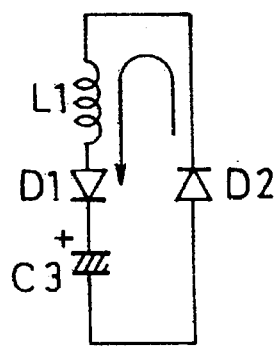
FIG. 11 is an equivalent circuit showing a third state of the second embodiment of the invention of FIG. 7.

With such an arrangement as mentioned above, the energy temporarily stored in the inductor L1 is discharged as soon as the switching elements SW2 and SW3 (or switching elements SW2 and SW4) are turned OFF, whereby the second diode D2 is turned ON so that the energy is all supplied to the power storage capacitor C3 via the diode D1. Which operation will be referred to as state 3 and which equivalent circuit is shown in FIG. 11.

In this way, by sending the excessive energy stored in the capacitor C1 to the power storage capacitor C3 through the inductor L1, the voltage across the capacitor C1 can be effectively adjusted. This operation is repeated so that the voltages across the capacitors C2 and C3 gradually increase. The capacitor C1 functions to store therein a voltage corresponding to a difference between the input pulsative voltage V1 and output voltage Vout in such a manner that, when the first switching element SW1 is turned ON, the input pulsative voltage V1 is connected in series with the capacitor C1 to supply a constant voltage to the load circuit. The ON time of the second switching element SW2 (and the third switching element SW3) is controlled so that the voltage V2 corresponding to the sum of voltages across the capacitors C1 and C2 immediately prior to the turning ON of the first switching element SW1 becomes similar in waveform to the full-wave-rectified output V1, whereby the envelope line of the waveform of the input current can be made similar to that of the input voltage to thereby suppress input harmonics distortion. Further, when this similitude ratio is changed by adjusting the ON time of the switching elements SW2 and SW3 (or the switching elements SW2 and SW4), this causes the peak value of the input current to vary, whereby the output voltage is increased or decreased. Thus the output voltage of this circuit in the power supply apparatus can be adjusted.

Further, in order to reduce ripples of the order of commercial frequencies in the output voltage, the energy stored in the power storage capacitor C3 is sent to the load circuit to replenish it. Control of this energy amount is carried out so that, as shown in FIG. 8, the output voltage Vout is detected and compared with a predetermined reference voltage to determine the ON time of the third switching element SW3, whereby the turning ON and OFF of the third switching element SW3 causes the output voltage to be kept constant.

As mentioned above, the A.C. power source AC is connected with the full-wave rectifier DB which in turn is connected at its output terminals with the switching element SW1, capacitor C1 and capacitor C2 in series therewith, the load R is connected in parallel to the smoothing capacitor C2, the control means including the inductor L1, switching elements SW2, SW3, SW4, diodes D1, D2, and power storage capacitor C3 is connected to the capacitor C1, so that the control means controls the voltage across the capacitor C1. By controlling the voltage across the capacitor C1 under the control means, the suppression of the input harmonics distortion, the adjustment of the input current value and the adjustment of the output voltage can be achieved. Further, the switching element SW3 enables reduction of ripples of the order of the commercial frequencies in the output voltage. Furthermore, when the operational frequency is set high, the respective capacitors, inductors and switching elements can be made small in size. As a result, there can be provided a small-sized power supply apparatus which can generate a desired constant voltage.

EMBODIMENT 3

Figure 12:
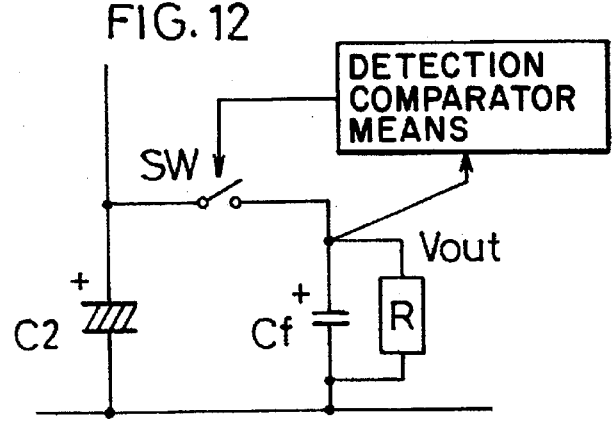
FIG. 12 is a circuit diagram of a major part of a third embodiment in accordance with the present invention.
Figure 13:
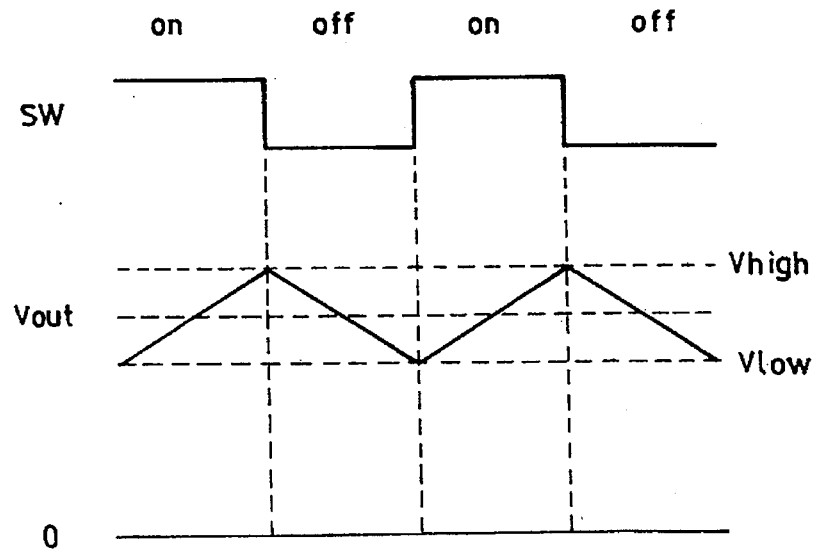
FIG. 13 shows waveforms of signals appearing at points in the third embodiment of the present invention.

Shown in FIG. 12 is a circuit diagram of a major part of a third embodiment of the present invention. Also FIG. 13 shows waveforms of signals varying with the turning ON and OFF of a switching element SW in the present embodiment. The present embodiment corresponds to an attachment to a circuit that has no such function as to reduce ripples in the output voltage. A load circuit in the form of a parallel connection of the smoothing capacitor C2 and load R is arranged as shown in FIG. 12. More specifically, a smoothing capacitor Cf is wired between terminals of the smoothing capacitor C2 through the switching element SW, and the load R is wired in parallel to the smoothing capacitor Cf. Further, the output voltage Vout to the load R is detected and compared with a predetermined reference voltage by a detector and a comparator respectively, to control the turning ON and OFF of the switching element SW and to thereby controllably keep the output voltage Vout constant.

In the operation of the circuit of the present embodiment, as shown in FIG. 13, lower and upper limits Vlow and Vhigh as reference voltages are set for the output voltage Vout so that, when the output voltage Vout reaches the lower limit Vlow, the switching element SW is turned ON, while, when the output voltage Vout reaches the upper limit Vhigh, the switching element SW is turned OFF, with the result that the output voltage Vout can fall within a range of the upper and lower limits Vlow and Vhigh. When a difference between the lower and upper voltage limits Vlow and Vhigh is close to zero, the output voltage Vout becomes nearly constant.

As has been explained above, when the attachment circuit of the present embodiment is connected to a circuit that has not a function of reducing ripples in the output voltage, the switching element SW enables reduction of the output voltage ripples of the order of the commercial frequencies to be achieved.

EMBODIMENT 4

Figure 14:
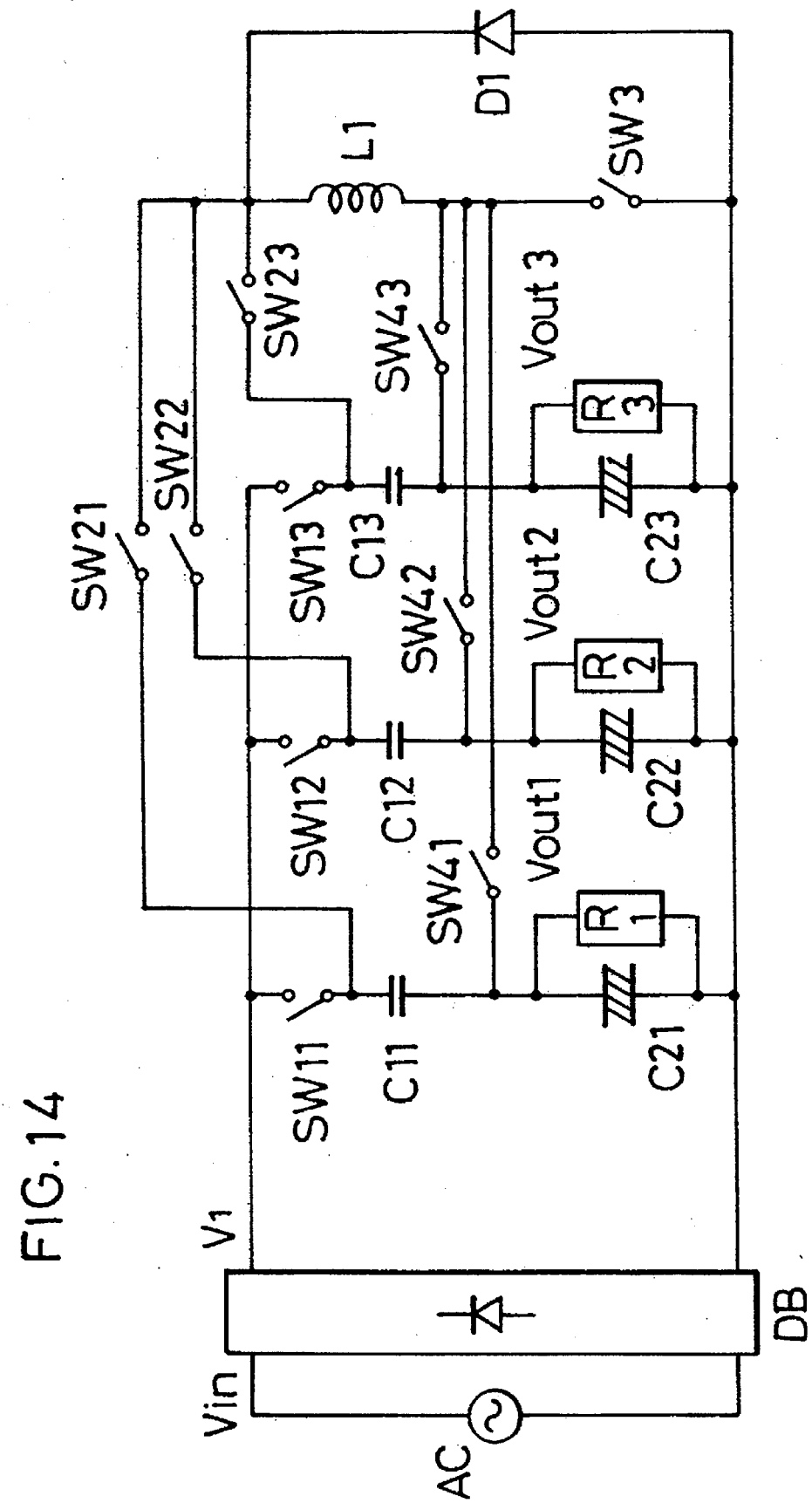
FIG. 14 is a circuit diagram of a fourth embodiment in accordance with the present invention.

FIG. 14 is a circuit diagram of a fourth embodiment of the present invention. In the present embodiment, a pair of the capacitor C1 and smoothing capacitor C2 in the embodiment 1 is provided by a plurality of numbers. This enables acquisition of a plurality of desired constant voltages. When the number of pairs of the capacitor C1 and smoothing capacitor C2 is set at n, n output voltages can be obtained. In the present embodiment, n is set at 3. The voltage Vin applied from the A.C. power source AC is first rectified at the full-wave rectifier DB and then output as the pulsative voltage V1. The switching element SW1$i$ ($i$=1, 2, ..., and n), when receiving a control signal from the control circuit, is turned ON so that a voltage corresponding to a sum of voltages across capacitors C1$i$ and C2$i$ ($i$=1, 2, ..., and n) is charged up to the input pulsative voltage V1. In a mountain part of the input pulsative voltage V1 in which the voltage V1 is higher than the output voltage Vout, switching elements SW2$i$, SW4$i$ ($i$=1, 2, ... and n) are turned ON. This results in that the capacitor C1$i$ is connected to the inductor L1 so that part of the energy of the capacitor C1$i$ ($i$=1, 2, ..., and n) is moved to the inductor L1 and stored therein as the magnetic energy. In a valley part of the input pulsative voltage V1 in which the voltage V1 is lower than the output voltage Vout, the switching element SW2$i$ ($i$=1, 2, ... and n) and switching element SW3 are turned ON. This results in that the capacitor C1$i$ ($i$=1, 2, ..., and n) is connected to the capacitor C2$i$ ($i$=1, 2, ..., and n) and inductor L1 so that part of the energy of the capacitor C2$i$ ($i$=1, 2, ..., and n) is moved to the inductor L1 and stored therein as the magnetic energy while charging the capacitor C1$i$ ($i$=1, 2, ..., and n). Through the above operations, the energy temporarily stored in the inductor L1 causes the diode D1 to be turned ON and at the same time, a switching element SW4$j$ ($j$=1, 2, ... and n) to be turned ON, as soon as the switching element SW2$i$ ($i$=1, 2, ..., and n) (and SW3) is turned OFF, with the result that the energy is sent to a smoothing capacitor C2$j$ ($j$=1, 2, ... and n). The excessive energy stored in the capacitor C1$i$ ($i$=1, 2, ..., and n) in this manner is sent to the smoothing capacitor C2$j$ ($j$=1, 2, ..., and n) through the inductor L1 so that the voltage across the capacitor C1$i$ ($i$=1, 2, ..., and n) can be effectively adjusted. In this case, it is necessary to turn ON the switching elements SW21 to SW2$n$ separately (on a time division basis).

The repetition of the above operation causes gradual increase of the voltage across the smoothing capacitor C2$j$ ($j$=1, 2, ..., and n). The capacitor C1$i$ ($i$=1, 2, ..., and n) functions to store therein a voltage corresponding to a difference between the input pulsative voltage V1 and output voltage Vout$i$ ($i$=1, 2, ... and n) in such a manner that the turning ON of the switching element SW1$i$ ($i$=1, 2, ..., and n) causes the input pulsative voltage V1 to be connected in series with the capacitor C1$i$ ($i$=1, 2, ..., and n) to supply a constant voltage to the load circuit. Further, the ON time of the switching element SW2$i$ ($i$=1, 2, ..., and n) (and SW3) is controlled so that a voltage corresponding to sum of voltages across the capacitor C1$i$ ($i$=1, 2, ..., and n) and capacitor C2$i$ ($i$=1, 2, ..., and n) becomes similar in waveform to the input pulsative voltage V1, thus resulting in that the envelope line of the input current waveform becomes similar to the input voltage waveform. When the currents flowing through the capacitor pair are all made similar to the input voltage waveform, the input harmonics distortion can be suppressed. When the similitude ratio is changed by adjusting the ON time of the switching element SW2$i$ ($i$=1, 2, ..., and n) (and SW3), this causes a change of the peak value of the input current, whereby the respective output voltages Vout1, Vout2, ... are increased or decreased. As a result, the power supply apparatus also allows adjustment of the respective output voltages.

As has been mentioned above, the A.C. power source AC is connected with the full-wave rectifier DB which in turn is connected at its output terminals with the switching elements SW1$i$ ($j$=1, 2, ... and n), capacitors C1$i$ ($i$=1, 2, ... and n) and capacitors C2$i$ ($i$=1, 2, ... and n), loads R$i$ ($i$=1, 2, ... and n) are connected in parallel to the respective capacitors C2$i$ ($i$=1, 2, ... and n), and a control means including the inductor L1, switching elements SW2$i$ ($i$=1, 2, ... and n), SW3, SW4$i$ ($i$=1, 2, ... and n) and diode D1 is connected in parallel to the capacitors C1$i$ ($i$=1, 2, ..., and n). When the voltage across the capacitor C1$i$ ($i$=1, 2, ..., and n) is controlled under the control means, the suppression of the input harmonics distortion, the adjustment of the input current value and the adjustment of the output voltage can be realized. When the operational frequency is set high, the respective capacitors, inductors and switching elements can be made small in size. As a result, there can be provided a small-sized power supply apparatus which can generate a plurality of desired constant voltages.

EMBODIMENT 5

Figure 15:
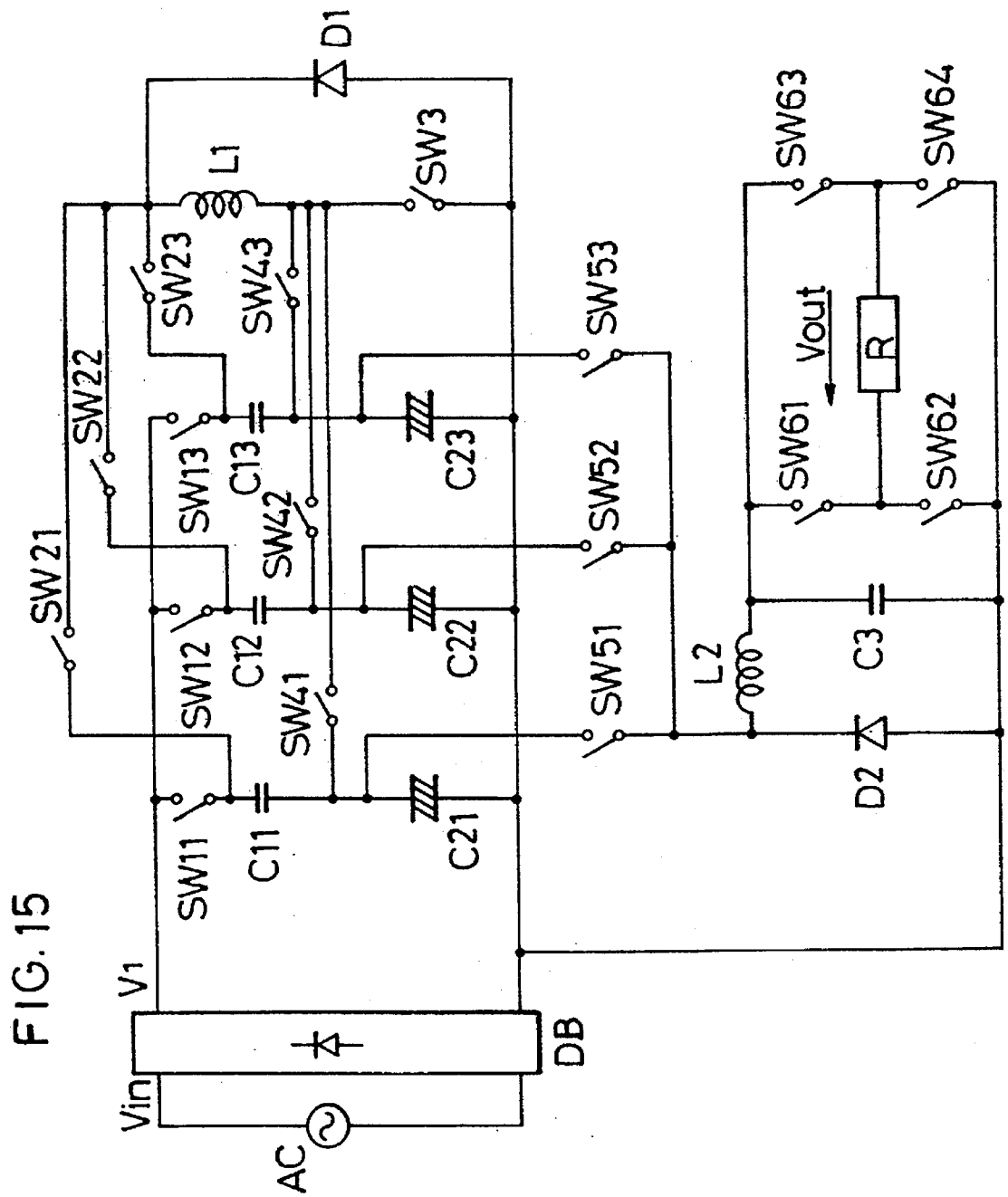
FIG. 15 is a circuit diagram of a fifth embodiment in accordance with the present invention.
Figure 16:
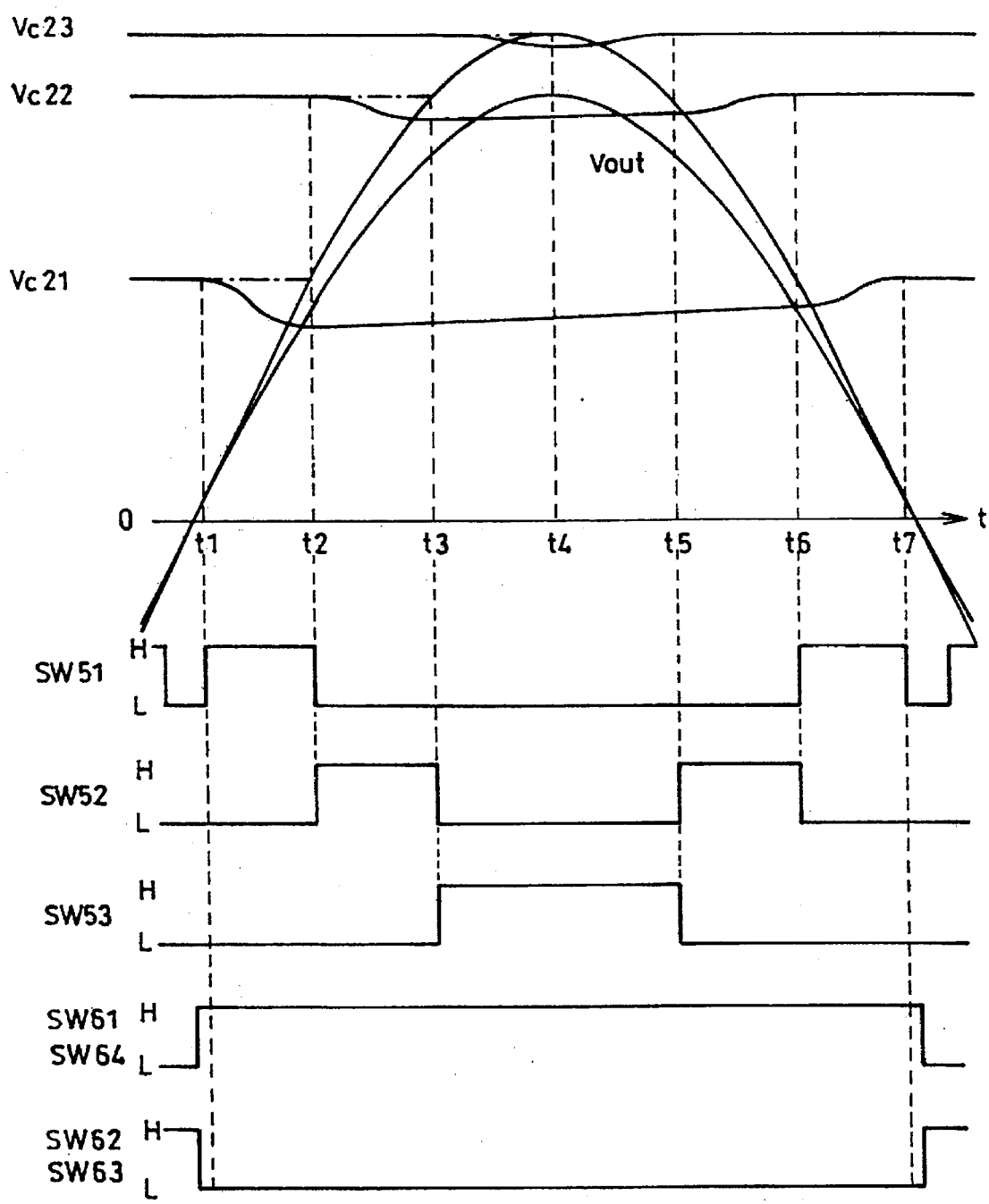
FIG. 16 shows waveforms of signals appearing at points in the fifth embodiment of the present invention.

FIG. 15 shows a circuit diagram of a fifth embodiment of the present invention and FIG. 16 shows waveforms of signals in the present embodiment. In the present embodiment, in addition to the above embodiment 4, a series circuit of switching elements SW5$i$ ($i$=1, 2, ... and n), inductor L2 and capacitor C3 is connected in parallel to the smoothing capacitor C2$i$ ($i$=1, 2, ... and n), and a full bridge circuit including switching elements SW61 to SW64 and load R is connected in parallel to the capacitor C3. Further, the second diode D2 is connected in parallel to a series circuit of the inductor L2 and capacitor C3. The load R is, for example, a discharge lamp.

In this circuit, voltages across the smoothing capacitor C2$i$ ($i$=1, 2, ... and n) are set at certain values, the switching elements SW5$i$ ($i$=1, 2, ... and n) are turned ON on a time division basis as shown in FIG. 16 so that a resonance circuit of the smoothing capacitor C2$i$ ($i$=1, 2, ..., and n), inductor L2 and capacitor C3 causes the voltage of the capacitor C3 to be continuously varied. At a time t7 at which the output voltage Vout to the load R is close to a zero-cross point, only the capacitor C3 is connected to the load R to supply energy thereto, whereby, when the voltage of the capacitor C3 reaches zero, the switching elements SW61 and SW64 are switched from their ON state to OFF state while the switching elements SW62 and SW63 are switched from their OFF state to ON state, thereby starting again charging the capacitor C3. Similarly, when the voltage of the capacitor C3 is continuously varied to be close to the next zero-cross point, the switching elements SW62 and SW63 are put in their OFF state while the switching elements SW61 and SW64 are put in their ON state. The repetition of the above operation enables the output to have a desired AC voltage waveform.

As stated above, the A.C. power source AC is connected with the full-wave rectifier DB which in turn is connected at its output terminals with the series circuit of the switching elements SW1$i$ ($i$=1, 2, ... and n), capacitors C1$i$ ($i$=1, 2, ... and n) and smoothing capacitors C2$i$ ($i$=1, 2, ... and n), the control means including the inductor L1, switching elements SW2$i$ ($i$=1, 2, ... and n), SW3, SW4$i$ ($i$=1, 2, ... and n) and diode D1 is connected in parallel to the smoothing capacitors C2$i$ ($i$=1, 2, ... and n), so that the voltages of the capacitors C1$i$ ($i$=1, 2, ..., and n) can be controlled by the control means. As a result, the suppression of the input harmonics distortion, the adjustment of the input current value and the adjustment of the output voltage can be realized. Further, the series circuit of the switching elements SW5$i$ ($i$=1, 2, ... and n), inductor L2 and capacitor C3 is in parallel to the smoothing capacitors C2$i$ ($i$=1, 2, ... and n), and the full bridge circuit including the switching elements SW61 to SW64 and load R is connected in parallel to the capacitor C3. As a result, a desired A.C. voltage waveform can be obtained. In addition, when the operational frequency is set high, the respective capacitors, inductors and switching elements can be made small in size. Thus, there can be provided a small-sized power supply apparatus which can generate a desired A.C. voltage.

EMBODIMENT 6

Figure 17:
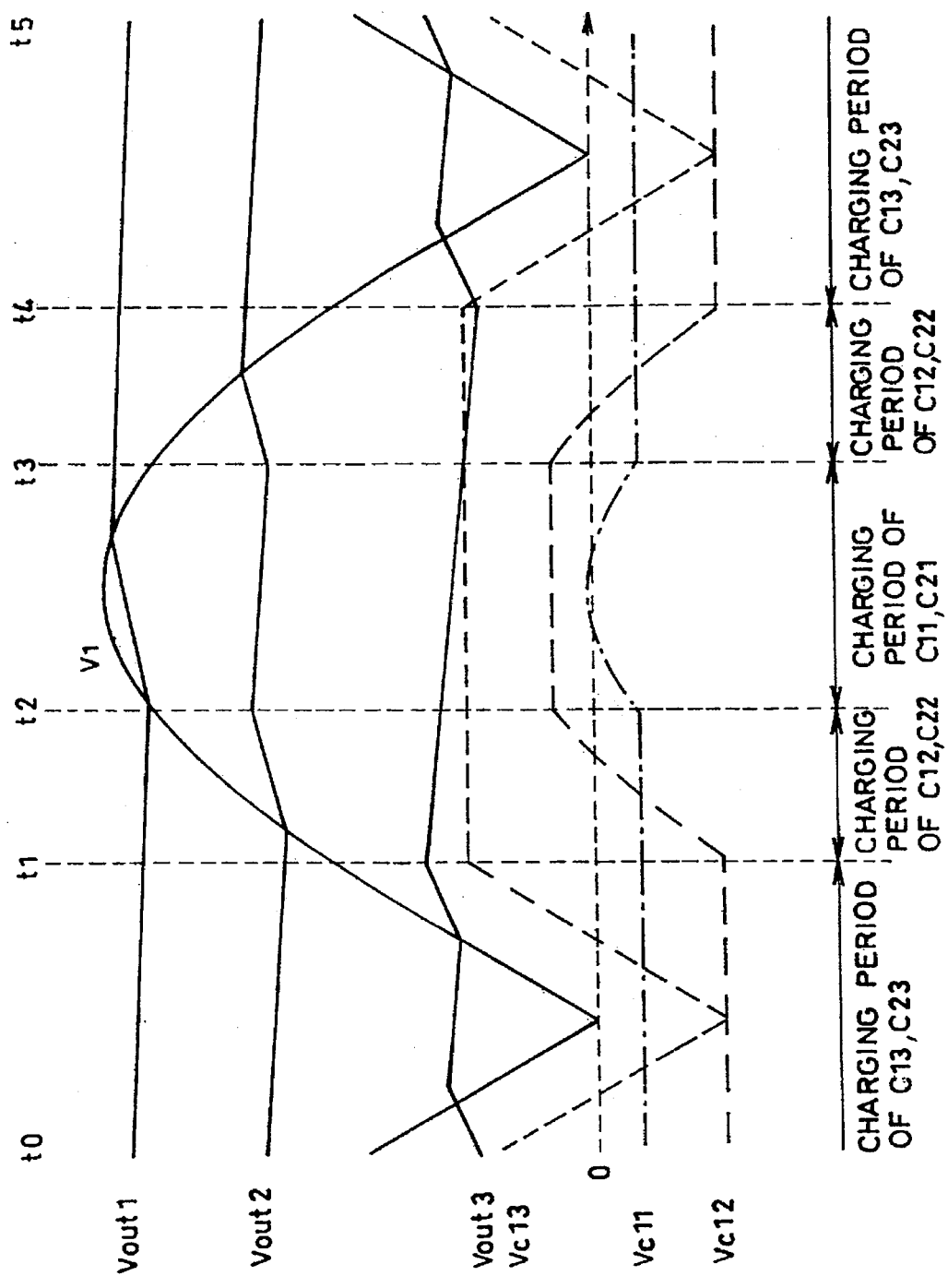
FIG. 17 shows waveforms of signals appearing at points in a sixth embodiment of the present invention.

Waveforms of signals in a sixth embodiment of the present invention are shown in FIG. 17. The present embodiment corresponds to the circuit of the foregoing embodiment 4 but one of the capacitor pairs which output voltage appearing its both ends is closer to an input voltage is charged to make small the voltage to be applied to the voltage storage capacitor C1$i$ ($i$=1, 2, ... and n). That is the present embodiment is designed to decrease a voltage to be applied to the inductor L1 to thereby realize a high efficiency. Explanation will be made in connection with a case where the number of capacitor pairs is set at 3 as an example.

Assume now in the circuit of FIG. 14 that output voltages satisfy a relationship of Vout1>Vout2>Vout3. Then, as shown in FIG. 17, in a time duration of times t0–t1 and in a time duration of t4–t5, capacitors C13 and C23 are charged respectively to perform a series of operation such as the adjustment of a voltage across the capacitor C13. Likewise, in a time duration of times t1–t2 and in a time duration of times t3–t4, a series of operation such as the voltage adjustment of a pair of the capacitors C12 and C22; whereas, in a time duration of times t2—t3, a series of operation such as the voltage adjustment of a pair of capacitors C11 and C21. Through such suppression, the capacitors C11, C12 and C13 for storage of voltages corresponding to differences between the input pulsative voltage V1 and output voltages Vout1, Vout2, Vout3 are required to hold only small voltages, with the result that the voltage to be applied to the inductor L1 at the time of the voltage adjustment can be also reduced. The similar control can also be applied even to the power supply apparatus of the foregoing embodiment 5.

In this way, when in the circuit of the embodiment 4 or 5, the suppression is effected to charge one of the capacitor pairs which output voltage appearing its both ends is closer to an input pulsative voltage, the voltage to be applied to the voltage storage capacitor can be reduced, the voltage to be applied to the inductor at the time of the voltage adjustment can be reduced, and a high efficiency can be realized.

EMBODIMENT 7

Figure 18:
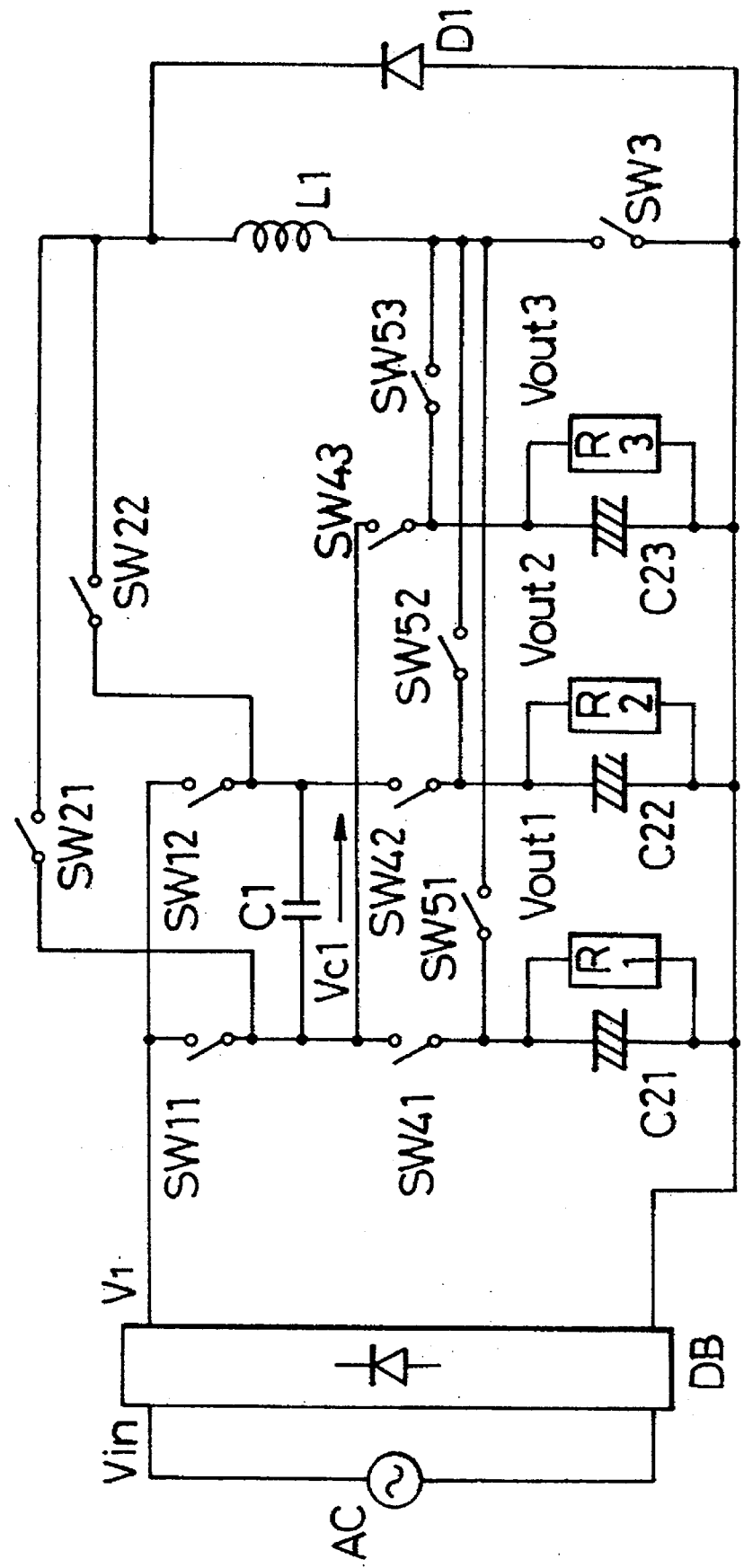
FIG. 18 is a circuit diagram of a seventh embodiment in accordance with the present invention.
Figure 19:
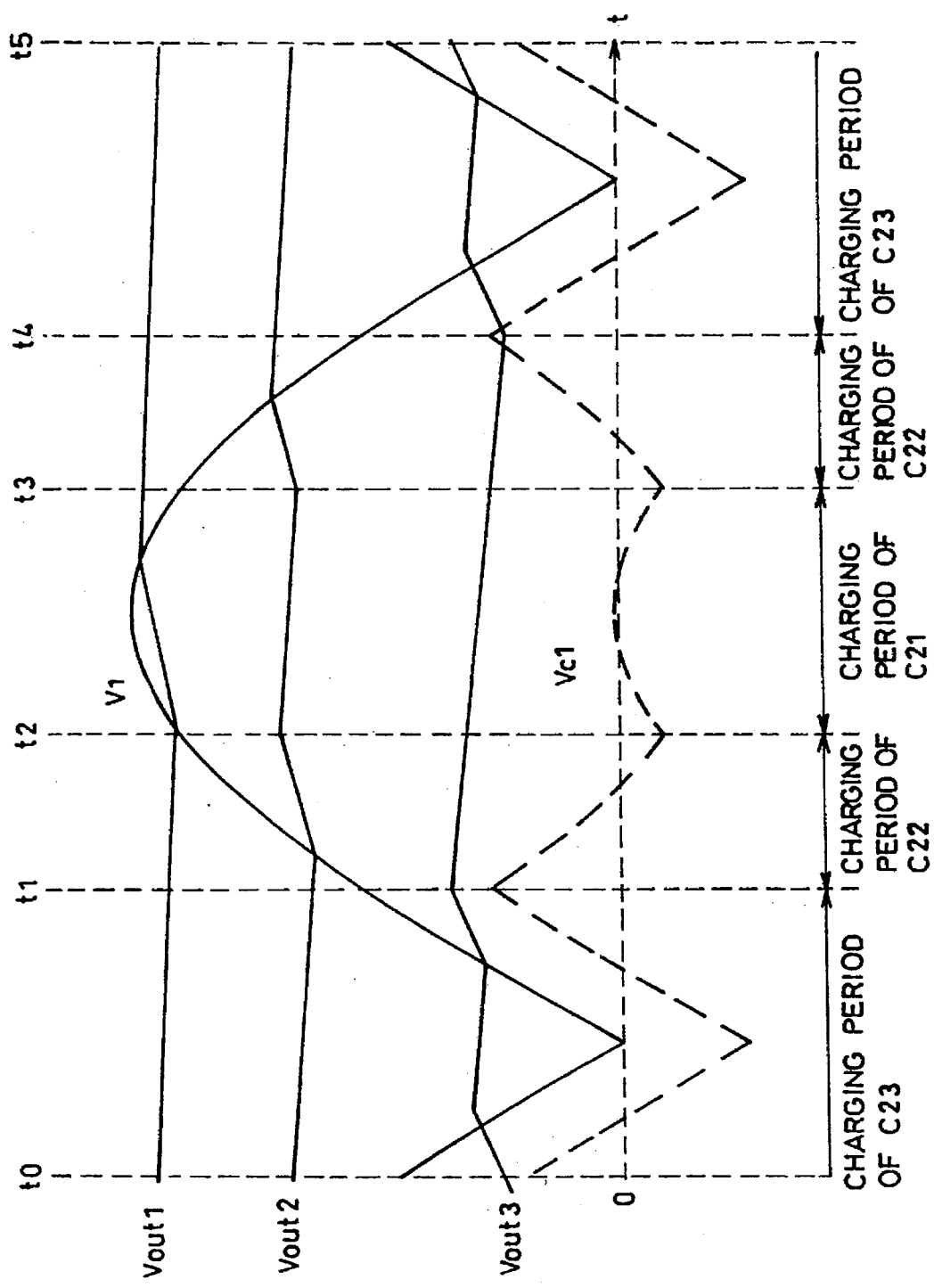
FIG. 19 shows waveforms of signals appearing at points in the seventh embodiment of FIG. 18 of the present invention.

FIG. 18 is a circuit diagram of a seventh embodiment of the present invention and FIG. 19 shows waveforms of signals in the present embodiment. In the present embodiment, the A.C. power source AC is connected with the full-wave rectifier DB which in turn is connected at its one output end with the switching elements SW11 and SW12 at their one ends, and the capacitor C1 is provided between the other ends of the switching elements SW11 and SW12. Also connected between a junction point of the switching element SW11 and capacitor C1 and ground is a parallel circuit of u series circuits, each of which is made of a switching element SW4$j$ ($j$=2$i$+1; $i$=0, 1, ... and (u−1)) and a parallel circuit of a smoothing capacitor C2$j$ ($j$=2$i$+1; $i$=0, 1, ... and (u−1)) and a load R$j$ ($j$=2$i$+1; $i$=0, 1, ... and (u−1)). In the present embodiment, the u is set at 2 as an example. Further connected between a junction point of the switching element SW12 and capacitor C1 and ground is a parallel circuit of m series circuits, each of which is made of a switching element, SW4$k$ ($k$=2$i$; $i$=1, ... and m) and a parallel circuit of a smoothing capacitor C2$k$ ($k$=2$i$; $i$=1, ... and m) and a load R$k$ ($k$=2$i$; $i$=1, ... and m). In the illustrated embodiment, the m is set at 1. The number of desired output voltages Vout1, Vout2, Vout3, ... thus obtained is n=u+m. In the illustrated embodiment, the n is set at 3 (u=2, m=1).

Provided across the capacitor C1 is a control means for adjusting the voltage across the capacitor C1. The control means comprise the inductor L1, switching elements SW21, SW22, SW3, SW51–SW5$n$ and diode D1. The capacitor C1 is connected at its one end with the switching clement SW21 at the other end with the switching element SW22, the other ends of the switching element SW21 and SW22 being connected each other at a junction point, a series circuit of the inductor L1 and switching element SW3 being provided between the above junction point and ground. Provided between a junction point of the inductor L1 and diode D1 and a junction point of the switching element SW4$i$ ($i$=1, 2, ... and n) and smoothing capacitor C2$i$ ($i$=1, 2, ... and n) is the switching element SW5$i$ ($i$=1, 2, ... and n). For the purpose of sending the remaining energy of the inductor L1 to the load circuit, the diode D1 is provided between a junction point of the switching elements SW21, SW22 and inductor L1 and ground.

The operation of the power supply apparatus will now be made in connection with a case where n is set at 3 (u=2, m=1) and the output voltages satisfy a relationship of Vout1>Vout2>Vout3. The voltage Vin applied from the A.C. power source AC is rectified at the full-wave rectifier DB and then output therefrom as the input pulsative voltage V1. In FIG. 19, in a time duration of times t0–t1 and in a time duration of times t4–t5, the switching element SW43 is previously set to be always in its ON state. First of all, the switching element SW12 is previously set to be turned ON in response to a control signal received from the control circuit to charge the smoothing capacitor C23. Subsequently, when the input pulsative voltage V1 is lower than the output voltage Vout3 after the switching element SW12 is turned OFF, the switching element SW43 is kept in its ON state and the switching elements SW22 and SW3 are turned ON. This causes completion of the capacitor C1, smoothing capacitor C23 and inductor L1, whereby part of the energy of the smoothing capacitor C23 is moved to the inductor L1 and stored therein as the magnetic energy while the capacitor C1 is charged therewith. When the input pulsative voltage V1 is higher than the output voltage Vout3, the switching element SW43 remains its ON state and the switching elements SW22 and SW53 are turned ON. This results in that the capacitor C1 is connected to the inductor L1 so that part of the energy of the capacitor C1 is moved to the inductor L1 and stored therein as the magnetic energy. The energy temporarily stored in the inductor L1 through the above process causes any of the switching elements SW51 to SW53 to be turned ON as soon as the switching element SW22 (and SW3). As a result, the diode D1 is turned ON so that the energy can be fully sent to any of the smoothing capacitors C21 to C23. The capacitor C1 functions to store therein a voltage corresponding to a difference between the input pulsative voltage V1 and output voltage Vout3 and when the switching element SW12 is turned ON, to connect the input pulsative voltage V1 and the voltage Vc1 of the capacitor C1 in series and supply a constant voltage to the load circuit.

Next, in a time duration of times t1–t2 and in a time duration of times t3–t4 in FIG. 19, the switching element SW42 is kept in its ON state all the time. During these periods, the switching element SW11 is first turned ON in response to a control signal received from the control circuit to charge the smoothing capacitor C22. After the switching element SW11 is turned OFF, the operation of the switching elements SW21 and SW3 similar to the above enables adjustment of the voltage across the capacitor C1.

Then in a time duration of times t2–t3 in FIG. 19, the switching element SW41 is kept always in its ON state all the time so that the switching element SW12 is turned ON in response to the control signal received from the control circuit to charge the smoothing capacitor C21. After the switching element SW12 is turned OFF, the operation of the switching elements SW22 and SW3 similar to the above enables adjustment of the voltage across the capacitor C1.

It will be appreciated that the change-over of these circuit operations is carried out when the input pulsative voltage V1 reaches an intermediate value between set voltages of the smoothing capacitor charged before or after the change-over of the circuit operations. For example, at the time points t1 and t4, the pulsative voltage V1 reaches a level of (Vout2+Vout3)/2. Through such operation, the voltage of the capacitor C1 at the above change-over time points varies substantially continuously. When the ON time of the switching elements SW21 and SW22 (and SW3) is controlled so that a sum of the voltages across the capacitor C1 and across any one of the smoothing capacitors C21 to C23 prior to the turning ON of the switching element SW11 or SW12 becomes similar in waveform to the voltage of a full-wave rectifier DB, the envelope line of the input current waveform is made similar to the input voltage waveform to thereby suppress the input harmonics distortion. Further, when the similitude ratio is changed by adjusting the ON time of the switching element SW21 or SW22 (and SW3), the peak value of the input current varies and thus the respective output voltages of the circuit can be adjusted.

As explained above, the A.C. power source AC is connected with the full-wave rectifier DB which is connected at its one output end with the switching elements SW11 and SW12 at their one ends, the capacitor C1 being wired between the other ends of the switching elements SW11 and SW12, the parallel circuit of u series circuits, each made of the switching element SW4$j$ ($j$=2i+1; i=0, 1, ... and (u−1)) and the parallel circuit of the smoothing capacitor C2$j$ ($j$=2i+1; i=0, 1, ... and (u−1)) and a load R$j$ ($j$=2i; i=1, ... and u−1), is connected between the junction point of the switching element SW11 and capacitor C1 and ground. Also connected between the junction point of the switching element SW12 and capacitor C1 and ground is the parallel circuit of m series circuits, each made of the switching element SW4$k$ ($k$=2i; i=1, ... and m) and the parallel circuit of the smoothing capacitor C2$k$ ($k$=2i; i=1, ... and m) and a load R$k$ ($k$=2i; i=1, ... and m). The number n of desired output voltages thus obtained is set at (u+m), the control means for adjusting the voltage across the capacitor C1 is connected. By controlling the voltage across the capacitor C1 under the control means, the suppression of the input harmonics distortion, the adjustment of the input current value and the adjustment of the respective output voltages can be realized. By setting the operational frequency high, the respective capacitors, inductors and switching elements can be made small in size. Thus there can be provided a small-sized power supply apparatus which can generate a plurality of desired constant voltages.

EMBODIMENT 8

Figure 20:
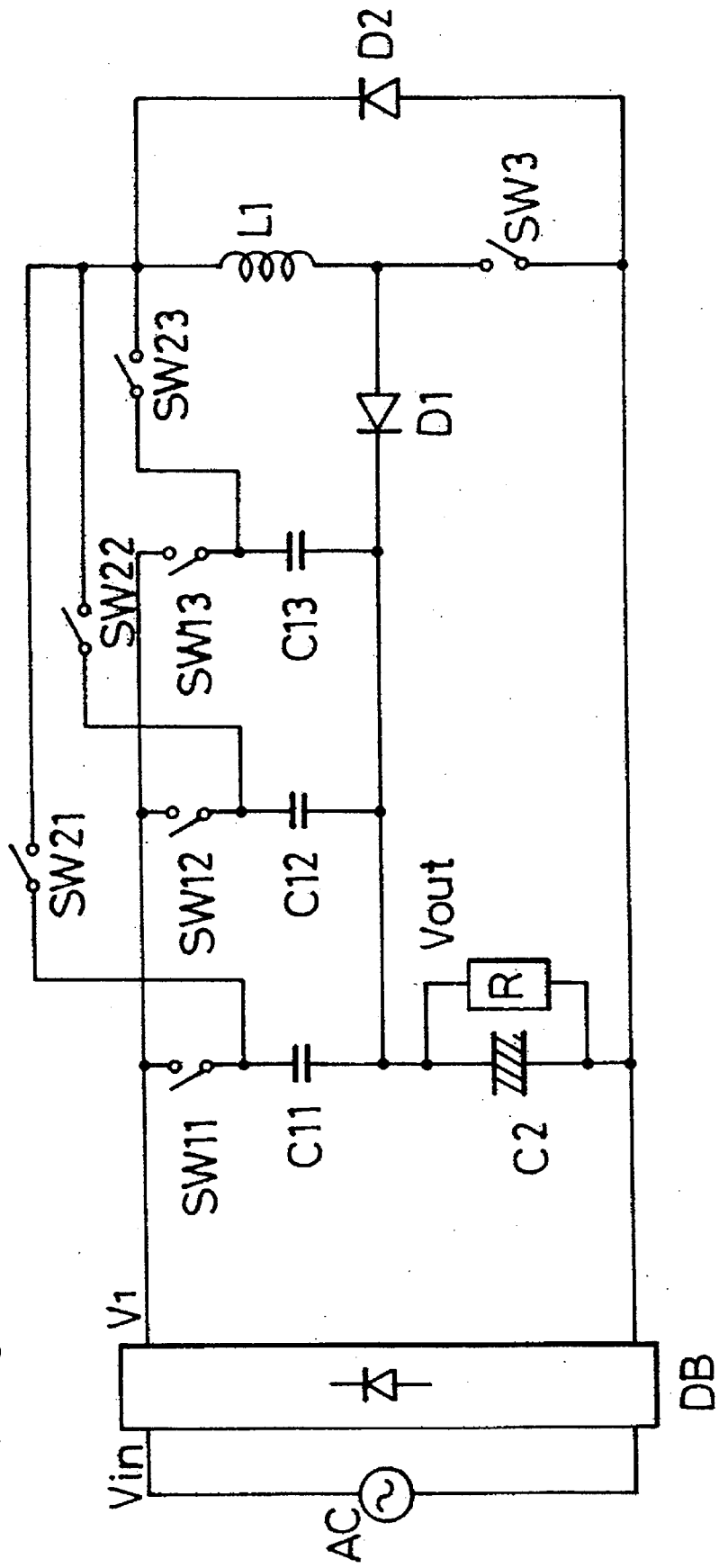
FIG. 20 is a circuit diagram of an eighth embodiment in accordance with the present invention.

A circuit diagram of an eighth embodiment of the present invention is shown in FIG. 20. In the present embodiment, the A.C. power source AC is connected with the full-wave rectifier DB which in turn is connected at its output ends with a series circuit of a parallel circuit made of n series circuits of switching elements SW1$i$ (i=1, 2, ... and n) and C1$i$ (i=1, 2, ... , and n) also of a parallel circuit of the smoothing capacitor C2 and load R. A control means for adjusting voltages across the capacitors C11, C12, ... and C1$n$ is connected in parallel to the capacitors C11, C12, ... and C1$n$. The control means comprises the inductor L1, switching elements SW2$i$ (i=1, 2, ... and n), SW3, and diodes D1, D2. Connected in parallel to the capacitors C1$i$ are series circuits of the switching elements SW2$i$ (i=1, 2, ... and n), inductor L1 and diode D1 respectively. Provided between a junction point of the inductor L1 and diode D1 and ground is the switching element SW3. For the purpose of sending the energy remaining in the inductor L1 to the load circuit, the diode D2 is connected between a junction point of the switching element SW21, SW22, ... and SW2$n$ and inductor L1 and ground. In the case of FIG. 20, the n is set at 3 as an example.

Explanation will be made as to the operation of the present embodiment below. First, the voltage Vin applied from the A.C. power source AC is rectified at the full-wave rectifier DB and then output therefrom as the input voltage V1. When the switching elements SW1$i$ (i=1, 2, ... and n) are all turned ON at the same time in response to a control signal received from the control circuit, voltages corresponding to sums of voltages across the capacitors C1$i$ (i=1, 2, ... and n) and across the smoothing capacitor C2 are charged up to the input pulsative voltage V1. Then the operation of the present embodiment after the switching elements SW1$i$ are turned OFF will be explained. In a mountain part of the input pulsative voltage V1 in which the voltage V1 is higher than the output voltage Vout, the switching elements SW2$i$ are turned ON on a time division basis. This causes the capacitors C1$i$ to be connected to the inductor L1 so that part of the energy of the capacitor C1$i$ is moved to the inductor L1 and then stored therein as the magnetic energy. In a valley part of the input pulsative voltage V1 in which the voltage V1 is lower than output voltage Vout, the switching element SW3 is kept previously in its ON state and the same operation as the above is carried out. This causes the capacitor C1 to be connected to the smoothing capacitor C2 and inductor L1, so that the energy of the smoothing capacitor C2 is partly moved to the inductor L1 and then stores therein as the magnetic energy while charging the capacitor C1$i$. The energy temporarily stored in the inductor L1 through the above process is all sent to the load circuit through the diode D1 as soon as the switching element SW2$i$ is turned OFF. The excessive energy stored in the capacitor C1 in this manner is sent to the load circuit through the inductor L1. When this operation is completed, the voltage across the capacitor C1$j$ (j=i+1; i=1, 2, ... and (n−1)) is then adjusted in substantially the same manner as the above. Such operation is repeated to effectively adjust the voltages across all the capacitors C1$i$.

The above operation allows the capacitances of the capacitors C1$i$ to be made small and also reduction of the peak value flowing through this loop. This repetition causes the voltage of the smoothing capacitor C2 to be gradually increased. The capacitor C1$i$ acts to memorize or store therein a voltage corresponding to a difference between the input pulsative voltage V1 and output voltage Vout in such a manner that, when the switching elements SW11, SW12, ... and SW1$n$ are in their ON state, the input pulsative voltage is connected in series with a parallel circuit of the capacitors C11, C12, ... and C1$n$ to supply a constant voltage to the load circuit. Further, the ON time of the switching elements SW2$i$ (i=1, 2, ..., and n) is controlled so that the voltage V2 corresponding to a sum of the voltages across the capacitor C1$i$ (i=1, 2, ..., and n) and smoothing capacitor C2 immediately prior to the turning ON of the switching elements SW11, SW12, ... and SW1$n$ becomes similar in waveform to the full-wave-rectified output V1, whereby the envelope line of the input current waveform is made similar to the input voltage waveform to suppress the input harmonics distortion. When this similitude ratio is changed by adjusting the ON time of the switching element SW2$i$ (j=1, 2, ..., and n), the peak value of the input current varies and the output voltage increases or decreases. As a result, this circuit can be adjusted with respect to its output voltage.

As has been mentioned above, the A.C. power source AC is connected with the full-wave rectifier DB which in turn is connected at its output ends with the series circuit of a parallel circuit made of n series circuits of switching elements SW1$i$ (i=1, 2, ... and n) and capacitors C1$i$ (i=1, 2, ... and n), the control means each including the inductor L1, switching elements SW2$i$ (i=1, 2, ... and n), SW3 and diodes D1, D2 is connected in parallel to the respective capacitors C1$i$. When the voltages across the capacitors C1$i$ are controlled by the control means, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 9

Figure 21:
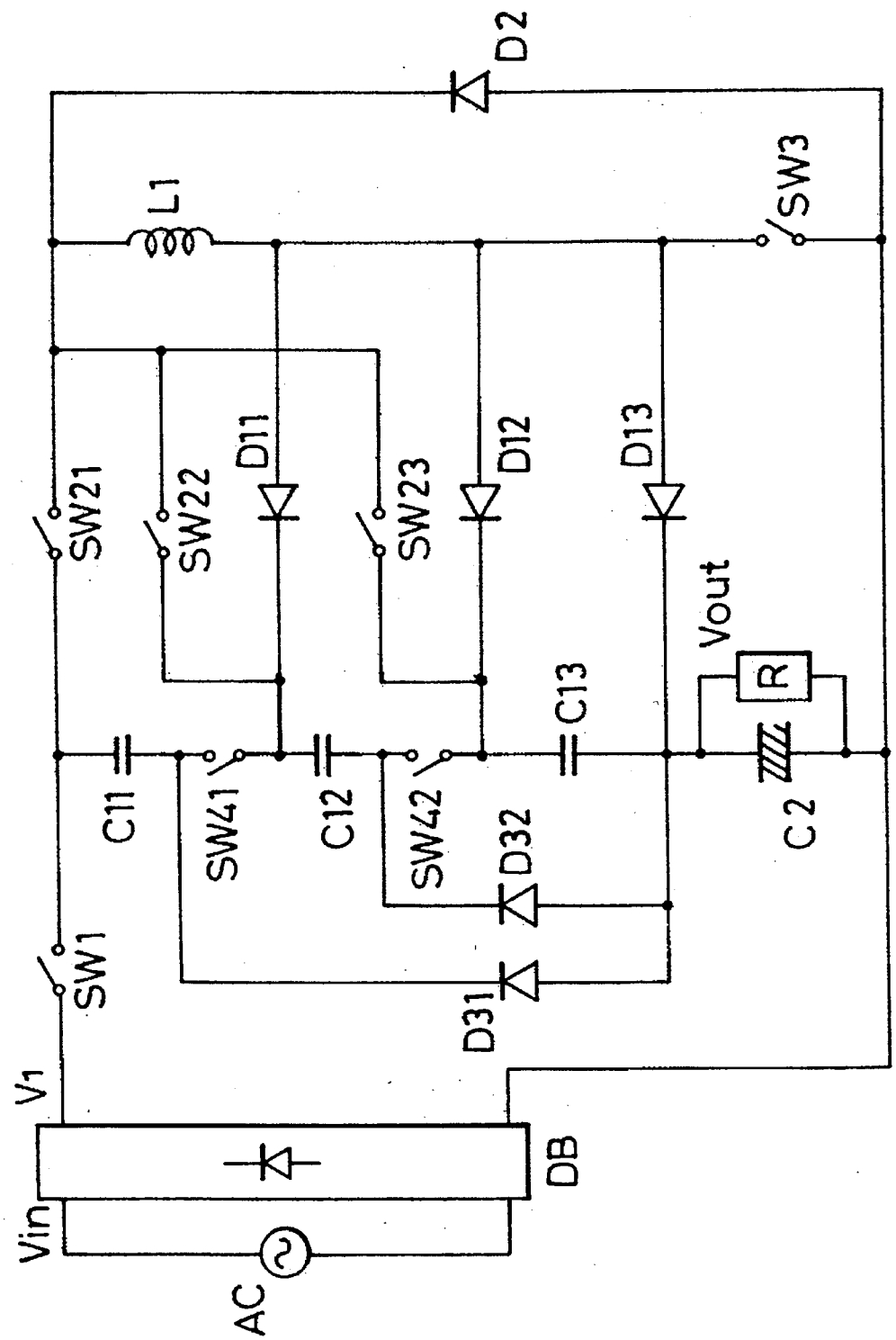
FIG. 21 is a circuit diagram of a ninth embodiment in accordance with the present invention.

A circuit diagram of a ninth embodiment of the present invention is shown in FIG. 21. In the present embodiment, the A.C. power source AC is connected with the full-wave rectifier DB which in turn is connected at its output ends with a series circuit of the switching element SW1, capacitor C11, switching element SW41, capacitor C12, switching element SW42, ..., Capacitor C1$m$, switching element SW4$m$(m=n−1), capacitor C1$n$, and a parallel circuit of the smoothing capacitor C2 and load R. Also connected to junction points of the capacitor C11 and switching element SW41, the capacitor C12 and switching element SW42, ..., the capacitor C1$m$ and switching element SW4$m$ (m=n−1), and the capacitor C1$n$ and smoothing capacitor C2 are diodes D3$j$ (j=1, 2, ... and m; m=n−1). Connected in parallel to the capacitors C1$i$ (i=1, 2, ... and n) is a control means for adjusting voltages across the capacitors C1$i$. The control means comprises inductors L1, switching elements SW2$i$ (i=1, 2, ... and n) and SW3, and diodes D1$i$ (i=1, 2, ... and n) and D2. Switching elements SW2$i$ (i=1, 2, ... and n) are connected between one ends of the capacitors C1$i$ (i=1, 2, ... and n) and one end of the inductor L1 respectively. Diodes D1$j$ (j=1, 2, ... and m; m=n−1) are connected between the other ends of capacitors C1$j$ (j=1, 2, ... and m; m=n−1) and the other end of the inductor L1 through switching elements SW4$j$ (j=1, 2, ... and m; m=n−1) respectively. Diodes D1$n$ are connected between the other ends of the capacitors C1$n$ and the other end of the inductor L1. Also connected between junction points of the inductor L1 and diodes D11, D12, ... and D1$n$ and ground is the switching element SW3. For the purpose of sending the energy remaining in the inductor L1 to the load circuit, the diode D2 is connected between a junction point of the switching element SW21, SW22, ... and SW2$n$ and inductor L1 and ground. In the case of FIG. 20, the n is set at 3 as an example.

Explanation will be made as to the operation of the present embodiment below. First, the voltage Vin applied from the A.C. power source AC is rectified at the full-wave rectifier DB and then output therefrom as the input voltage V1. When the switching elements SW1 and SW41, ... and SW4$m$ (m=n−1) are turned ON in response to a control signal received from the control circuit, voltages corresponding to sums of voltages across the capacitors C11, ... and C1$n$ and across the smoothing capacitor C2 are charged up to the input pulsative voltage V1. Then the operation of the present embodiment after the switching elements SW1 and SW41, ... and SW4$m$ (m=n−1) are turned OFF will be explained. In a mountain part of the input pulsative voltage V1 in which the voltage V1 is higher than the output voltage Vout, the switching elements SW2$i$ (i=1, 2, ... and n) are turned ON on a time division basis. This causes part of the energy of the capacitor C1$i$ to be moved to the inductor L1 and then stored therein as the magnetic energy.

The energy temporarily stored in the inductor L1 through the above process is all sent to the load circuit through the diode D13 as soon as the switching element SW2$i$ is turned OFF to turn ON the diode D2. The excessive energy stored in the capacitor C1$i$ in this manner is sent to the load circuit through the inductor L1. When this operation is completed, the voltage across the capacitor C1$k$ (k=i+1; i=1, 2, . . . and m; m=n−1) is then adjusted in substantially the same manner as the above. Such operation is repeated to effectively adjust the voltages across all the capacitors C1$i$. As a result, the voltage applied to the inductor L1 can be decreased and the value of the inductor L1 can be made small. This repetition causes the voltage of the smoothing capacitor C2 to be gradually increased. A sum of voltages across the capacitors C11, . . . and C1$n$ are memorized or stored as a voltage corresponding to a difference between the input pulsative voltage V1 and output voltage Vout so that, when the switching elements SW1, SW41, SW42, . . . and SW4$m$ (m=n−1) are in their ON state, the input pulsative voltage V1 is connected in series with the capacitors C11, C12, . . . and C1$n$ to supply a constant voltage to the load circuit. Further, the ON time of the switching elements SW2$i$ is controlled so that the voltage V2 corresponding to a sum of the voltages across the capacitors C11, . . . and C1$n$ and smoothing capacitor C2 immediately prior to the turning ON of the switching elements SW1, SW41, SW42, . . . and SW4$m$ (m=n−1) becomes similar in waveform to the full-wave-rectified output V1, whereby the envelope line of the input current waveform is made similar to the input voltage waveform to suppress the input harmonics distortion. When this similitude ratio is changed by adjusting the ON time of the switching element SW2$i$ (i=1, 2, . . . , and n), the peak value of the input current varies and the output voltage increases or decreases. As a result, the resultant power supply apparatus can adjust its output voltage.

As has been mentioned above, the A.C. power source AC is connected with the full-wave rectifier DB which in turn is connected at its output ends with a series circuit of the switching element SW1, capacitor C11, switching element SW41, capacitor C12, switching element SW42, . . . , capacitor C1$m$, switching element SW4$m$ (m=n−1), capacitor C1$n$, and the parallel circuit of the smoothing capacitor C2 and load R. Also connected to junction points of the capacitor C11 and switching element SW41, the capacitor C12 and switching element SW42, . . . , the capacitor C1$m$ and switching element SW4$m$ (m=n−1), and the capacitor C1$n$ and smoothing capacitor C2 are diodes D3$j$ (j=1, 2, . . . and m; m=n−1). Connected in parallel to the capacitors C1$i$ (i=1, 2, . . . and n) is the control means for adjusting voltages across the capacitors C1$i$. When the voltages across the capacitors C1$i$ are controlled by the control means, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 10

Figure 22:
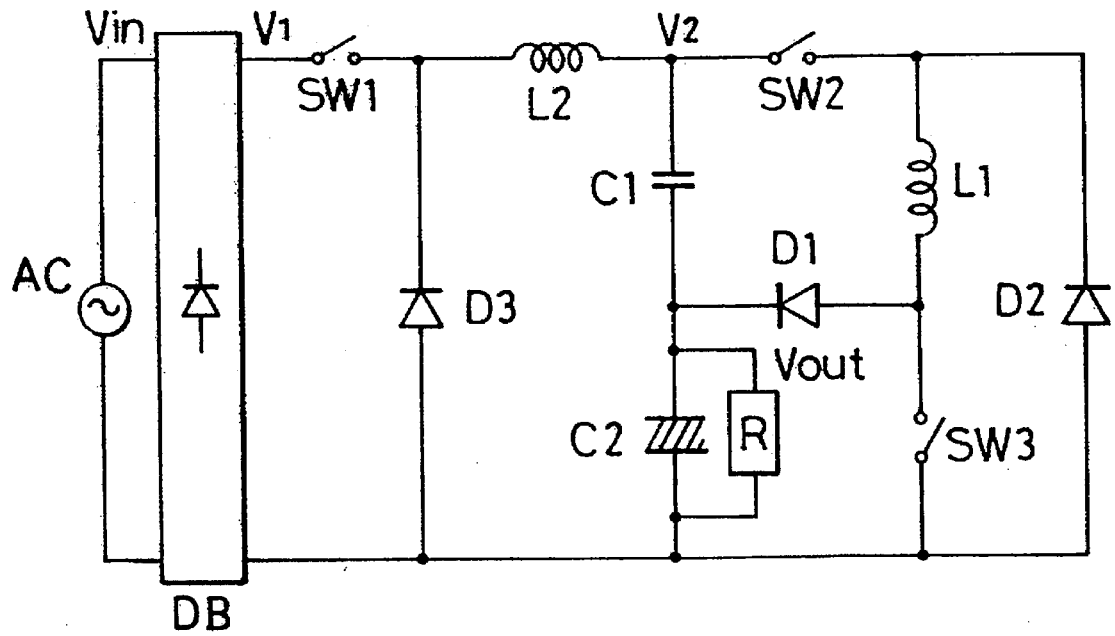
FIG. 22 is a circuit diagram of a tenth embodiment in accordance with the present invention.
Figure 23:
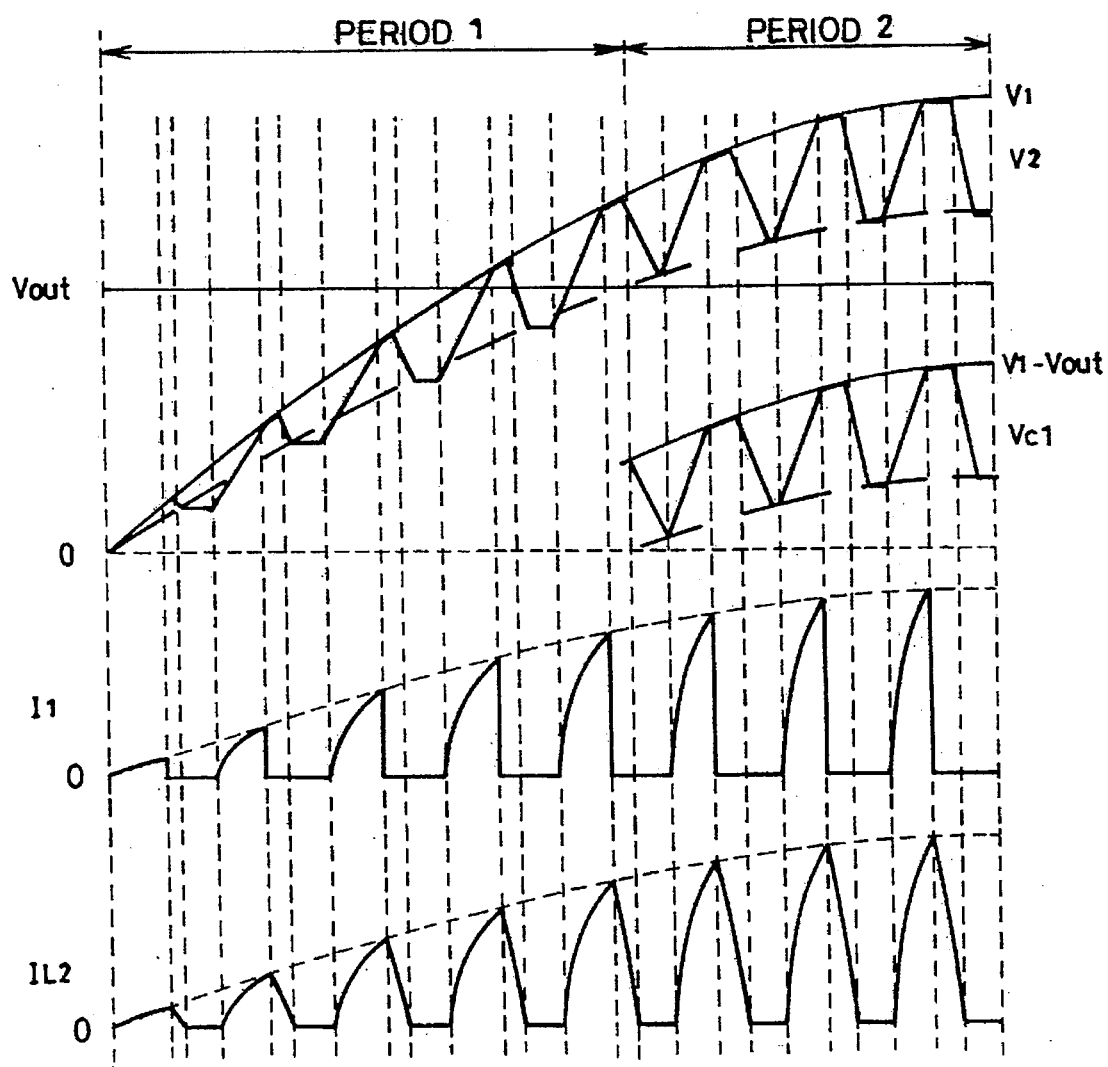
FIG. 23 shows waveforms of signals appearing at points in the tenth embodiment of FIG. 22 of the present invention.

A circuit diagram of a tenth embodiment of the present invention is shown in FIG. 22 and waveforms of signals in the present embodiment are shown in FIG. 23. In the present embodiment, the A.C. power source AC is connected with the full-wave rectifier DB which in turn is connected at its output ends with the switching element SW1 and diode D3, a series circuit of the inductor L2, capacitor C1 and a parallel circuit of the smoothing capacitor C2 and load R is connected in parallel to the diode D3, and a control means for adjusting the voltage across the capacitor C1 is connected in parallel to the capacitor C1. The control means comprises the inductor L1, switching elements SW2 and SW3, add diodes D1 and D2. Connected across the capacitor C1 is a series circuit of the switching element SW2, inductor L1 and diode D1. Connected between a junction point of the inductor L1 and diode D1 and ground is the switching element SW3. For the purpose of sending the energy remaining in the inductor L1 to the load circuit, the diode D2 is connected between a junction point of the switching element SW2 and inductor L1 and ground.

Explanation will be made as to the operation of the present embodiment below. First, the voltage Vin applied from the A.C. power source AC is rectified at the full-wave rectifier DB and then output therefrom as the input voltage V1. When the switching element SW1 is turned ON in response to a control signal received from the control circuit, the resonance of the inductor L2, capacitor C1 and smoothing capacitor C2 causes the capacitor C1 and smoothing capacitor C2 to be charged. When the turning OFF of the switching element SW1 causes the turning ON of the diode D3, whereby the energy stored in the inductor L2 further charges the capacitor C1 and smoothing capacitor C2. Then the operation of the present embodiment after the current flowing through the inductor L2 becomes zero will be explained. In a mountain part of the input pulsative voltage V1 in which the voltage V1 is higher than the output voltage Vout, only the switching element SW2 is turned ON. This causes the capacitor C1 to be connected to the inductor L1 so that part of the energy of the capacitor C1 is moved to the inductor L1 and then stored therein as the magnetic energy. In a valley part of the input pulsative voltage V1 in which the voltage V1 is lower than the output voltage Vout, the switching elements SW2 and SW3 are turned ON. This causes the capacitor C1 to be connected to the smoothing capacitor C2 and inductor L1 so that part of the energy of the capacitor C2 is moved to the inductor L1 and then stored therein as the magnetic energy, while charging the capacitor C1. The energy temporarily stored in the inductor L1 through the above process is all sent to the load circuit through the diode D1 as soon as the switching element SW2 (and SW3) is turned OFF to turn ON the diode D2. The excessive energy stored in the capacitor C1 in this manner is sent to the load circuit through the inductor L1 to effectively adjust the voltage of the capacitor C1. This operation causes the voltage across the smoothing capacitor C2 to be gradually increased. The capacitor C1 acts to memorize or store therein a voltage corresponding to a difference between the input pulsative voltage V1 and output voltage Vout so that, when the switching element SW1 is in the ON state, the input pulsative voltage V1 is connected in series with the capacitor C1 to supply a constant voltage to the load circuit. Further, the ON time of the switching element SW2 (and SW3) is controlled so that the voltage V2 corresponding to a sum of the voltages across the capacitor C1 and smoothing capacitor C2 immediately prior to the turning ON of the switching element SW1 becomes similar in waveform to the full-wave-rectified output V1 to make the ON time of the switching element SW1 constant, whereby the envelope line of the input current waveform is made similar to the input voltage waveform. Further, the current waveform based on such control and resonance enables the input harmonics distortion to be suppressed, and the current limiting action of the inductor L1 enables the envelope line of the input current waveform to be made small. When this similitude ratio is changed by adjusting the ON time of the switching element SW2 (and SW3), the peak value of the input current varies and the output voltage increases or decreases. As a result, the resultant power supply apparatus can adjust its output voltage.

As has been mentioned above, the A.C. power source AC is connected with the full-wave rectifier DB which in turn is connected at its output ends with the switching element SW1 and diode D3, the series circuit of the inductor L2, capacitor C1 and the parallel circuit of the smoothing capacitor C2 and load R is connected in parallel to the diode D3, and the control means including the inductor L1, switching elements SW2 and SW3, and diodes D1 and D2 for adjusting the voltage across the capacitor C1 is connected in parallel to the capacitor C1. When the voltage across the capacitor C1 is controlled by the control means, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 11

Figure 24:
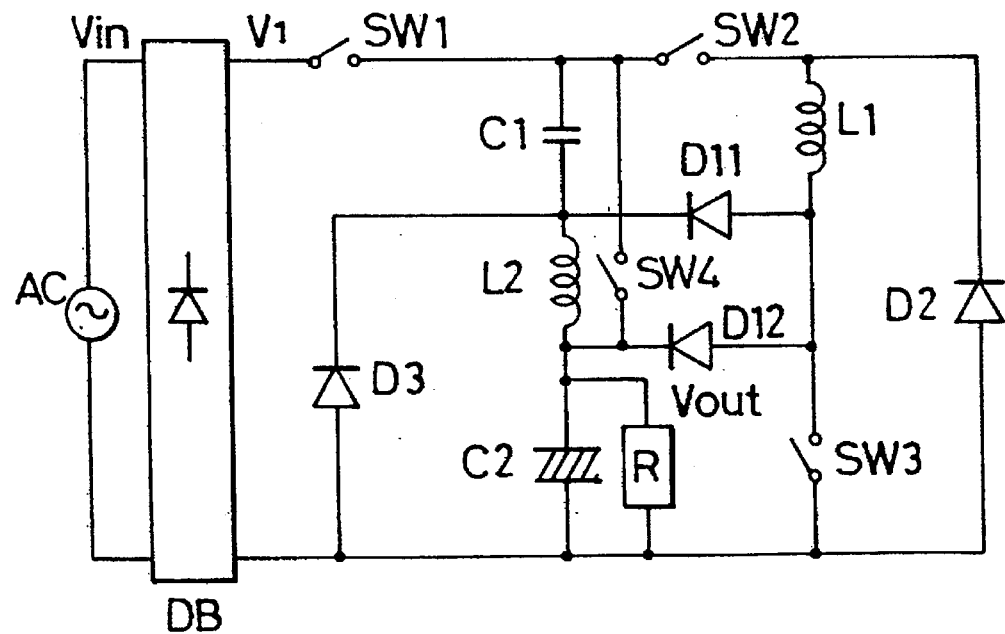
FIG. 24 is a circuit diagram of an eleventh embodiment in accordance with the present invention.

A circuit diagram of an eleventh embodiment of the present invention is shown in FIG. 24. In the present embodiment, the A.C. power source AC is connected with the full-wave rectifier DB which in turn is connected at its output ends with the switching element SW1, capacitor C1, inductor L2 and a parallel circuit of the smoothing capacitor C2 and load R in series, the diode D3 is connected in parallel to a series circuit of the inductor L2 and smoothing capacitor C2, and a control means for adjusting the voltage across the capacitor C1 is connected in parallel to the capacitor C1. The control means comprises the inductor L1, switching elements SW2, SW3 and SW4, and diodes D11, D12 and D2. Connected across the capacitor C1 is a series circuit of the switching element SW2, inductor L1 and diode D11. Connected between a junction point of the inductor L1 and diode D11 and a junction point of the inductor L2 and smoothing capacitor C2 is the diode D12. The switching element SW3 is provided between a junction point of the inductor L1 and diode D11 and ground. The switching element SW4 is connected in parallel to a series circuit of the capacitor C1 and inductor L2. For the purpose of sending the energy remaining in the inductor L1 to the load circuit, the diode D2 is connected between a junction point of the switching element SW2 and inductor L1 and ground.

Explanation will be made as to the operation of the present embodiment below. First, the voltage Vin applied from the A.C. power source AC is rectified at the rectifier DB and then output therefrom as the input voltage V1. When the switching element SW1 is turned ON in response to a control signal received from the control circuit, the resonance of the capacitor C1, inductor L2, and smoothing capacitor C2 causes the capacitor C1 and smoothing capacitor C2 to be charged. When the turning OFF of the switching element SW1 causes the turning ON of the diode D3, whereby the energy stored in the inductor L2 is sent to the load circuit. As a result, the voltage across the inductor L2 can reach the output voltage Vout at most.

Then the operation of the present embodiment after the current flowing through the inductor L2 becomes zero will be explained. In a mountain part of the input pulsative voltage V1 in which the voltage V1 is higher than the output voltage Vout, only the switching element SW2 is turned ON. This causes the capacitor C1 to be connected to the inductor L1 in series so that part of the energy of the capacitor C1 is moved to the inductor L1 and then stored therein as the magnetic energy. In a valley part of the input pulsative voltage V1 in which the voltage V1 is lower than the output voltage Vout, the switching elements SW2 and SW3 are turned ON. This causes the capacitor C1 to be connected to the smoothing capacitor C2 and inductors L1 and L2 in series so that part of the energy of the capacitor C2 is moved to the inductors L1 and L2 and then stored therein as the magnetic energy, while charging the capacitor C1. The energy temporarily stored in the inductor L1 through the above process is all sent to the smoothing capacitor C2 through the diode D12 as soon as the switching element SW2 (and SW3) is turned OFF to turn ON the diode D2. In the valley part, the energy stored in the inductor L2 causes the turning ON of the switching element SW4 to charge the capacitor C1, as soon as the switching elements SW2 and SW3 are turned OFF.

As has been mentioned above, the excessive energy stored in the capacitor C1 in this manner is sent to the load circuit through the inductor L1 to effectively adjust the voltage of the capacitor C1. This operation causes the voltage across the smoothing capacitor C2 to be gradually increased. The capacitor C1 acts to memorize or store therein a voltage corresponding to a difference between the input pulsative voltage V1 and output voltage Vout so that, when the switching element SW1 is in the ON state, the input pulsative voltage V1 is connected in series with the capacitor C1 to supply a constant voltage to the load circuit. Further, the ON time of the switching element SW2 (and SW3) is controlled so that the voltage V2 corresponding to a sum of the voltages across the capacitor C1 and smoothing capacitor C2 immediately prior to the turning ON of the switching element SW1 becomes similar in waveform to the full-wave-rectified output V1 to make the ON time of the switching element SW1 constant, whereby the envelope line of the input current waveform is made similar to the input voltage waveform. Further, the current waveform based on such control and resonance enables the input harmonics distortion to be suppressed, and the current limiting action of the inductor L1 enables the envelope line of the input current waveform to be made small. When this similitude ratio is changed by adjusting the ON time of the switching element SW2 (and SW3), the peak value of the input current varies and the output voltage increases or decreases. As a result, the resultant power supply apparatus can adjust its output voltage.

As has been mentioned above, the A.C. power source AC is connected with the full-wave rectifier DB which in turn is connected at its output ends with the switching element SW1, capacitor C1, inductor L2 and the parallel circuit of the smoothing capacitor C2 and load in series, the diode D3 is connected in parallel to the series circuit of the inductor L2 and smoothing capacitor C2, and the control means for adjusting the voltage across the capacitor C1 is connected in parallel to the capacitor C1. When the voltage across the capacitor C1 is controlled by the control means, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 12

Figure 25:
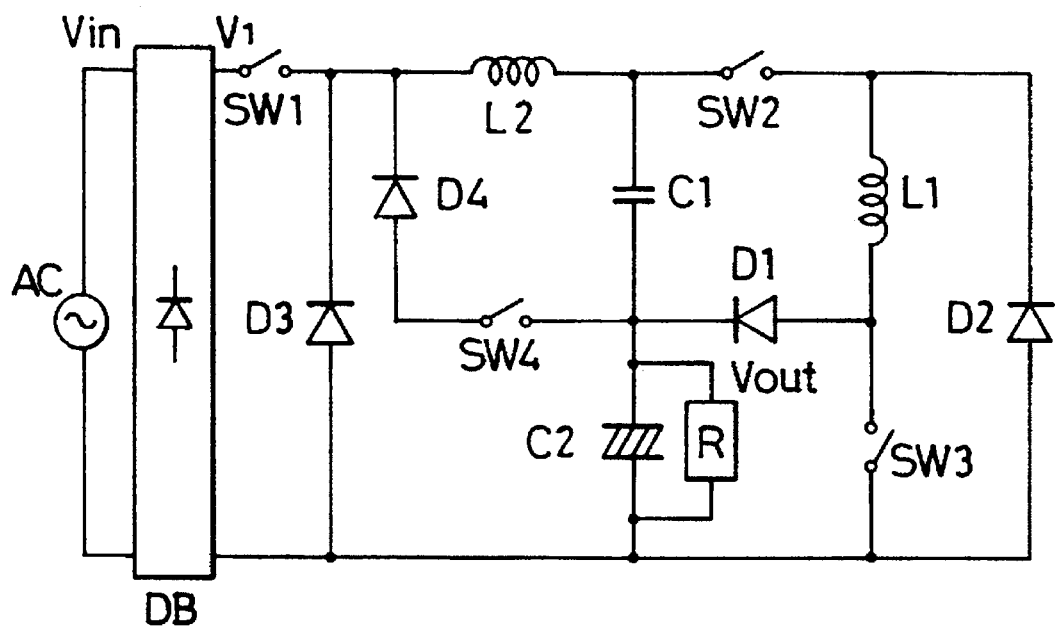
FIG. 25 is a circuit diagram of a twelfth embodiment in accordance with the present invention.

A circuit diagram of a twelfth embodiment of the present invention is shown in FIG. 25. In the present embodiment, the A.C. power source AC is connected with the full-wave rectifier DB which in turn is connected at its output ends with the switching element SW1 and diode D3, the inductor L2, capacitor C1 and a parallel circuit of the smoothing capacitor C2 and load R is connected across the diode D3, a series circuit of the diode D4 and switching element SW4 is connected in parallel to a series circuit of the inductor L2 and capacitor C1, and a control means for adjusting the voltage across the capacitor C1 is connected in parallel to the capacitor C1. The control means comprises the inductor L1, switching elements SW2 and SW3, and diodes D1 and D2. Connected across the capacitor C1 is a series circuit of the switching element SW2, inductor L1 and diode D1. Connected between a junction point of the inductor L1 and diode D1 and ground is the switching element SW3. For the purpose of sending the energy remaining in the inductor L1 to the load circuit, the diode D2 is connected between a junction point of the switching element SW2 and inductor L1 and ground.

Explanation will be made as to the operation of the present embodiment below. First, the voltage Vin applied from the A.C. power source AC is rectified at the full-wave rectifier DB and then output therefrom as the input voltage V1. When the switching element SW1 is turned ON in response to a control signal received from the control circuit, the resonance of the inductor L2, capacitor C1, and smoothing capacitor C2 causes the capacitor C1 and smoothing capacitor C2 to be charged. After the switching element SW1 is turned OFF, in a mountain part of the input pulsative voltage V1 in which the voltage V1 is higher than the output voltage Vout, when the turning ON of the switching element SW4 causes the turning ON of the diode D4, whereby the energy stored in the inductor L2 is used to further charge the capacitor C1. In a valley part of the input pulsative voltage V1 in which the voltage V1 is lower then the output voltage Vout, when the switching element SW4 remains in its OFF state, the diode D3 is turned ON so that the energy stored in the inductor L2 causes the smoothing capacitor C2 to be charged. As a result, the voltage applied to the inductor L2 can reach the output voltage Vout at most.

The operation of the present embodiment after the current flowing through the inductor L2 then becomes zero will be explained. In the mountain part, only the switching element SW2 is turned ON. This causes the capacitor C1 to be connected to the inductor L1 in series so that part of the energy of the capacitor C1 is moved to the inductor L1 and then stored therein as the magnetic energy. In the valley part, the switching elements SW2 and SW3 are turned ON. This causes the capacitor C1 to be connected to the smoothing capacitor C2 and inductor L1 in series so that part of the energy of the capacitor C2 is moved to the inductor L1 and then stored therein as the magnetic energy, while charging the capacitor C1. The energy temporarily stored in the inductor L1 through the above process is sent to the load circuit through the diode D1 as soon as the switching element SW2 (and SW3) is turned OFF to turn ON the diode D2.

The excessive energy stored in the capacitor C1 in this manner is sent to the load circuit through the inductor L1 to effectively adjust the voltage of the capacitor C1. This operation causes the voltage across the smoothing capacitor C2 to be gradually increased. The capacitor C1 acts to memorize or store therein a voltage corresponding to a difference between the input pulsative voltage V1 and output voltage Vout so that, when the switching element SW1 is in the ON state, the input pulsative voltage V1 is connected in series with the capacitor C1 to supply a constant voltage to the load circuit. Further, the ON time of the switching element SW2 (and SW3) is controlled so that the voltage V2 corresponding to a sum of the voltages across the capacitor C1 and smoothing capacitor C2 immediately prior to the turning ON of the switching element SW1 becomes similar in waveform to the full-wave-rectified output V1 to make the ON time of the switching element SW1 constant, whereby the envelope line of the input current waveform is made similar to the input voltage waveform. Further, the current waveform based on such control and resonance enables the input harmonics distortion to be suppressed, and the current limiting action of the inductor enables the envelope line of the input current waveform to be made small. When this similitude ratio is changed by adjusting the ON time of the switching element SW2 (and SW3), the peak value of the input current varies and the output voltage increases or decreases. As a result, the resultant power supply apparatus can adjust its output voltage.

As has been mentioned above, the A.C. power source AC is connected with the full-wave rectifier DB which in turn is connected at its output ends with the switching element SW1 and diode D3, the inductor L2, capacitor C1 and the parallel circuit of the smoothing capacitor C2 and load R is connected across the diode D3, the series circuit of the diode D4 and switching element SW4 is connected in parallel to the series circuit of the inductor L2 and capacitor C1, and the control means including the inductor L1, switching elements SW2 and SW3, and diodes D1 and D2 is connected in parallel to the capacitor C1. When the voltage across the capacitor C1 is controlled by the control means, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 13

Figure 26:
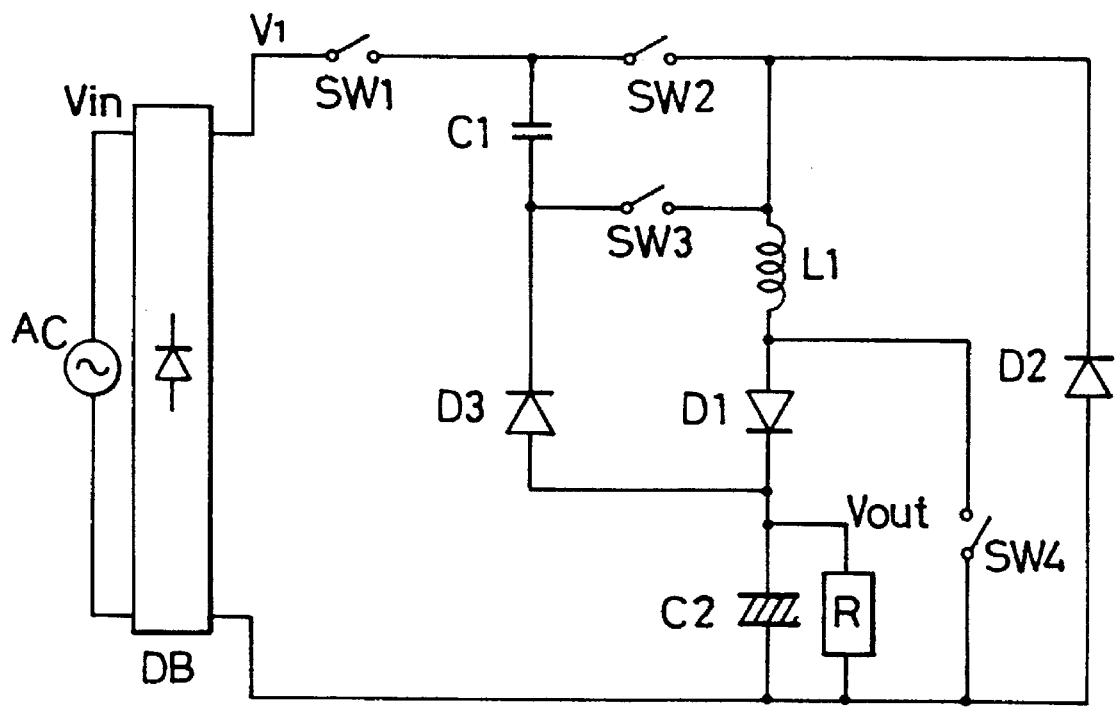
FIG. 26 is a circuit diagram of a thirteenth embodiment in accordance with the present invention.

FIG. 26 shows a circuit diagram of a thirteenth embodiment of the present invention. In the present embodiment, the A.C. power source AC is connected with the full-wave rectifier DB which in turn is connected at its output ends with the switching element SW1, capacitor C1, switching element SW3, inductor L1, diode D1 and a parallel circuit of the smoothing capacitor C2 and load R in series, and the diode D3 is connected between a junction point of the capacitor C1 and switching element SW3 and a junction point of the diode D1 and smoothing capacitor C2. The switching element SW2 is connected in parallel to a series circuit of the capacitor C1 and switching element SW3, and the switching element SW4 is connected in parallel to a series circuit of the diode D1 and smoothing capacitor C2. For the purpose of sending the energy remaining in the inductor L1 to the load circuit, the diode D2 is connected between a junction point of the switching element SW2 and inductor L1 and ground.

Figure 27A:
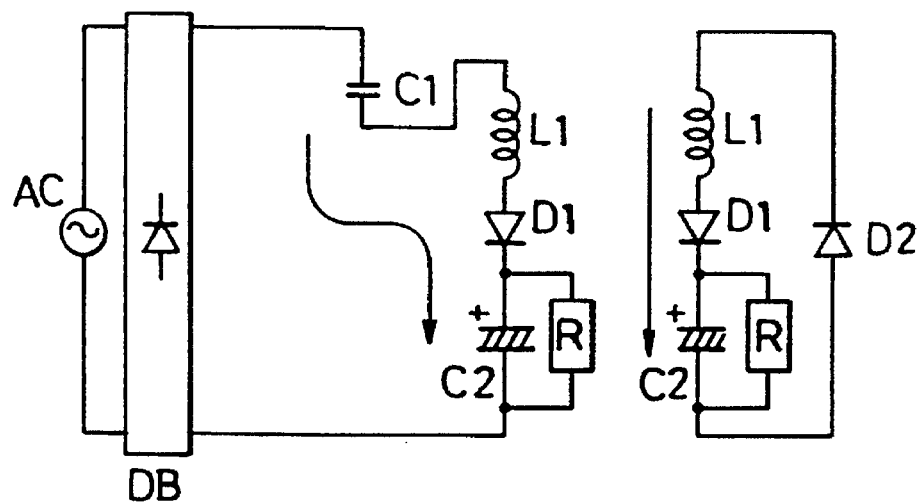
FIG. 27 is an equivalent circuit showing a first state of the thirteenth embodiment of FIG. 26 of the invention.
Figure 27B:
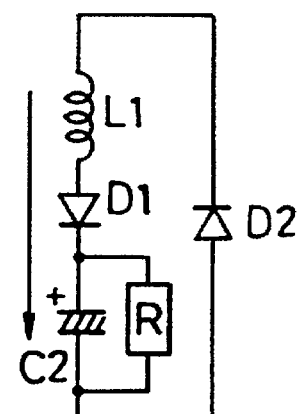

Explanation will be made as to the operation of the present embodiment below. First, the voltage Vin applied from the A.C. power source AC is rectified at the full-wave rectifier DB and then output therefrom as the input voltage V1. When the switching elements SW1 and SW3 are turned ON in response to a control signal received from the control circuit, the resonance of the capacitor C1, smoothing capacitor C2 and inductor L1 causes the capacitor C1 and smoothing capacitor C2 to be charged, which operation will be referred to as state 1A. The turning OFF of the switching element SW1 causes the turning ON of the diode D2, whereby the energy stored in the inductor L1 is used to charge the load circuit, which operation will be referred to as state 1B. These states 1A and 1B are shown in FIGS. 27A and 27B by equivalent circuits.

Figure 28A:
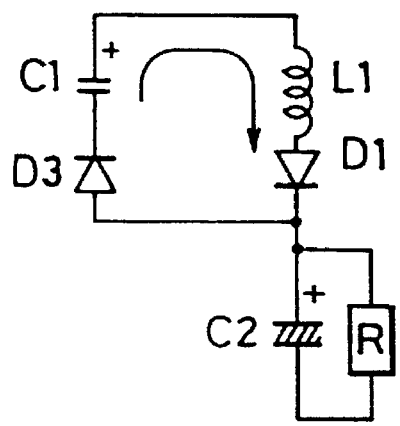
FIG. 28 is an equivalent circuit showing a second state of the thirteenth embodiment of FIG. 26 of the invention.
Figure 28B:
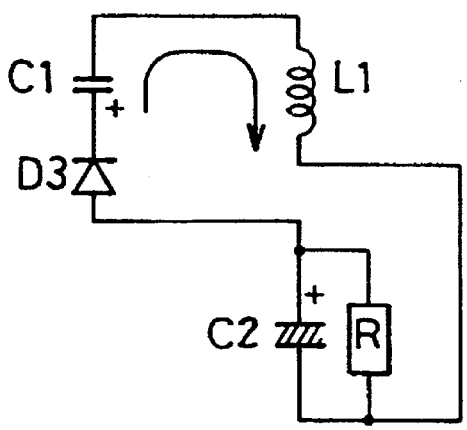

After the current flowing through the inductor L1 becomes zero, in a mountain part of the input pulsative voltage V1 in which the voltage V1 is higher than the output voltage Vout, only the switching element SW2 is turned ON. This causes the capacitor C1 to be connected to the inductor L1 so that part of the energy of the capacitor C1 is moved to the inductor L1 and then stored therein as the magnetic energy. Which operation will be referred to as state 2A. In a valley part of the input pulsative voltage V1 in which the voltage V1 is lower than the output voltage Vout, the switching elements SW2 and SW4 are turned ON. This causes the capacitor C1 to be connected to the smoothing capacitor C2 and inductor L1 in series so that part of the energy of the capacitor C2 is moved to the inductor L1 and then stored therein as the magnetic energy, while charging the capacitor C1. Which operation will be referred to as state 2B. These states 2A and 2B are shown in FIGS. 28A and 28B by equivalent circuits.

Figure 29:
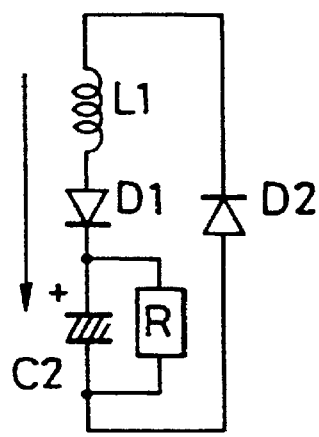
FIG. 29 is an equivalent circuit showing a third state of the thirteenth embodiment of FIG. 26 of the invention.

The energy temporarily stored in the inductor L1 through the above process is all sent to the load circuit through the diode D1 as soon as the switching element SW2 (and SW4) is turned OFF. Which operation will be referred to as state 3 and shown in FIG. 29 by an equivalent circuits. The excessive energy stored in the capacitor C1 in this manner is sent to the load circuit through the inductor L1 to effectively adjust the voltage of the capacitor C1. This operation causes the voltage across the smoothing capacitor C2 to be gradually increased. The capacitor C1 acts to memorize or store therein a voltage corresponding to a difference between the input pulsative voltage V1 and output voltage Vout so that, when the switching element SW1 is in their ON state, the input pulsative voltage V1 is connected in series with the capacitor C1 to supply a constant voltage to the load circuit. Further, the ON time of the switching element SW2 (and SW4) is controlled so that the voltage V2 corresponding to a sum of the voltages across the capacitor C1 and smoothing capacitor C2 immediately prior to the turning ON of the switching element SW1 becomes similar in waveform to the full-wave-rectified output V1 to make the ON time of the switching element SW1 constant, whereby the envelope line of the input current waveform is made similar to the input voltage waveform. The current waveform based on such control and resonance enables the input harmonics distortion to be suppressed, and the current limiting action of the inductor L1 enables the envelope line of the input current waveform to be made small.

As explained above, in the present embodiment, the single inductor L1 has functions of reducing the input current and adjusting the voltage across the capacitor C1. Further, when this similitude ratio is changed by adjusting the ON time of the switching element SW2 (and SW4), the peak value of the input current varies and thus the output voltage increases or decreases. Thus the circuit of the present embodiment can adjust its output voltage.

As has been mentioned above, the commercial A.C. power source AC is connected with the full-wave rectifier DB which in turn is connected at its output ends with the switching element SW1, capacitor C1, switching element SW3, inductor L1, diode D1 and the parallel circuit of the smoothing capacitor C2 and load R in series. And the diode D3 is connected between the junction point of the capacitor C1 and switching element SW3 and one end of the diode D1. The switching element SW2 is connected in parallel to the series circuit of the capacitor C1 and switching element SW3, and the switching element SW4 is connected in parallel to the series circuit of the diode D1 and smoothing capacitor C2. For the purpose of sending the energy remaining in the inductor L1 to the load circuit, the diode D2 is connected between the junction point of the switching element SW2 and inductor L1 and ground. Thus when the voltage across the capacitor C1 is controlled, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 14

Figure 30:
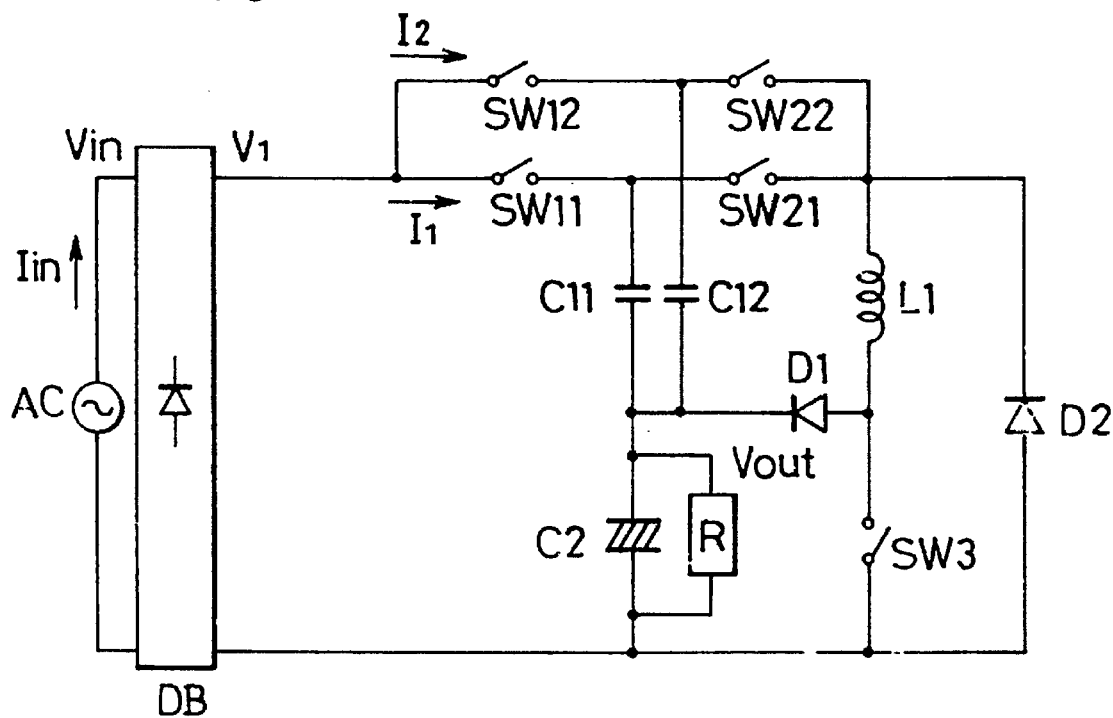
FIG. 30 is a circuit diagram of a fourteenth embodiment in accordance with the present invention.
Figure 31:
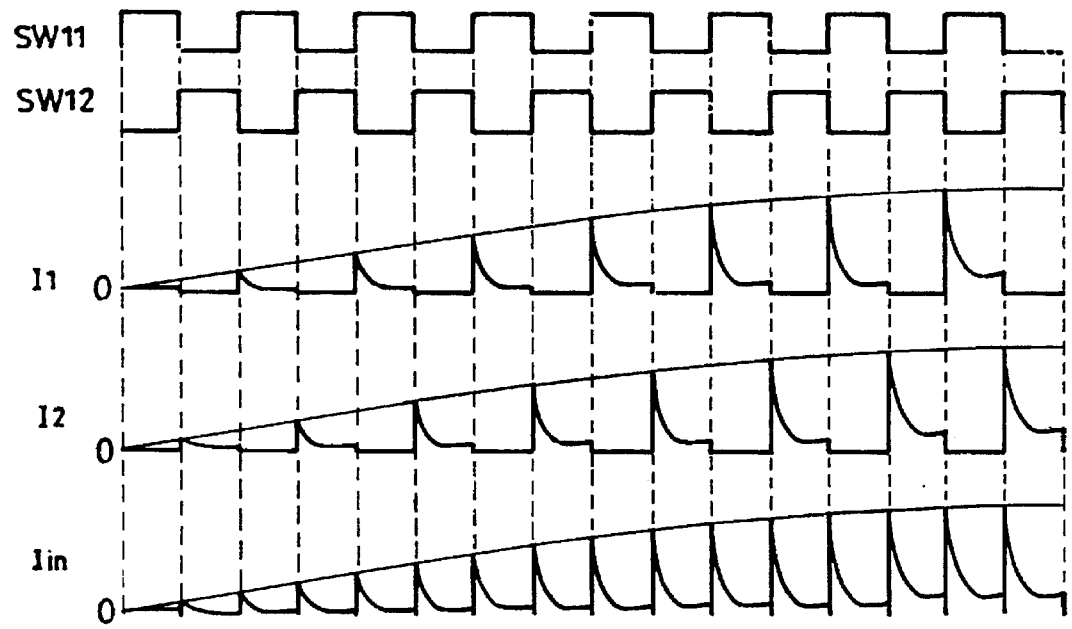
FIG. 31 shows waveforms of signals appearing at points in the fourteenth embodiment of the present invention.

FIG. 30 shows a circuit diagram of a fourteenth embodiment of the present invention and FIG. 31 shows waveforms of signals including the input current in the present embodiment. The present embodiment corresponds to the eighth embodiment but n is set at 2. The voltage Vin applied from the A.C. power source AC is first rectified at the full-wave rectifier DB and then output therefrom as the pulsative voltage V1. When the switching element SW11 is turned ON in response to a control signal received from the control circuit, a voltage corresponding to a sum of the voltages across the capacitor C11 and smoothing capacitor C2 is charged up to the input pulsative voltage V1. As soon as the switching element SW11 is turned OFF to turn ON the switching element SW12, a voltage corresponding to a sum of the voltages across the capacitor C12 and smoothing capacitor C2 is charged up to the input pulsative voltage V1. The operation of the switching elements SW11 and SW12 on the time division basis causes the input current Iin to be continuously drawn.

Next, during the ON state of the switching element SW12, the present embodiment operates as follows. That is, in a mountain part of the input pulsative voltage V1 in which the voltage V1 is higher than the output voltage Vout, the switching element SW21 is turned ON. This causes the capacitor C11 to be connected to the inductor L1 in series so that part of the energy of the capacitor C11 is moved to the inductor L1 and then stored therein as the magnetic energy. Further, in a valley part of the input pulsative voltage V1 in which the voltage V1 is lower than the output voltage Vout, the switching element SW3 remains in its ON state. This causes the capacitor C11 to be connected to the smoothing capacitor C2 and inductor L1 so that part of the energy of the capacitor C2 is moved to the inductor L1 and then stored therein as the magnetic energy, while charging the capacitor C11.

As mentioned above, the energy temporarily stored in the inductor L1 through the above process is all sent to the load circuit through the diode D1 as soon as the switching element SW21 (and SW3) is turned OFF to turn ON the diode D2. As soon as the switching element SW12 is turned OFF, the switching element SW11 is again turned ON so that the same operation as the above switching element SW21 causes adjustment of the voltage across the capacitor C12 with respect to the switching element SW22. The excessive energy stored in the capacitors C11 and C12 in this manner is sent to the load circuit through the inductor L1 to effectively adjust the voltages of the capacitors C11 and C12. This repetition causes the voltage across the smoothing capacitor C2 to be gradually increased.

The capacitors C11 and C12 act to memorize or store therein a voltage corresponding to a difference between the input pulsative voltage V1 and output voltage Vout so that, when the switching element SW11 is in its ON state, the input pulsative voltage V1 is connected in series with the capacitor C11 while, when the switching element SW12 is in its ON state, the input pulsative voltage V1 is connected in series with the capacitor C12 to thereby supply a constant voltage to the load circuit. Further, the ON time of the switching elements SW21 and SW22 (and SW3) is controlled so that the voltage corresponding to a sum of the voltages across the capacitor C11 and smoothing capacitor C2 immediately prior to the turning ON of the switching element SW11 as well as the voltage corresponding to a sum of the voltages across the capacitor C12 and smoothing capacitor C2 immediately prior to the turning ON of the switching element SW12 become similar in waveform to the full-wave-rectified output V1, whereby the envelope line of the input current waveform is made similar to the input voltage waveform. Further, when the switching elements SW11 and SW12 are operated on the time division basis to continuously draw the input current Iin, the input harmonics distortion is suppressed. When this similitude ratio is changed by adjusting the ON time of the switching elements SW21 and SW22 (and SW3), the peak value of the input current varies and the output voltage increases or decreases. As a result, the resultant power supply apparatus can adjust its output voltage.

As has been mentioned above, the A.C. power source AC is connected with the full-wave rectifier DB which in turn is connected at its output ends with a parallel circuit of the switching elements SW11 and capacitor C11 and a parallel circuit of the switching elements SW12 and capacitor C12 in parallel to each other. A control means including the inductor L1, switching elements SW21, SW22 and SW3 and diodes D1 and D2 is connected in parallel to the capacitors C11 and C12. When the voltages across the capacitors C11 and C12 are controlled by the control means, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 15

Figure 32:
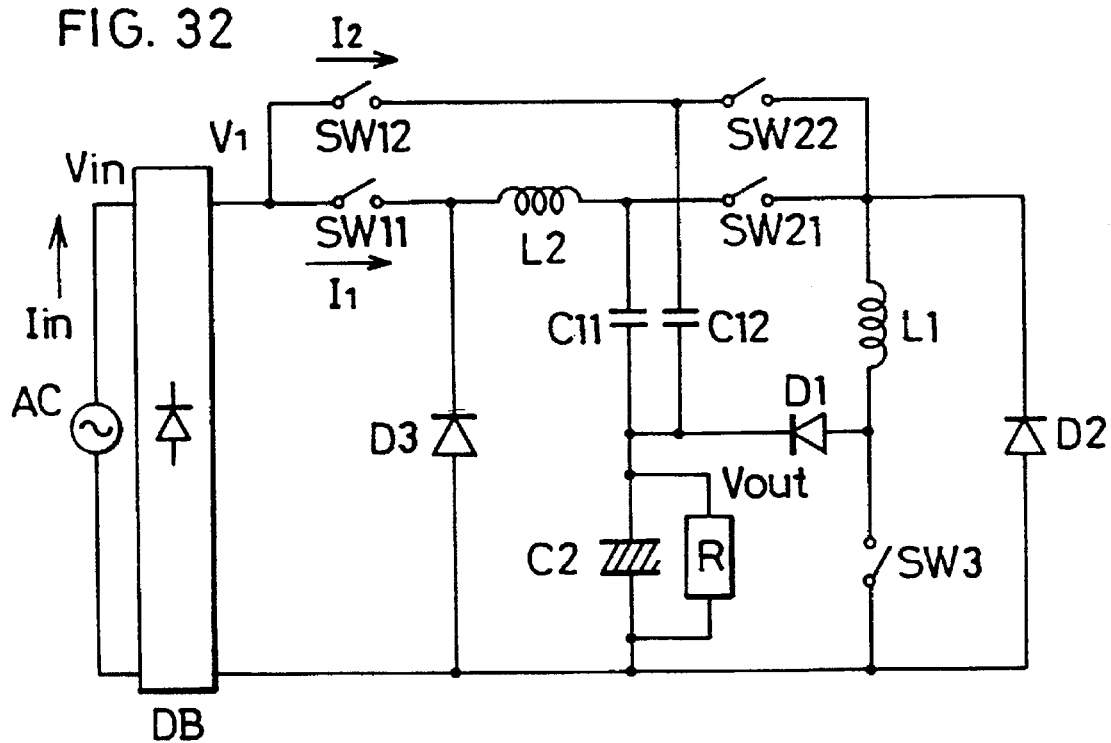
FIG. 32 is a circuit diagram of a fifteenth embodiment in accordance with the present invention.
Figure 33:
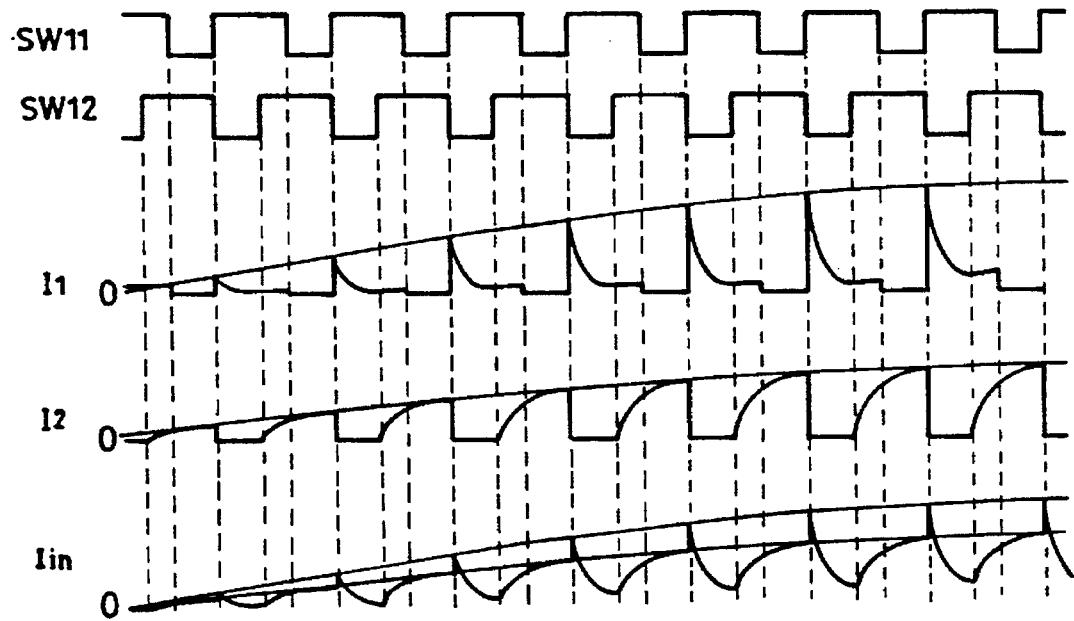
FIG. 33 shows waveforms of signals appearing at points in the fifteenth embodiment of FIG. 32 of the present invention.

A circuit diagram of a fifteenth embodiment of the present invention is shown in FIG. 32. And waveforms of signals including the input current in the present embodiment are shown in FIG. 33. In the present embodiment, the A.C. power source AC is connected with the full-wave rectifier DB which in turn is connected at its output ends with the switching element SW11 and diode D3, and the inductor L2, capacitor C11 and a parallel circuit of the smoothing capacitor C2 and load R is connected in parallel to the diode D3. A series circuit of the switching element SW12 and capacitor C12 is provided between an output of the full-wave rectifier DB and a junction point of the capacitor C11 and smoothing capacitor C2. A control means for adjusting the voltages across the capacitors C11 and C12 is connected in parallel to the capacitors C11 and C12. The control means comprises the inductor L1, switching elements SW21, SW22 and SW3, and diodes D1 and D2. Connected across the capacitor C11 is a series circuit of the switching element SW21, inductor L1 and diode D1. Provided between the capacitor C12 and inductor L1 is the switching element SW22. Connected between a junction point of the inductor L1 and diode D1 and ground is the switching element SW3.

For the purpose of sending the energy remaining in the inductor L1 to the load circuit, the diode D2 is connected between a junction point of the switching elements SW21, SW22 and inductor L1 and ground.

Explanation will be made as to the operation of the present embodiment below. First, the voltage Vin applied from the A.C. power source AC is rectified at the full-wave rectifier DB and then output therefrom as the input voltage V1. When the switching element SW11 is turned ON in response to a control signal received from the control circuit, the resonance of the inductor L2 and capacitor C11 causes the capacitor C11 and smoothing capacitor C2 to be charged. As soon as the switching element SW11 is turned OFF, the switching element SW12 is turned ON so that a voltage corresponding to a sum of the voltages across the capacitor C12 and smoothing capacitor C2 is charged up to the input pulsative voltage V1. In this case, the diode D3 is turned ON so that the energy stored in the inductor L2 is sent to the capacitor and smoothing capacitor C2. When the charging of the capacitor C12 causes gradual drop of the input current I2, the switching element SW12 is again turned ON. When the current I1 becomes large, the switching element SW12 is turned OFF. The subsequent operation is carried out in substantially the same as the above embodiments. When the switching elements SW11 and SW12 are operated in this way, the input current Iin corresponding to a sum of the currents I1 and I2 can be continuously drawn.

During the OFF state of the switching element SW11, the present embodiment operates as follows. In a mountain part of the input pulsative voltage V1 in which the voltage V1 is higher than the output voltage Vout, only the switching element SW21 is turned ON. This causes the capacitor C11 to be connected to the inductor L1 in series so that part of the energy of the capacitor C11 is moved to the inductor L1 and then stored therein as the magnetic energy. In a valley part of the input pulsative voltage V1 in which the voltage V1 is lower than the output voltage Vout, the switching element SW3 remains in its ON state. This causes the capacitor C11 to be connected to the smoothing capacitor C2 and inductor L1 in series so that part of the energy of the capacitor C2 is moved to the inductors L1 and then stored therein as the magnetic energy, while charging the capacitor C11. The energy temporarily stored in the inductor L1 through the above process is all sent to the load circuit through the diode D1 as soon as the switching element SW21 (and SW3) is turned OFF to turn ON the diode D2. Even when the switching element SW12 is in its OFF state, similarly, the same operation as the above switching element SW21 causes the voltage of the capacitor C12 to be adjusted with respect to the switching element SW22. The energy stored in this way in the capacitors C11 and C12 is sent to the load circuit through the inductor L1 to effectively adjust the voltages across the capacitors C11 and C12. The repetition of the above operation causes gradual increase of the voltage across the smoothing capacitor C2. The capacitors C11 and C12 act to memorize or store therein a voltage corresponding to a difference between the input pulsative voltage V1 and output voltage Vout so that, when the switching element SW11 is in their ON state, the input pulsative voltage V1 is connected in series with the capacitor C11, while, when the switching element SW12 is in their ON state, the input pulsative voltage V1 is connected in series with the capacitor C12 to thereby supply a constant voltage to the load circuit. Further, the ON time of the switching elements SW21 and SW22 (and SW3) is controlled so that the voltage corresponding to a sum of the voltages across the capacitor C11 and smoothing capacitor C2 immediately prior to the turning ON of the switching element SW11 as well as the voltage corresponding to a sum of the voltages across the capacitor C12 and smoothing capacitor C2 immediately prior to the turning ON of the switching element SW12 become similar in waveform to the full-wave-rectified output V1 to make the ON time of the switching element SW1 constant, whereby the envelope line of the input current waveform is made similar to the input voltage waveform. The switching elements SW11 and SW12 cause the currents flowing therethrough to be combined, so that the input current can be continuously drawn and the input harmonics distortion can be suppressed. Further, When this similitude ratio is changed by adjusting the ON time of the switching elements SW21 and SW22 (and SW3), the peak value of the input current varies and the output voltage increases or decreases. As a result, the resultant power supply apparatus can adjust its output voltage.

As has been mentioned above, the A.C. power source AC is connected with the full-wave rectifier DB which in turn is connected at its output ends with the switching element SW11 and diode D3, and the inductor L2, capacitor C11 and the parallel circuit of the smoothing capacitor C2 and load R is connected in parallel to the diode D3. The series circuit of the switching element SW12 and capacitor C12 is provided between the output of the full-wave rectifier DB and the junction point of the capacitor C11 and smoothing capacitor C2. The control means including the inductor L1, switching elements SW21, SW22 and SW3, and diodes D1 and D2 is connected in parallel to the capacitors C11 and C12. When the voltages across the capacitors C11 and C12 are controlled by the control means, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 16

Figure 34:
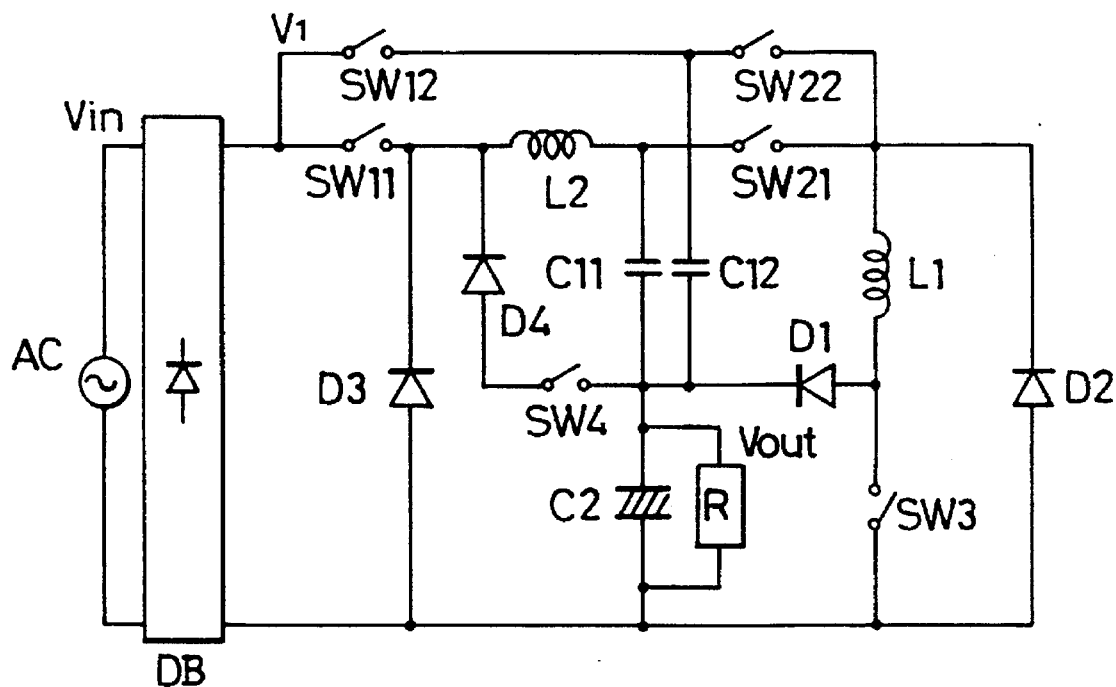
FIG. 34 is a circuit diagram of a sixteenth embodiment in accordance with the present invention.

A circuit diagram of a sixteenth embodiment of the present invention is shown in FIG. 34. In the present embodiment, the A.C. power source AC is connected with the full-wave rectifier DB which in turn is connected at its output ends with the switching element SW11 and diode D3, and the inductor L2, capacitor C11 and a parallel circuit of the smoothing capacitor C2 and load R is connected in parallel to the diode D3. A series circuit of the diode D4 and switching element SW4 is provided in parallel to a series circuit of the inductor L2 and capacitor C11. A series circuit of the switching element SW12 and capacitor C12 is connected between an output of the full-wave rectifier DB and a junction point of the capacitor C11 and smoothing capacitor C2. A control means for adjusting the voltages across the capacitors C11 and C12 is connected in parallel to the capacitors C11 and C12. The control means comprises the inductor L1, switching elements SW21, SW22 and SW3, and diodes D1 and D2. Connected across the capacitor C11 is a series circuit of the switching element SW21, inductor L1 and diode D1. Provided between the capacitor C12 and inductor L1 is the switching element SW22. Connected between a junction point of the inductor L1 and diode D1 and ground is the switching element SW3. For the purpose of sending the energy remaining in the inductor L1 to the load circuit, the diode D2 is connected between a junction point of the switching elements SW21, SW22 and inductor L1 and ground.

Explanation will be made as to the operation of the present embodiment below. First, the voltage Vin applied from the A.C. power source AC is rectified at the full-wave rectifier DB and then output therefrom as the input voltage V1. When the switching element SW11 is turned ON in response to a control signal received from the control circuit, the resonance of the inductor L2 and capacitor C11 causes the capacitor C11 and smoothing capacitor C2 to be charged. As soon as the switching element SW11 is turned OFF, the switching element SW12 is turned ON so that a voltage corresponding to a sum of the voltages across the capacitor C12 and smoothing capacitor C2 is charged up to the input pulsative voltage V1. In this case, in a mountain part of the input pulsative voltage V1 in which the voltage V1 is higher than the output voltage Vout, the switching element SW4 is turned ON so that the energy stored in the inductor L2 is sent to the capacitor C11. In a valley part of the input pulsative voltage V1 in which the voltage V1 is lower than the output voltage Vout, the diode D3 is turned ON, the energy stored in the inductor L2 is sent to the capacitors C11 and smoothing capacitor C2. When the charging of the capacitor C12 causes gradual drop of the input current I2 through the switching element SW12, the switching element SW11 is again turned ON. When the current I1 through the switching element SW11 becomes large, the switching element SW12 is turned OFF. The subsequent operation is carried out in substantially the same as the above embodiments. When the switching elements SW11 and SW12 are operated in this way, the input current Iin corresponding to a sum of the currents I1 and I2 can be continuously drawn.

During the OFF state of the switching element SW11, the present embodiment operates as follows. In the mountain part, the switching element SW21 is turned ON. This causes the capacitor C11 to be connected to the inductor L1 in series so that part of the energy of the capacitor C11 is moved to the inductor L1 and then stored therein as the magnetic energy. In the valley part, the switching element SW3 remains in its ON state. This causes the capacitor C11 to be connected to the smoothing capacitor C2 and inductor L1 in series so that part of the energy of the capacitor C2 is moved to the inductors L1 and then stored therein as the magnetic energy, while charging the capacitor C11. The energy temporarily stored in the inductor L1 through the above process is all sent to the load circuit through the diode D1 as soon as the switching element SW21 (and SW3) is turned OFF to turn ON the diode D2. Even when the switching element SW12 is in its OFF state, similarly, the same operation as the above switching element SW21 causes the voltage of the capacitor C12 to be adjusted with respect to the switching element SW22. The energy stored in this way in the capacitors C11 and C12 is sent to the load circuit through the inductor L1 to effectively adjust the voltages across the capacitors C11 and C12. The repetition of the above operation causes gradual increase of the voltage across the smoothing capacitor C2. The capacitors C11 and C12 act to memorize or store therein a voltage corresponding to a difference between the input pulsative voltage V1 and output voltage Vout so that, when the switching element SW11 is in their ON state, the input pulsative voltage V1 is connected in series with the capacitor C11, while, when the switching element SW12 is in their ON state, the input pulsative voltage V1 is connected in series with the capacitor C12 to thereby supply a constant voltage to the load circuit. Further, the ON time of the switching elements SW21 and SW22 (and SW3) is controlled so that the voltage corresponding to a sum of the voltages across the capacitor C11 and smoothing capacitor C2 immediately prior to the turning ON of the switching element SW11 as well as the voltage corresponding to a sum of the voltages across the capacitor C12 and smoothing capacitor C2 immediately prior to the turning ON of the switching element SW12 become similar in waveform to the full-wave-rectified output V1, whereby the envelope line of the input current waveform is made similar to the input voltage waveform. The switching elements SW11 and SW12 cause the currents flowing therethrough to be combined, so that the input current can be continuously drawn and the input harmonics distortion can be suppressed. Further, when this similitude ratio is changed by adjusting the ON time of the switching elements SW21 and SW22 (and SW3), the peak value of the input current varies and the output voltage increases or decreases. As a result, the resultant power supply apparatus can adjust its output voltage.

As has been mentioned above, the A.C. power source AC is connected with the full-wave rectifier DB which in turn is connected at its output ends with the switching element SW11 and diode D3, and the inductor L2, capacitor C11 and the parallel circuit of the smoothing capacitor C2 and load R is connected in parallel to the diode D3. The series circuit of the diode D4 and switching element SW4 is connected to the series circuit of the inductor L2 and capacitor C11. The series circuit of the switching element SW12 and capacitor C12 is provided between the output of the full-wave rectifier DB and the junction point of the capacitor C11 and smoothing capacitor C2. The control means including the inductor L1, switching elements SW21, SW22 and SW3, and diodes D1 and D2 is connected in parallel to the capacitors C11 and C12. When the voltages across the capacitors C11 and C12 are controlled by the control means, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 17

Figure 35:
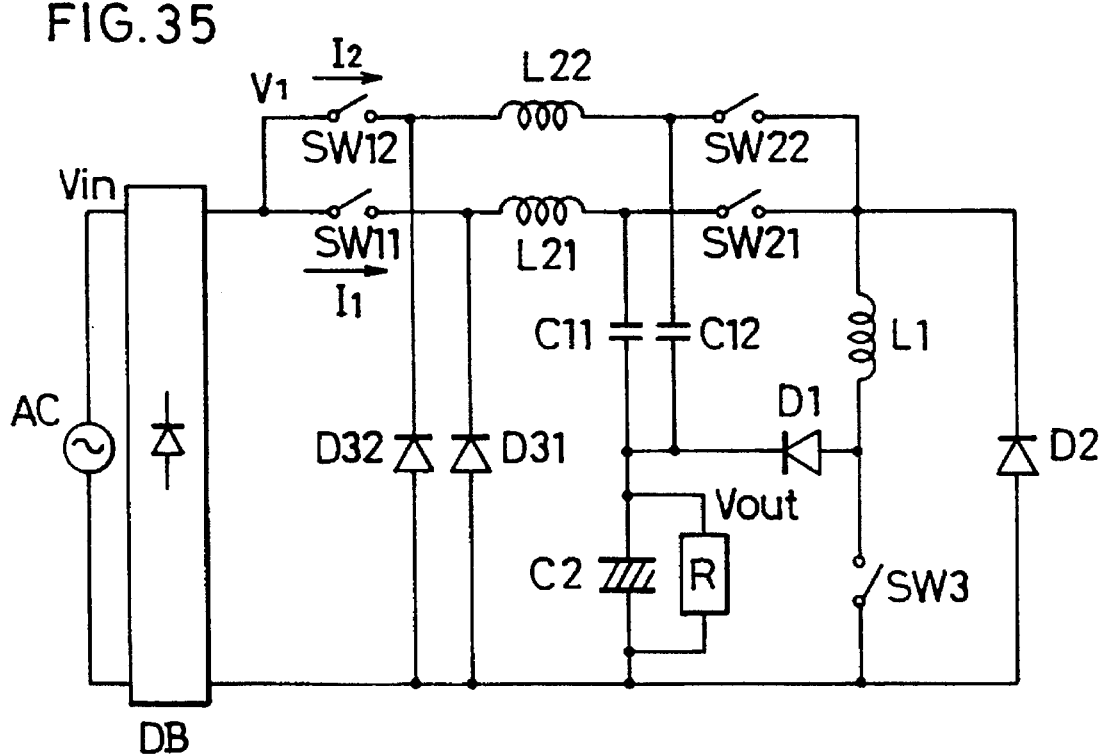
FIG. 35 is a circuit diagram of a seventeenth embodiment in accordance with the present invention.
Figure 36:
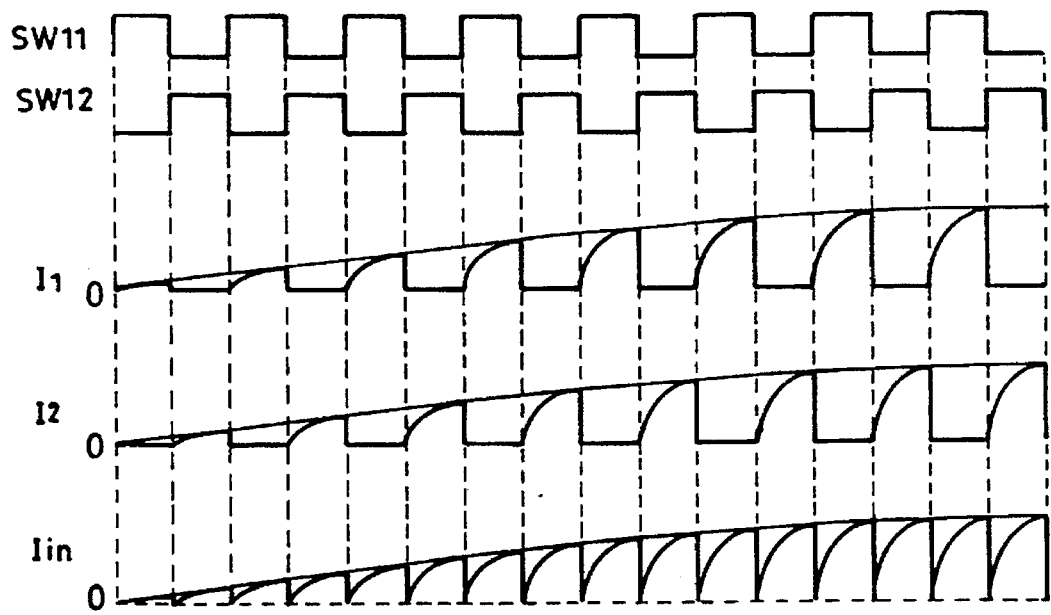
FIG. 36 shows waveforms of signals appearing at points the seventeenth embodiment of the present invention.

A circuit diagram of a seventeenth embodiment of the present invention is shown in FIG. 35 and waveforms of signals in the present embodiment are shown in FIG. 36. In the present embodiment, the A.C. power source AC is connected with the full-wave rectifier DB which in turn is connected at its output ends with a series circuit of the switching element SW11 and diode D31 and a series circuit of the switching element SW12 and diode D32 in parallel to each other. The inductor L21, capacitor C11 and a parallel circuit of the smoothing capacitor C2 and load R are connected in parallel to the diode D31. A series circuit of the inductor L22 and capacitor C12 is provided between the diode D32 and smoothing capacitor C2. A control means for adjusting the voltages across the capacitors C11 and C12 is connected in parallel to the capacitors C11 and C12. The control means comprises the inductor L1, switching elements SW21, SW22 and SW3, and diodes D1 and D2. Connected across the capacitor C11 is a series circuit of the switching element SW21, inductor L1 and diode D1. Provided between the capacitor C12 and inductor L1 is the switching element SW22. Connected between a junction point of the inductor L1 and diode D1 and ground is the switching element SW3. For the purpose of sending the energy remaining in the inductor L1 to the load circuit, the diode D2 is connected between a junction point of the switching elements SW21, SW22 and inductor L1 and ground.

Explanation will be made as to the operation of the present embodiment below. The voltage Vin applied from the A.C. power source AC is first rectified at the full-wave rectifier DB and then output therefrom as the pulsative voltage V1. When the switching element SW11 is turned ON in response to a control signal received from the control circuit, the resonance of the inductor L21 and capacitor C11 causes the capacitor C11 and smoothing capacitor C2 to be charged. As soon as the switching element SW11 is turned OFF, the switching element SW12 is turned ON so that the resonance of the inductor L22, capacitor C12 and smoothing capacitor C2 causes the capacitor C12 and smoothing capacitor C2 to be charged. In this case, the diode D31 is turned ON so that the energy stored in the inductor L21 is sent to the capacitor C11 and smoothing capacitor C2. Similarly, as soon as the switching element SW12 is turned OFF, the diode D32 is turned ON so that the energy stored in the inductor L22 is sent to the capacitor C12 and smoothing capacitor C2. When the switching elements SW11 and SW12 are operated on the time division basis in this way, the input current can be continuously drawn.

During the ON state of the switching element SW12, the present embodiment operates as follows. In a mountain part of the input pulsative voltage V1 in which the voltage V1 is higher than the output voltage Vout, the switching element SW21 is turned ON. This causes the capacitor C11 to be connected to the inductor L1 so that part of the energy of the capacitor C11 is moved to the inductor L1 and then stored therein as the magnetic energy. In a valley part of the input pulsative voltage V1 in which the voltage V1 is lower than the output voltage Vout, the switching element SW3 remains in its ON state. This causes the capacitor C11 to be connected to the smoothing capacitor C2 and inductor L1 so that part of the energy of the capacitor C2 is moved to the inductor L1 and then stored therein as the magnetic energy, while charging the capacitor C11. The energy temporarily stored in the inductor L1 through the above process is all sent to the load circuit through the diode D1 as soon as the switching element SW21 (and SW3) is turned OFF to turn ON the diode D2. As soon as the switching element SW12 is turned OFF, the switching element SW11 is turned ON so that the switching element SW22 carries out the same operation as the switching element SW21 to adjust the voltage across the capacitor C12.

The excessive energy stored in this way in the capacitors C11 and C12 is sent to the load circuit through the inductor L1 to effectively adjust the voltages across the capacitors C11 and C12. The repetition of the above operation causes gradual increase of the voltage across the smoothing capacitor C2. The capacitors C11 and C12 act to memorize or store therein a voltage corresponding to a difference between the input pulsative voltage V1 and output voltage Vout so that, when the switching element SW11 is in their ON state, the input pulsative voltage V1 is connected in series with the capacitor C11, while, when the switching element SW12 is in their ON state, the input pulsative voltage V1 is connected in series with the capacitor C12 to thereby supply a constant voltage to the load circuit. Further, the ON time of the switching elements SW21 and SW22 (and SW3) is controlled so that the voltage corresponding to a sum of the voltages across the capacitor C11 and smoothing capacitor C2 immediately prior to the turning ON of the switching element SW11 as well as the voltage corresponding to a sum of the voltages across the capacitor C12 and smoothing capacitor C2 immediately prior to the turning ON of the switching element SW12 become similar in waveform to the full-wave-rectified output V1, whereby the envelope line of the input current waveform is made similar to the input voltage waveform. The current waveform based on such control and resonance and the operation of the switching elements SW11 and SW12 on the time division basis will cause the input current to be continuously drawn, thus suppressing the input harmonics distortion. Further, when this similitude ratio is changed by adjusting the ON time of the switching elements SW21 and SW22 (and SW3), the peak value of the input current varies and the output voltage increases or decreases. As a result, the resultant power supply apparatus can adjust its output voltage.

As has been mentioned above, the A.C. power source AC is connected with the full-wave rectifier DB which in turn is connected at its output ends with the series circuit of the switching element SW11 and diode D31 and the series circuit of the switching element SW12 and diode D32 in parallel to each other. The inductor L21, capacitor C11 and the parallel circuit of the smoothing capacitor C2 and load R are connected in parallel to the diode D31. The series circuit of the inductor L22 and capacitor C12 is provided between the diode D32 and smoothing capacitor C2. The control means is connected in parallel to the capacitors C11 and C12. When the voltages across the capacitors C11 and C12 are controlled by the control means, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 18

Figure 37:
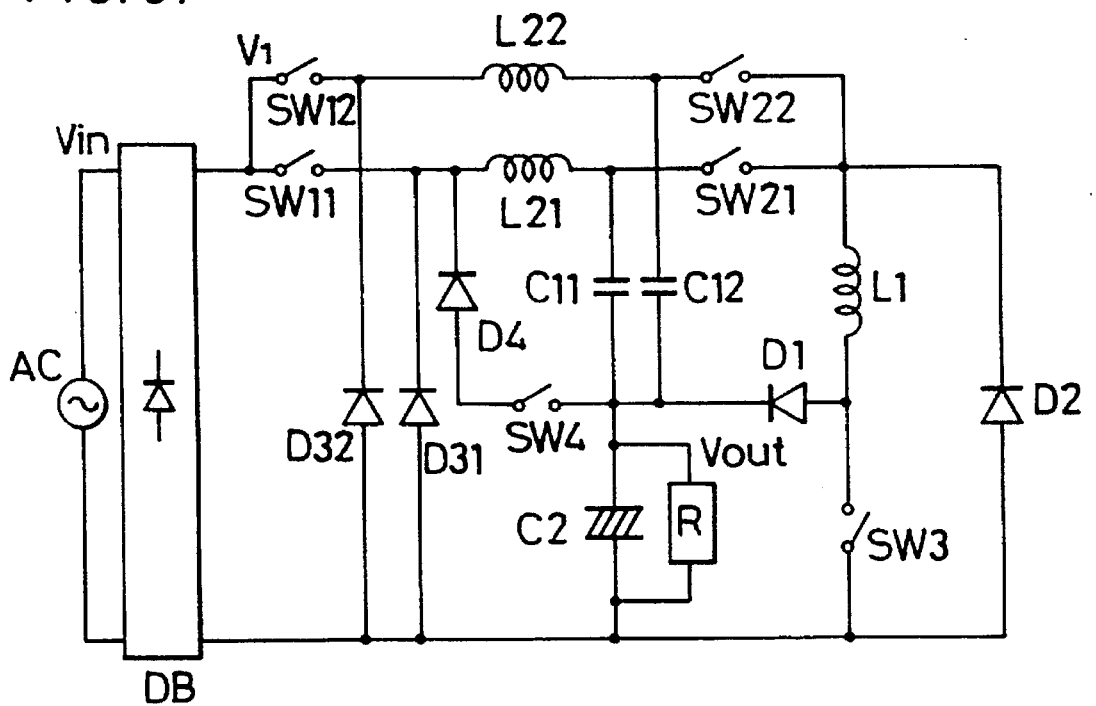
FIG. 37 is a circuit diagram of an eighteenth embodiment in accordance with the present invention.

A circuit diagram of an eighteenth embodiment of the present invention is shown in FIG. 37. In the present embodiment, the A.C. power source AC is connected with the full-wave rectifier DB which in turn is connected at its output ends with a series circuit of the switching element SW11 and diode D31 and a series circuit of the switching element SW12 and diode D32 in parallel to each other. The inductor L21, capacitor C11 and a parallel circuit of the smoothing capacitor C2 and load R are connected in parallel to the diode D31. A series circuit of the diode D4 and switching element SW4 is connected in parallel to a series circuit of the inductor L21 and capacitor C11. Also provided between the diode D32 and smoothing capacitor C2 is a series circuit of the inductor L22 and capacitor C12. A control means for adjusting the voltages across the capacitors C11 and C12 is connected in parallel to the capacitors C11 and C12. The control means comprises the inductor L1, switching elements SW21, SW22 and SW3, and diodes D1 and D2. Connected across the capacitor C11 is a series circuit of the switching element SW21, inductor L1 and diode D1. Provided between the capacitor C12 and inductor L1 is the switching element SW22. Connected between a junction point of the inductor L1 and diode D1 and ground is the switching element SW3. For the purpose of sending the energy remaining in the inductor L1 to the load circuit, the diode D2 is connected between a junction point of the switching elements SW21, SW22 and inductor L1 and ground.

Explanation will be made as to the operation of the present embodiment below. The voltage Vin applied from the A.C. power source AC is first rectified at the full-wave rectifier DB and then output therefrom as the pulsative voltage V1. When the switching element SW11 is turned ON in response to a control signal received from the control circuit, the resonance of the inductor L21, capacitor C11 and smoothing capacitor C2 causes the capacitor C11 and smoothing capacitor C2 to be charged. As soon as the switching element SW11 is turned OFF, the switching element SW12 is turned ON so that the resonance of the inductor L22, capacitor C12 and smoothing capacitor C2 causes the capacitor C12 and smoothing capacitor C2 to be charged. In a mountain part of the input pulsative voltage V1 in which the voltage V1 is higher than the output voltage Vout, in this case, the switching element SW4 is turned ON so that the energy stored in the inductor L21 is sent through the diode D4 to the capacitor C11. In a valley part of the input pulsative voltage V1 in which the voltage V1 is lower than the output voltage Vout, the diode D31 is turned ON so that the energy stored in the inductor L21 is sent to the capacitor C11 and smoothing capacitor C2. As soon as the switching element SW12 is turned OFF, the diode D32 is turned ON so that the energy stored in the inductor L22 is sent to the capacitor C12 and smoothing capacitor C2. When the switching elements SW11 and SW12 are operated on the time division basis in this way, the input current can be continuously drawn.

During the ON state of the switching element SW12, the present embodiment operates as follows. In the mountain part, the switching element SW21 is turned ON. This causes the capacitor C11 to be connected to the inductor L1 so that part of the energy of the capacitor C11 is moved to the inductor L1 and then stored therein as the magnetic energy. In the valley part, the switching element SW3 remains in its ON state. This causes the capacitor C11 to be connected to the smoothing capacitor C2 and inductor L1 so that part of the energy of the capacitor C2 is moved to the inductor L1 and then stored therein as the magnetic energy, while charging the capacitor C11. The energy temporarily stored in the inductor L1 through the above process is all sent to the load circuit through the diode D1 as soon as the switching element SW21 (and SW3) is turned OFF to turn ON the diode D2. As soon as the switching element SW12 is turned OFF, the switching element SW11 is turned ON so that the switching element SW22 carries out the same operation as the switching element SW21 to adjust the voltage across the capacitor C12.

The excessive energy stored in this way in the capacitors C11 and C12 is sent to the load circuit through the inductor L1 to effectively adjust the voltages across the capacitors C11 and C12. The repetition of the above operation causes gradual increase of the voltage across the smoothing capacitor C2. The capacitors C11 and C12 act to memorize or store therein a voltage corresponding to a difference between the input pulsative voltage V1 and output voltage Vout so that, when the switching element SW11 is in their ON state, the input pulsative voltage V1 is connected in series with the capacitor C11, while, when the switching element SW12 is in their ON state, the input pulsative voltage V1 is connected in series with the capacitor C12 to thereby supply a constant voltage to the load circuit. Further, the ON time of the switching elements SW21 and SW22 (and SW3) is controlled so that the voltage corresponding to a sum of the voltages across the capacitor C11 and smoothing capacitor C2 immediately prior to the turning ON of the switching element SW11 as well as the voltage corresponding to a sum of the voltages across the capacitor C12 and smoothing capacitor C2 immediately prior to the turning ON of the switching element SW12 become similar in waveform to the full-wave-rectified output V1, whereby the envelope line of the input current waveform is made similar to the input voltage waveform. The current waveform based on such control and resonance and the operation of the switching elements SW11 and SW12 on the time division basis will cause the input current to be continuously drawn, thus suppressing the input harmonics distortion. Further, when this similitude ratio is changed by adjusting the ON time of the switching elements SW21 and SW22 (and SW3), the peak value of the input current varies and the output voltage increases or decreases. As a result, the resultant power supply apparatus can adjust its output voltage.

As has been mentioned above, the A.C. power source AC is connected with the full-wave rectifier DB which in turn is connected at its output ends with the series circuit of the switching element SW11 and diode D31 and the series circuit of the switching element SW12 and diode D32 in parallel to each other. The inductor L21, capacitor C11 and the parallel circuit of the smoothing capacitor C2 and load R are connected in parallel to the diode D31. The series circuit of the diode D4 and switching element SW4 is connected in parallel to the series circuit of the inductor L21 and capacitor C11. The series circuit of the inductor L22 and capacitor C12 is provided between the diode D32 and smoothing capacitor C2. The control means is connected in parallel to the capacitors C11 and C12. When the voltages across the capacitors C11 and C12 are controlled by the control means, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 19

Figure 38:
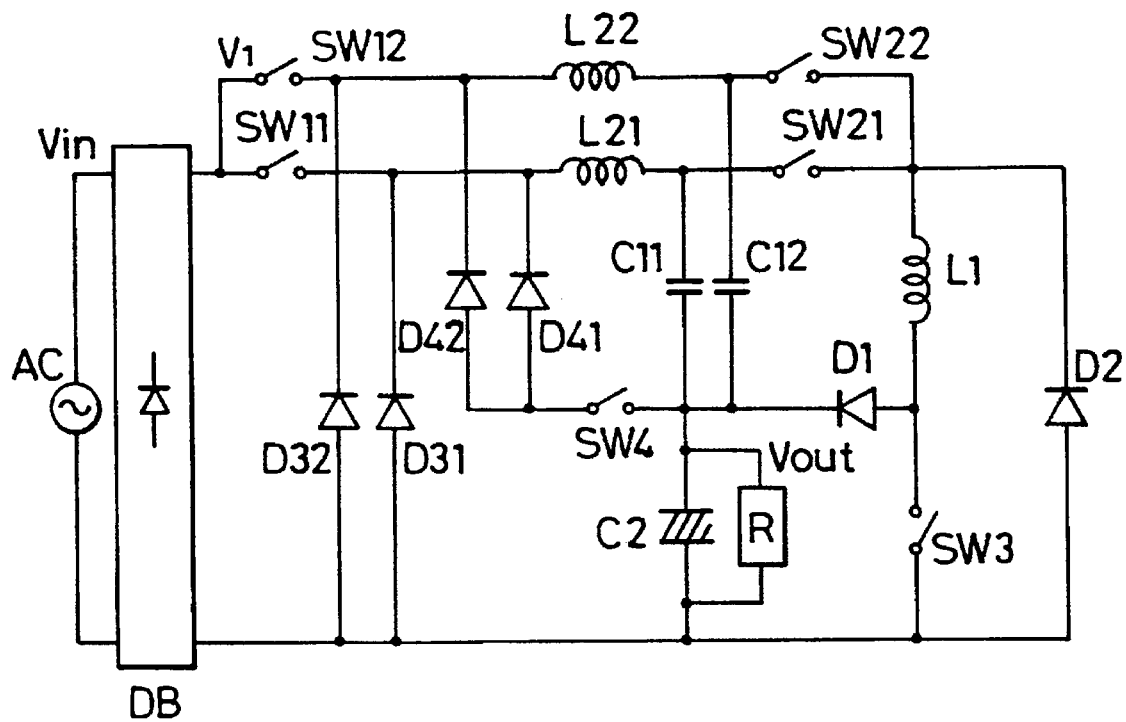
FIG. 38 is a circuit diagram of a nineteenth embodiment in accordance with the present invention.

A circuit diagram of a nineteenth embodiment of the present invention is shown in FIG. 38. In the present embodiment, the A.C. power source AC is connected with the full-wave rectifier DB which in turn is connected at its output ends with a series circuit of the switching element SW11 and diode D31 and a series circuit of the switching element SW12 and diode D32 in parallel to each other. The inductor L21, capacitor C11 and a parallel circuit of the smoothing capacitor C2 and load R are connected in parallel to the diode D31. A series circuit of the diode D41 and switching element SW4 is connected in parallel to a series circuit of the inductor L21 and capacitor C11. Also provided between the diode D32 and smoothing capacitor C2 is a series circuit of the inductor L22 and capacitor C12. A diode D42 is connected to a junction point of the switching element SW12 and inductor L22 and a junction point of the diode D41 and switching element SW4. A control means for adjusting the voltages across the capacitors C11 and C12 is connected in parallel to the capacitors C11 and C12. The control means comprises the inductor L1, switching elements SW21, SW22 and SW3, and diodes D1 and D2. Connected across the capacitor C11 is a series circuit of the switching element SW21, inductor L1 and diode D1. Provided between the capacitor C12 and inductor L1 is the switching element SW22. Connected between a junction point of the inductor L1 and diode D1 and ground is the switching element SW3. For the purpose of sending the energy remaining in the inductor L1 to the load circuit, the diode D2 is connected between a junction point of the switching elements SW21, SW22 and inductor L1 and ground.

Explanation will be made as to the operation of the present embodiment below. The voltage Vin applied from the A.C. power source AC is first rectified at the full-wave rectifier DB and then output therefrom as the pulsative voltage V1. When the switching element SW11 is turned ON in response to a control signal received from the control circuit, the resonance of the inductor L21, capacitor C11 and smoothing capacitor C2 causes the capacitor C11 and smoothing capacitor C2 to be charged. As soon as the switching element SW11 is turned OFF, the switching element SW12 is turned ON so that the resonance of the inductor L22, capacitor C12 and smoothing capacitor C2 causes the capacitor C12 and smoothing capacitor C2 to be charged. In a mountain part of the input pulsative voltage V1 in which the voltage V1 is higher than the output voltage Vout, in this case, the switching element SW4 is turned ON so that the energy stored in the inductor L21 through the diode D41 is sent to the capacitor C11. In a valley part of the input pulsative voltage V1 in which the voltage V1 is lower than the output voltage Vout, the diode D31 is turned ON so that the energy stored in the inductor L21 is sent to the capacitor C11 and smoothing capacitor C2. Even when the switching element SW12 is turned OFF, the switching element SW4 and diode D32 perform the same operation as in the turning OFF of the switching element SW11. When the switching elements SW11 and SW12 are operated on the time division basis in this way, the input current can be continuously drawn.

During the ON state of the switching element SW12, the present embodiment operates as follows. In the mountain part, the switching element SW21 is turned ON. This causes the capacitor C11 to be connected to the inductor L1 so that part of the energy of the capacitor C11 is moved to the inductor L1 and then stored therein as the magnetic energy. In the valley part, the switching element SW3 remains in its ON state. This causes the capacitor C11 to be connected to the smoothing capacitor C2 and inductor L1 so that part of the energy of the capacitor C2 is moved to the inductor L1 and then stored therein as the magnetic energy, while charging the capacitor C11. The energy temporarily stored in the inductor L1 through the above process is all sent to the load circuit through the diode D1 as soon as the switching element SW21 (and SW3) is turned OFF to turn ON the diode D2. As soon as the switching element SW12 is turned OFF, the switching element SW11 is turned ON so that the switching element SW22 carries out the same operation as the switching element SW21 to adjust the voltage across the capacitor C12.

The excessive energy stored in this way in the capacitors C11 and C12 is sent to the load circuit through the inductor L1 to effectively adjust the voltages across the capacitors C11 and C12. The repetition of the above operation causes gradual increase of the voltage across the capacitor C2. The capacitors C11 and C12 act to memorize or store therein a voltage corresponding to a difference between the input pulsative voltage V1 and output voltage Vout so that, when the switching element SW11 is in their ON state, the input pulsative voltage V1 is connected in series with the capacitor C11, while, when the switching element SW12 is in their ON state, the input pulsative voltage V1 is connected in series with the capacitor C12 to thereby supply a constant voltage to the load circuit. Further, the ON time of the switching elements SW22 and SW22 (and SW3) is controlled so that the voltage corresponding to a sum of the voltages across the capacitor C11 and smoothing capacitor C2 immediately prior to the turning ON of the switching element SW11 as well as the voltage corresponding to a sum of the voltages across the capacitor C12 and smoothing capacitor C2 immediately prior to the turning ON of the switching element SW12 become similar in waveform to the full-wave-rectified output V1, whereby the envelope line of the input current waveform is made similar to the input voltage waveform. The current waveform based on such control and resonance and the operation of the switching elements SW11 and SW12 on the time division basis will cause the input current to be continuously drawn, thus suppressing the input harmonics distortion. Further, when this similitude ratio is changed by adjusting the ON time of the switching elements SW21 and SW22 (and SW3), the peak value of the input current varies and the output voltage increases or decreases. As a result, the resultant power supply apparatus can adjust its output voltage.

As has been mentioned above, the A.C. power source AC is connected with the full-wave rectifier DB which in turn is connected at its output ends with the series circuit of the switching element SW11 and diode D31 and the series circuit of the switching element SW12 and diode D32 in parallel to each other. The inductor L21, capacitor C11 and the parallel circuit of the smoothing capacitor C2 and load R are connected in parallel to the diode D31. The series circuit of the diode D41 and switching element SW4 is connected in parallel to the series circuit of the inductor L21 and capacitor C11. The series circuit of the inductor L22 and capacitor C12 is provided between the diode D32 and smoothing capacitor C2. The diode D42 is connected to the junction point of the switching element SW12 and inductor L22 and the junction point of the diode D41 and switching element SW4. The control means is connected in parallel to the capacitors C11 and C12. When the voltages across the capacitors C11 and C12 are controlled by the control means, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 20

Figure 39:
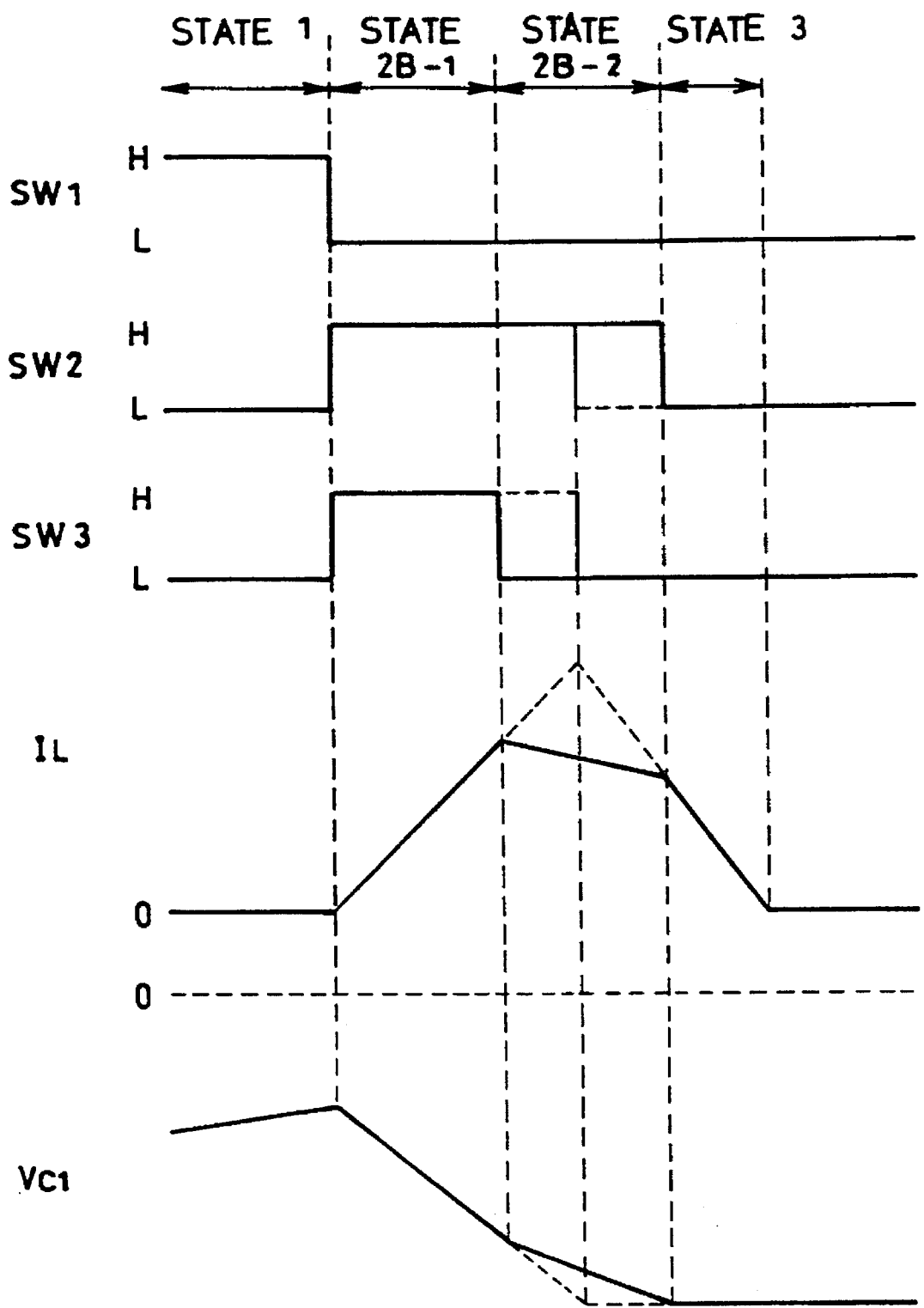
FIG. 39 shows waveforms of signals appearing at points in a twentieth embodiment of the present invention.
Figure 40A:
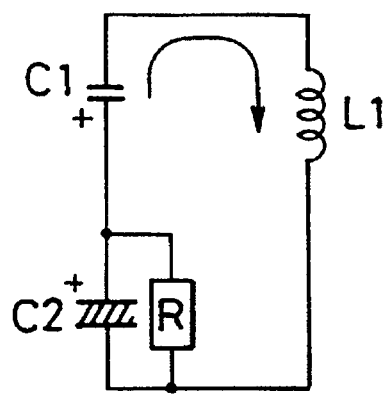
FIG. 40 is an equivalent circuit showing a second state of the twentieth embodiment of FIG. 39 of the invention.
Figure 40B:
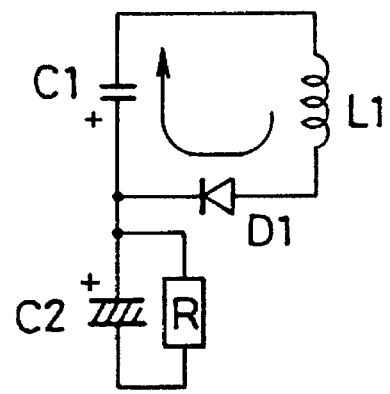
Figure 41:
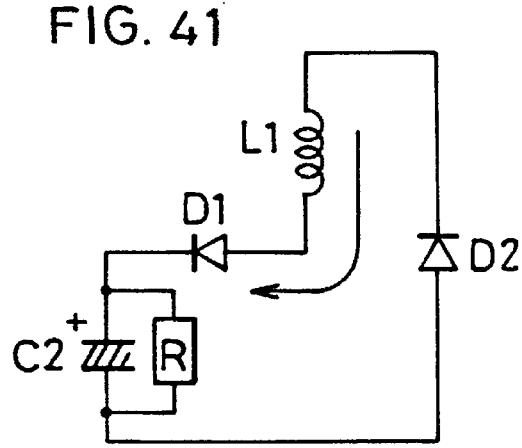
FIG. 41 is an equivalent circuit showing a third state of the twentieth embodiment of FIG. 39 of the invention.

FIG. 39 shows waveforms of signals in a twentieth embodiment of the present invention. The present embodiment corresponds to the circuit of the embodiment 1 of FIG. 1 but designed to reduce the peak current at the time of adjusting the voltage across the capacitor C1 in a valley part of the input pulsative voltage V1 in which the voltage V1 is lower than the output voltage Vout. Explanation will be made as to the operation of the present embodiment below. The voltage Vin applied from the A.C. power source AC is first rectified at the full-wave rectifier DB and then output therefrom as the pulsative voltage V1. In the circuit of FIG. 1, when the switching element SW1 is turned ON in response to a control signal received from the control circuit, a voltage corresponding to a sum of the voltages across the capacitor C1 and smoothing capacitor C2 is charged up to the input pulsative voltage V1. Explanation will next be made as to the operation of the present embodiment after the switching element SW1 is turned OFF. In a mountain part of the input pulsative voltage V1 in which the voltage V1 is higher than the output voltage Vout, only the switching element SW2 is turned ON. This causes the capacitor C1 to be connected to the inductor L1 so that part of the energy of the capacitor C1 is moved to the inductor L1 and then stored therein as the magnetic energy. In the pulsative valley part, only the switching elements SW2 and SW3 are turned ON. This causes the capacitor C1 to be connected to a series circuit of the smoothing capacitor C2 and inductor L1 so that part of the energy of the smoothing capacitor C2 is moved to the inductor L1 and then stored therein as the magnetic energy, while charging the capacitor C1. Which operation will be referred to as state 2B-1 and which equivalent circuit is shown in FIG. 40A. Then the turning OFF the switching element SW3 causes the energy stored in the inductor L1 to charge the capacitor C1, which operation will be referred to as state 2B-2 and which equivalent circuit is shown in FIG. 40B. Since this causes the charging by the smoothing capacitor C2 to be switched to that by the inductor L1, the current increase stops and gradually decreases. The variation is shown in FIG. 39 by solid and broken lines. The broken line means before the change-over, while the solid line means the present embodiment. Thereafter, the voltage Vc1 across the capacitor C1 reaches a set voltage, the switching element SW2 is turned OFF. The energy stored in the inductor L1 through the above process is all sent to the load circuit through the diode D1, as soon as the switching element SW2 is turned OFF to turn ON the diode D2, which operation will be referred to as state 3 and which equivalent circuit is shown in FIG. 41. The ON time of the switching elements SW2 (and SW3) is controlled so that the voltage V2 corresponding to a sum of the voltages across the capacitor C1 and smoothing capacitor C2 immediately prior to the turning ON of the switching element SW1 becomes similar in waveform to the full-wave-rectified output V1, whereby the envelope line of the input current waveform is made similar to the input voltage waveform to suppress the input harmonics distortion. Further, when this similitude ratio is changed by adjusting the ON time of the switching element SW2 (and SW3), the peak value of the input current varies and the output voltage increases or decreases. As a result, the resultant power supply apparatus can adjust its output voltage.

In this way, in the valley part of the input pulsative voltage V1 in which the voltage V1 is lower than the output voltage Vout, the peak current at the time of adjusting the voltage across the capacitor C1 can be reduced to realize a high efficiency, and further the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

EMBODIMENT 21

Figure 42:
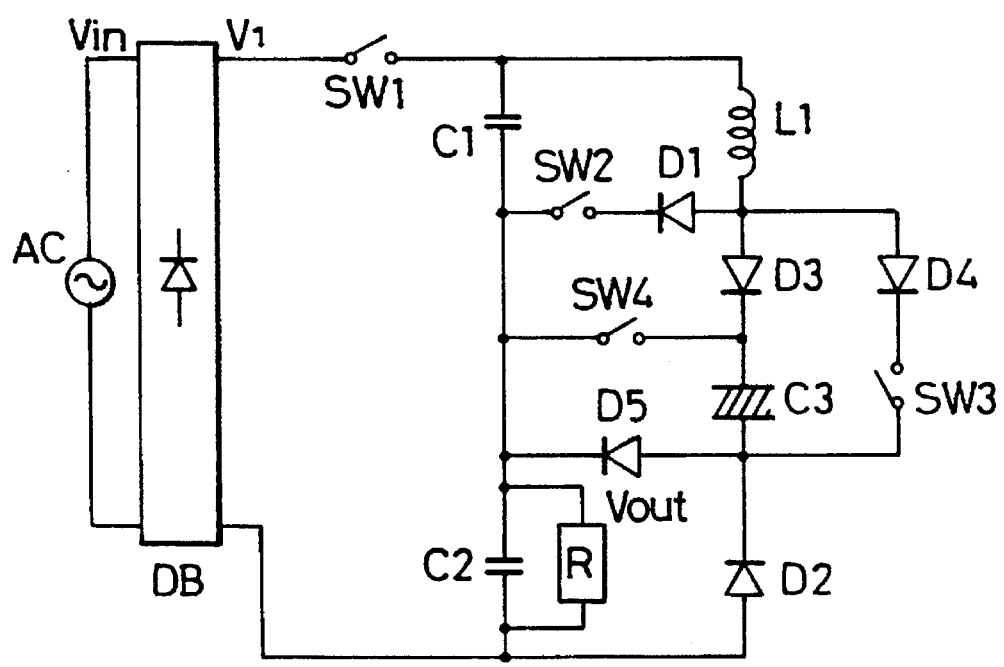
FIG. 42 is a circuit diagram of a twenty-first embodiment in accordance with the present invention.
Figure 43:
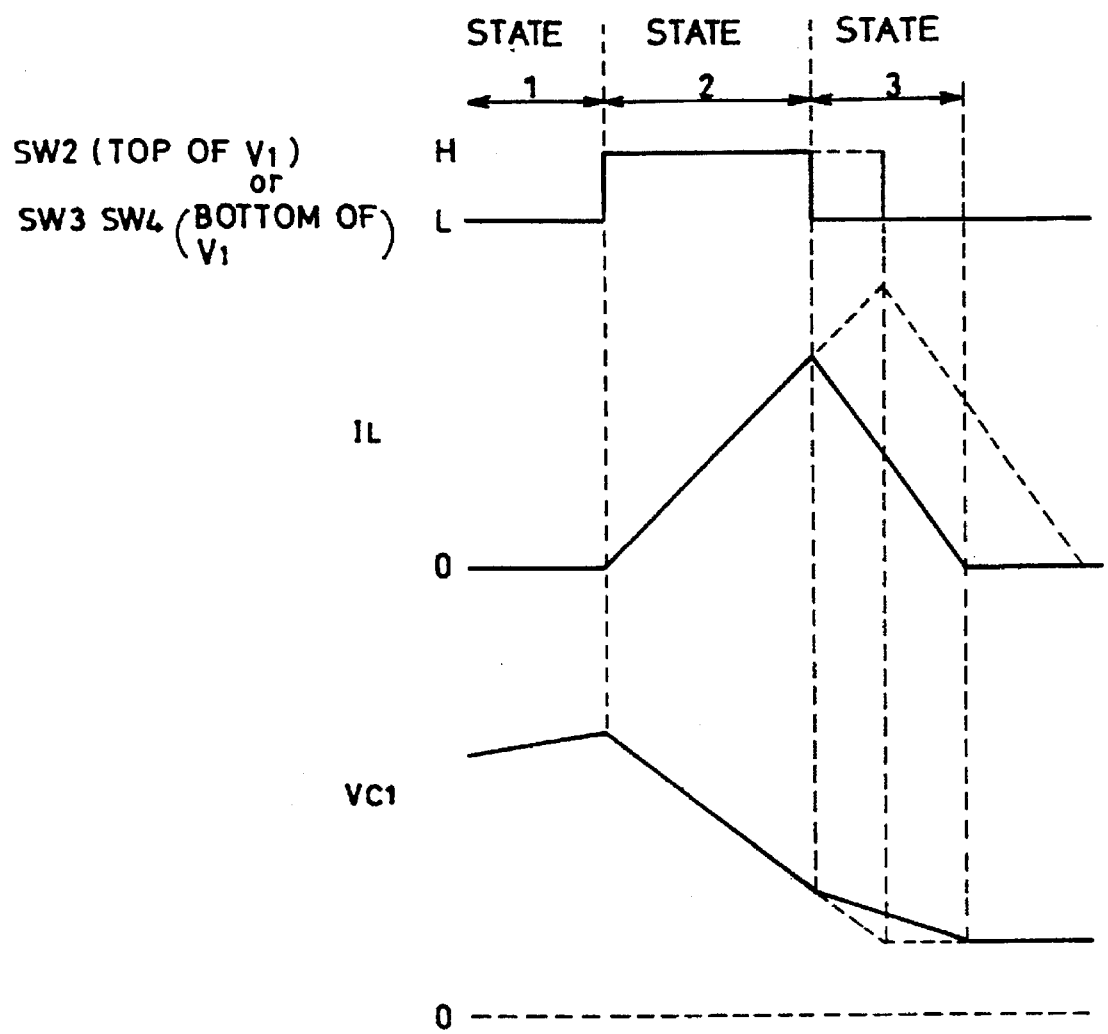
FIG. 43 shows waveforms of signals appearing at points in a twenty-first embodiment of FIG. 42 of the present invention.

A circuit diagram of a twenty-first embodiment of the present invention is shown in FIG. 42 and waveforms of signals in the present embodiment are shown in FIG. 43. In the present embodiment, the A.C. power source AC is connected with the full-wave rectifier DB which in turn is connected at its output ends with a series circuit of the switching element SW1 and capacitor C1 and a parallel circuit of the smoothing capacitor C2 and load 5. A control means for adjusting the voltage across the capacitor C1 is connected in parallel to the capacitor C1. The control means comprises the inductor L1, switching elements SW2, SW3, and SW4, diodes D1 to D5, and power storage capacitor C3. Connected across the capacitor C1 is a series circuit of the inductor L1, diode D1 and switching element SW2. A series circuit of the diode D3 and switching element SW4 is connected to a series circuit of the diode D1 and switching element SW2 in parallel to each other. Connected in parallel to the switching element SW4 is a series circuit of the power storage capacitor C3 and diode D5. The diode D2 is connected between a junction point of the power storage capacitor C3 and diode D5 and ground. Connected in parallel to a series circuit of the diode D3 and power storage capacitor C3 is a series circuit of the diode D4 and switching element SW3. The diode D2 is also connected between a junction point of the power storage capacitor C3 and diode D5 and ground.

Figure 44:
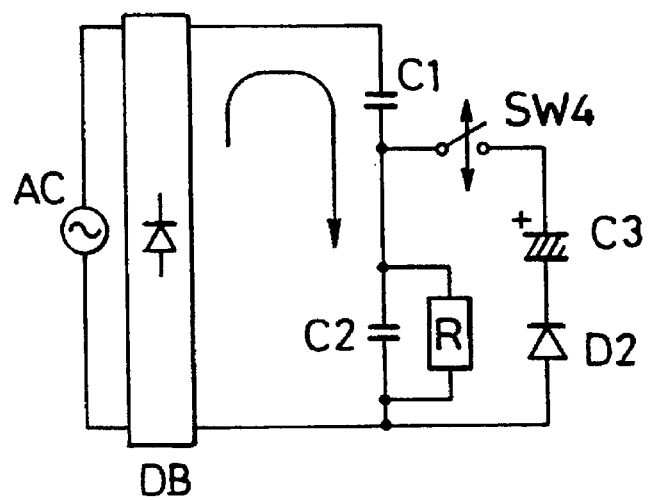
FIG. 44 is an equivalent circuit showing a first state of the twenty-first embodiment of FIG. 42 of the invention.
Figure 45A:
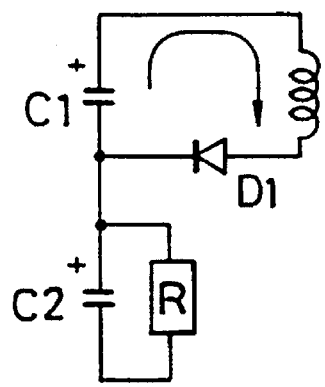
FIG. 45 is an equivalent circuit showing a second state of the twenty-first embodiment of FIG. 42 of the invention.
Figure 45B:
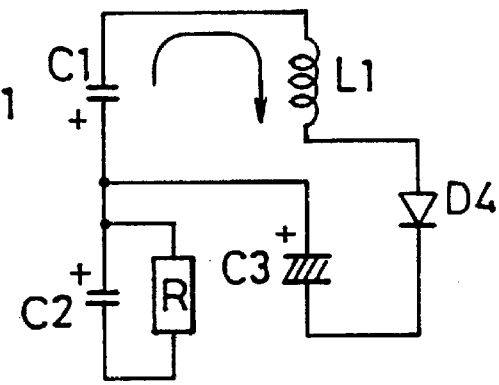
Figure 46:
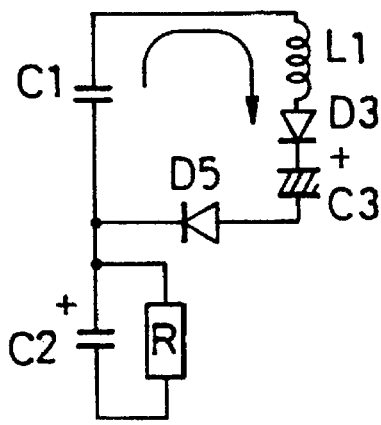
FIG. 46 is an equivalent circuit showing a third state of the twenty-first embodiment of FIG. 42 of the invention.

Explanation will be made as to the operation of the present embodiment below. The voltage Vin applied from the A.C. power source AC is first rectified at the full-wave rectifier DB and then output therefrom as the pulsative voltage V1. When the switching element SW1 is turned ON in response to a control signal received from the control circuit, a voltage corresponding to a sum of the voltages across the capacitor C1 and smoothing capacitor C2 is charged up to the input pulsative voltage V1. Which operation will be referred to as state 1 and which equivalent circuit is shown in FIG. 44. Explanation will next be made as to the operation of the present embodiment after the switching element SW1 is turned OFF. In a mountain part of the input pulsative voltage V1 in which the voltage V1 is higher than the output voltage Vout, the switching element SW2 is turned ON. This causes the capacitor C1 to be connected to the inductor L1 in series through the diode D1 so that part of the energy of the capacitor C1 is moved to the inductor L1 and then stored therein as the magnetic energy, which operation will be referred to as state 2A. In a valley part of the input pulsative voltage V1 in which the voltage V1 is lower than the output voltage Vout, the switching elements SW3 and SW4 are turned ON. This causes the capacitor C1 to be connected with the power storage capacitor C3 and inductor L1 in series through the diode D4, so that the energy of the power storage capacitor C3 is partly moved to the inductor L1 and then stored therein as the magnetic energy, while charging the capacitor C1. Which operation will be referred to as state 2B. FIGS. 45A and 45B show equivalent circuits for the states 2A and 2B respectively. The energy temporarily stored in the inductor L1 through the above process is all sent to the power storage capacitor C3 as soon as the switching element SW2 (or SW3, SW4) is turned OFF to turn ON the diodes D3 and D5. Which operation will be referred to as state 3 and which equivalent circuit is shown in FIG. 46. In this case, since a voltage having the opposite polarity is applied to the inductor L1 with one rush, the current flowing through the inductor L1 abruptly decreases. Even during this operation, since the voltage across the capacitor C1 continuously decreases, the voltage of the capacitor C1 is further decreased with the same peak current. That is, for the same set voltage, the peak current can be reduced when compared with that in the prior art.

The excessive energy stored in this way in the capacitor C1 is sent to the power storage capacitor C3 through the inductor L1 to effectively adjust the voltage across the capacitor C1. The repetition of the above operation causes gradual increase of the voltage across the smoothing capacitor C2 and power storage capacitor C3. The capacitor C1 acts to memorize or store therein a voltage corresponding to a difference between the input pulsative voltage V1 and output voltage Vout so that, when the switching element SW1 is in their ON state, the input pulsative voltage V1 is connected in series with the capacitor C1 to supply a constant voltage to the load circuit. Further, the ON time of the switching element SW2 (or SW3 or SW4) is controlled so that the voltage V2 corresponding to a sum of the voltages across the capacitor C1 and smoothing capacitor C2 immediately prior to the turning ON of the switching element SW1 becomes similar in waveform to the full-wave-rectified output V1, whereby the envelope line of the input current waveform is made similar to the input voltage waveform to suppress the input harmonics distortion. When this similitude ratio is changed by adjusting the ON time of the switching element SW2 (or SW3 or SW4), the peak value of the input current varies and the output voltage increases or decreases. As a result, the resultant power supply apparatus can adjust its output voltage. As shown in FIG. 44, for the purpose of reducing ripples in the output voltage on the order of its commercial frequencies, the energy stored in the power storage capacitor C3 is used to replenish the load circuit with respect to energy. The adjustment of this energy amount is controllably carried out by detecting the output voltage Vout, comparing it with a reference voltage to determine the ON time of the switching element SW4 and then keeping the output voltage constant through the ON and OFF operations of the switching element SW3.

As has been mentioned above, the A.C. power source AC is connected with the full-wave rectifier DB which in turn is connected at its output ends with the switching element SW1, capacitor C1 and the parallel circuit of the smoothing capacitor C2 and load R. Connected in parallel to the capacitor C1 is the control means including the inductor L1, switching elements SW2, SW3 and SW4, diodes D1 to D5, and power storage capacitor C3. When the voltages across the capacitor C1 is controlled by the control means, the suppression of the input harmonics distortion, the adjustment of the input current value and the adjustment of the output voltage can be attained. Further, the switching element SW4 can reduce ripples in the output voltage on the order of the commercial frequencies. Furthermore, when the operational frequency is set high, the respective capacitors, inductors and switching elements can be made small. Thus there can be provided a small-sized power supply apparatus which can generate a desired constant voltage.

EMBODIMENT 22

Figure 47:
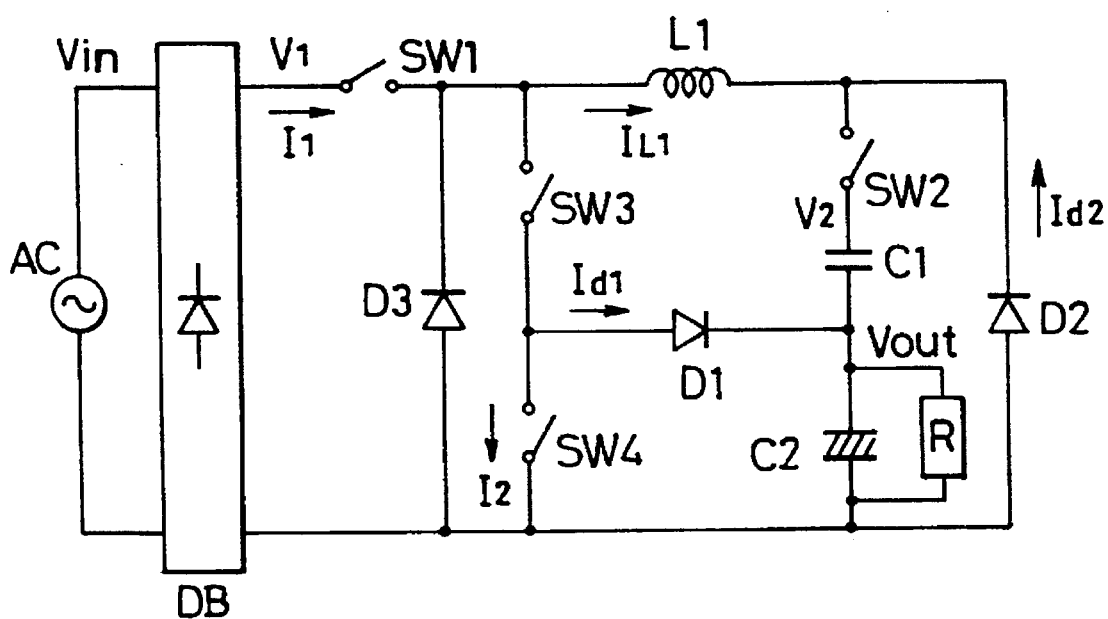
FIG. 47 is a circuit diagram of a twenty-second embodiment in accordance with the present invention.
Figure 48:
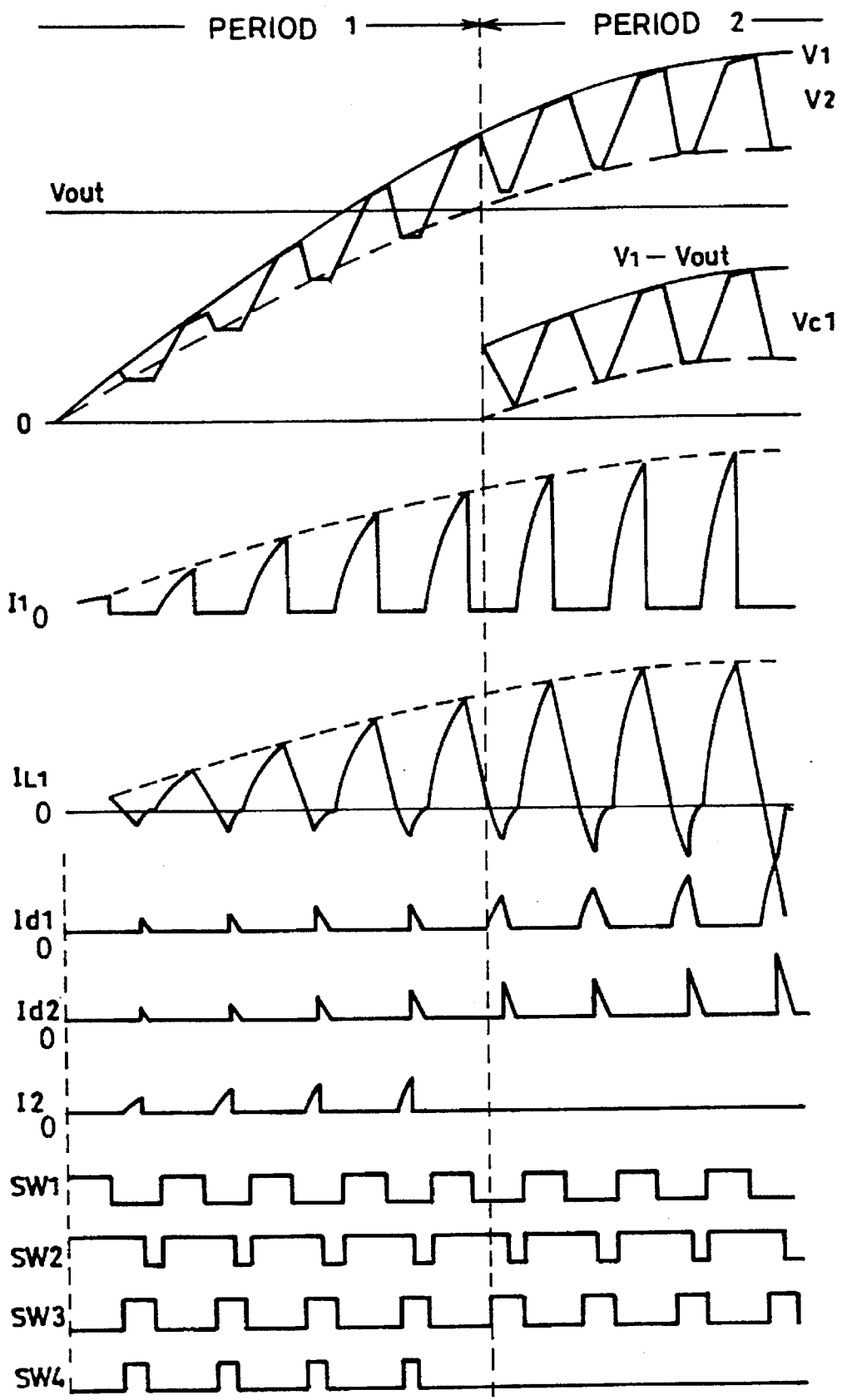
FIG. 48 shows waveforms of signals appearing at points in a twenty-second embodiment of FIG. 47 of the present invention.

A circuit diagram of a twenty-second embodiment of the present invention is shown in FIG. 47 and waveforms of signals in the present embodiment are shown in FIG. 48. In the present embodiment, the A.C. power source AC is connected with the full-wave rectifier DB which in turn is connected at its output ends with the switching element SW1 and diode D3 in series. Connected across the diode D3 is the inductor L1, switching element SW2, capacitor C1, and a parallel circuit of the smoothing capacitor C2 and load R in series. A control means for adjusting the voltage across the capacitor C1 is provided. The control means comprises the inductor L1, switching elements SW3 and SW4, diodes D1 and D2. Connected across the diode D3 is a series circuit of the switching elements SW3 and SW4. Connected between a junction point of the switching elements SW3 and SW4 and a junction point of the capacitor C1 and smoothing capacitor C2 is the diode D1. Connected across the diode D2 is the switching element SW2, capacitor C1 and a parallel circuit of the smoothing capacitor C2 and load R.

Explanation will be made as to the operation of the present embodiment below. The voltage Vin applied from the A.C. power source AC is first rectified at the full-wave rectifier DB and then output therefrom as the pulsative voltage V1. When the switching element SW1 is turned ON in response to a control signal received from the control circuit and substantially at the same when the switching element SW2 is turned ON, the resonance of the inductor L1, capacitor C1 and smoothing capacitor C2 causes the capacitor C1 and smoothing capacitor C2 to be charged.

Figure 49:
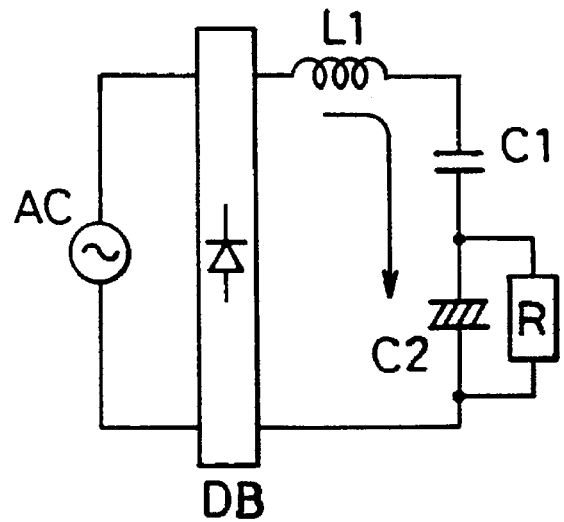
FIG. 49 is an equivalent circuit showing a first state of the twenty-second embodiment of FIG. 47 of the invention.
Figure 50A:
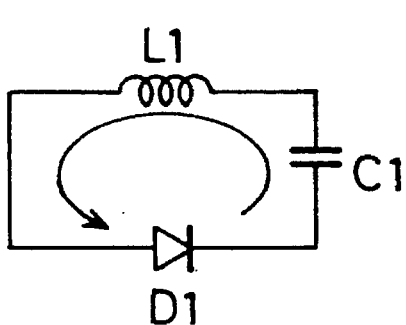
FIG. 50 is an equivalent circuit showing a second state of the twenty-second embodiment of FIG. 47 of the invention.
Figure 50B:
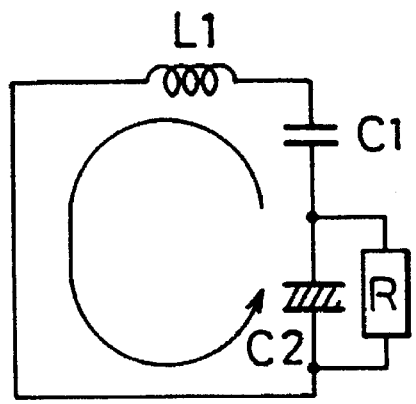
Figure 51:
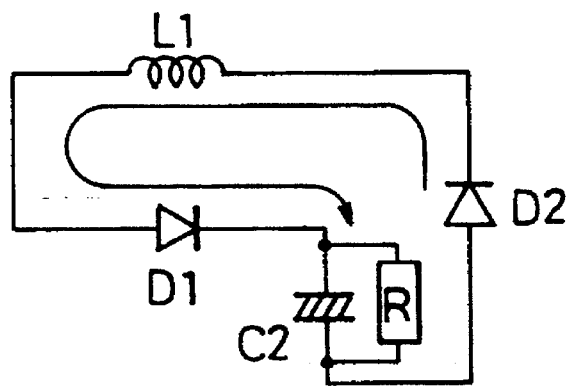
FIG. 51 is an equivalent circuit showing a third state of the twenty-second embodiment of FIG. 47 of the invention.

Which operation will be referred to as state 1 and which equivalent circuit is shown by FIG. 49. When the switching element SW1 is turned OFF, the diode D3 is turned ON so that the energy stored in the inductor L1 charges the capacitor C1 and smoothing capacitor C2 through the switching element SW2. The operation of the present embodiment after the current flowing through the inductor L1 will then explained. In a mountain part of the input pulsative voltage V1 in which the voltage V1 is higher than the output voltage Vout, the switching element SW3, in addition to the switching element SW2, is turned ON. This causes the capacitor C1 to be connected to the inductor L1 in series so that part of the energy of the capacitor C1 is moved to the inductor L1 and then stored therein as the magnetic energy, which operation will be referred to as state 2A and which equivalent circuit is shown in FIG. 50A. In a valley part of the input pulsative voltage V1 in which the voltage V1 is lower than the output voltage Vout, the switching elements SW3 and SW4, in addition to the switching element SW2, are turned ON. This causes the capacitor C1 to be connected with the power storage capacitor C2 and inductor L1, so that the energy of the power storage capacitor C2 is partly moved to the inductor L1 and then stored therein as the magnetic energy, while charging the capacitor C1. Which operation will be referred to as state 2B and which equivalent circuit is shown in FIG. 50B. The energy temporarily stored in the inductor L1 through the above process is all sent to the load circuit through the diode D1 as soon as the switching element SW2 (and SW4) is turned OFF to turn ON the diode D2. Which operation will be referred to as state 3 and which equivalent circuit is shown in FIG. 51. The excessive energy stored in this way in the capacitor C1 is sent to the load circuit through the inductor L1 to effectively adjust the voltage across the capacitor C1. The repetition of the above operation causes gradual increase of the voltage across the smoothing capacitor C2. The capacitor C1 acts to memorize or store therein a voltage corresponding to a difference between the input pulsative voltage V1 and output voltage Vout so that, when the switching elements SW1 and SW2 are both in their ON state, the input pulsative voltage V1 is connected in series with the capacitor C1 to supply a constant voltage to the load circuit. Further, the ON time of the switching elements SW2 and SW3 (and SW4) is controlled so that the voltage V2 corresponding to a sum of the voltages across the capacitor C1 and smoothing capacitor C2 immediately prior to the turning ON of the switching elements SW1 and SW2 becomes similar in waveform to the full-wave-rectified output V1 to make constant the ON time of the switching elements SW1 and SW2, whereby the envelope line of the input current waveform is made similar to the input voltage waveform. The current waveform (FIG. 48) based on such control and resonance enables the suppression of the input harmonics distortion and also enables the envelope line of the input current waveform to be made small. When this similitude ratio is changed by adjusting the ON time of the switching elements SW2 and SW3 (and SW4), the peak value of the input current varies and the output voltage increases or decreases. As a result, the resultant power supply apparatus can adjust its output voltage.

As has been mentioned above, the A.C. power source AC is connected with the full-wave rectifier DB which in turn is connected at its output ends with the series circuit of the switching element SW1 and diode D3. Connected across the diode D3 are the series circuit of the inductor L1, switching element SW2 and capacitor C1 and the parallel circuit of the smoothing capacitor C2 and load 2. Further, the control means is provided which includes the switching elements SW3 and SW4 and diodes D1 and D2. When the voltages across the capacitor C1 is controlled by the control means, the suppression of the input harmonics distortion, the adjustment of the input current value and the adjustment of the output voltage can be attained. Further, when the operational frequency is set high, the respective capacitors, inductors and switching elements can be made small. Thus there can be provided a small-sized power supply apparatus which can generate a desired constant voltage.

Figure 52:
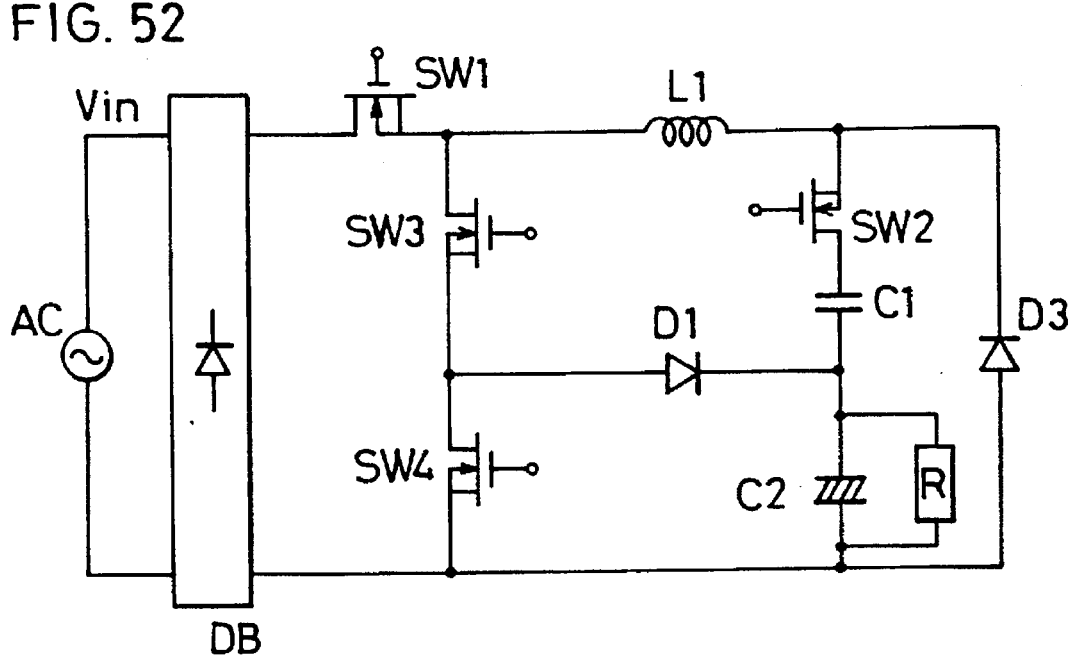
FIG. 52 is a detailed circuit diagram of the twenty-second embodiment of FIG. 47 of the invention.

Next shown in FIG. 52 is a circuit diagram of a suitable modification of the present embodiment. In the circuit of FIG. 52, more specifically, the switching elements SW1 to SW4 all comprise NMOSFETs, the NMOSFET of the switching element SW1 is connected at its drain side with the full-wave rectifier DB, the NMOSFET of the switching element SW2 is connected at its drain side with the capacitor C1, the NMOSFET of the switching element SW3 is connected at its drain side with the inductor L1, and the NMOSFET of the switching element SW4 is connected at its drain side with the switching element SW3. Such arrangement enables elimination of the need for provision of the diode D3 in FIG. 47. Further, due to a parasitic diode around the switching element SW2 of the NMOSFET, the ON time of the switching element SW2 shown in FIG. 48 can satisfy the circuit operation of FIGS. 49 to 51, when the ON time lasts only during the ON state of both of the switching element SW2 shown in FIG. 47 and switching element SW3 shown in FIG. 47. In other words, it is required that the switching element SW2 remain in its ON state during a time period from the turning ON of the switching element SW1 to the turning ON of the switching element SW3 (or substantially with the turning ON of the switching element SW3).

EMBODIMENT 23

Figure 53:
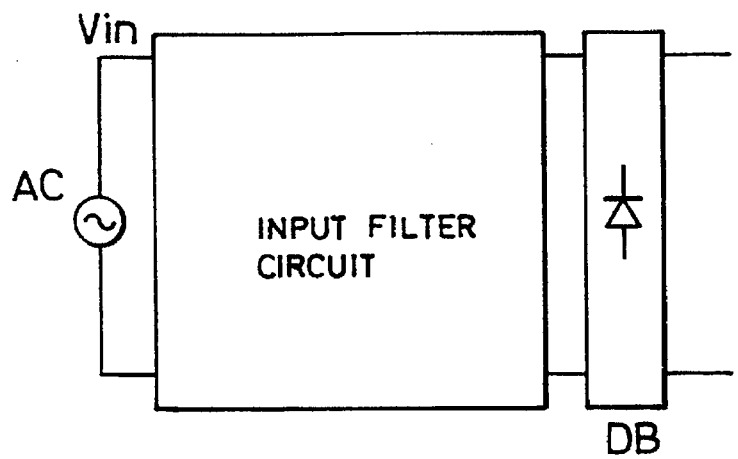
FIG. 53 is a circuit diagram of a twenty-third embodiment in accordance with the present invention.
Figure 54:
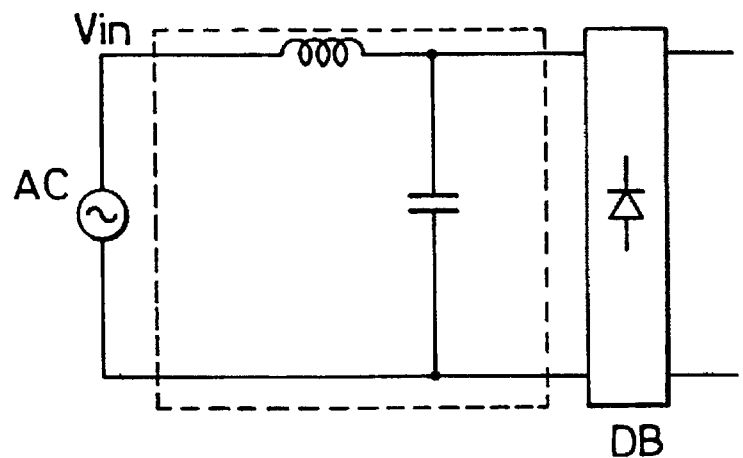
FIG. 54 is a detailed circuit diagram of the twenty-third embodiment of FIG. 53 of the invention.

FIG. 53 shows a circuit diagram of a twenty-third embodiment of the present embodiment. In the present embodiment, provision of an input filter circuit between the A.C. power source AC and the full-wave rectifier DB enables prevention of noise based on the power source and also enables the prevention of external transmission of nose issued from the switching elements of the power converter part. An example of this input filter circuit is shown in FIG. 54 in which a single inductor and a single capacitor are used. Through the input filter circuit, the input current waveform can approach the input voltage waveform and further the input harmonics distortion can be suppressed.

It will be readily appreciated that the ON and OFF control of the switching elements can be implemented as necessary by such a controller as shown in the embodiment 1 of FIG. 1 in the foregoing embodiments 2 to 23. The control circuit CON per se can have a general switching control arrangement.

What is claimed is:

1. A power supply apparatus comprising:
    a full-wave rectifier connected to an A.C. power source;
    a first switching element and first energy storage means are connected between output ends of said full-wave rectifier;
    a load circuit as a parallel circuit of a load and voltage stabilization means is connected to the output ends of the full-wave rectifier through said first switching element and said energy storage means; and
    control means for adjusting a voltage across the first energy storage means, wherein said control means controllably adjusts a voltage across the first energy storage means to cause a sum of the voltage across the first energy storage means and a voltage across said voltage stabilization means to be proportional to an input voltage, to cause the first energy storage means to hold thereacross a voltage corresponding to a difference between the input voltage and output voltage, whereby a desired constant voltage is applied to said load and an envelope line of an input current is proportional to the input voltage.

2. A power supply apparatus as set forth in claim 1, wherein said control means includes an inductor.

3. A power supply apparatus as set forth in claim 2, wherein said first energy storage means is a first capacitor, said voltage stabilization means is a smoothing capacitor, said control means includes an inductor connected at its one end with one end of said first capacitor through a second switching element and connected at the other end with an anode end of a first diode, said first diode being connected at its cathode end with the other end of the first capacitor, said first capacitor being connected at the other end with one end of the smoothing capacitor, includes a second diode connected at its anode end to the other end of the smoothing capacitor and connected at its cathode end with one end of said inductor, and also includes a third switching element connected between the other end of the smoothing capacitor and the other end of the inductor, said control means being controlled to cause the first capacitor to be connected a series circuit of the inductor and first diode through the second switching element to thereby temporarily store energy in the inductor while adjusting a voltage across the first capacitor when the input voltage is higher than a set output voltage, to cause the smoothing capacitor to be connected to the first capacitor through the second switching element, inductor and third switching element to charge the first capacitor and adjust the voltage thereacross to thereby store energy in the inductor when the input voltage is lower than the set output voltage, and when the voltage adjustment of the first capacitor is completed to cause the second switching element to be turned OFF and at the same time, the energy stored in the inductor to be sent to said load circuit through the first and second diodes.

4. A power supply apparatus as set forth in claim 2, wherein said first energy storage means is a first capacitor, said voltage stabilization means is a second capacitor, said control means includes an inductor connected at its one end with one end of said first capacitor through a second switching element and connected at the other end with an anode end of a first diode, said first diode being connected at its cathode end with the other end of the first capacitor through a third switching element, said first capacitor being connected at the other end with one end of the second capacitor, includes a second diode connected at its anode end with the other end of the second capacitor and also connected at its cathode end with one end of said inductor, and also includes a fourth switching element connected between the other end of the second capacitor and the other end of the inductor, said power storage capacitor being connected between a junction point of the first diode and third switching element and the other end of the second capacitor, said control means being controlled to cause the first capacitor to be connected to a series circuit of the inductor, first diode and third switching element through the second switching element in series to thereby temporarily store energy in the inductor while adjusting a voltage across the first capacitor when the input voltage is higher than a set output voltage, to cause the first capacitor to be connected to the second capacitor in series through the second switching element, inductor and fourth switching element to charge the first capacitor and adjust the voltage thereacross to thereby store energy in the inductor when the input voltage is lower than the set output voltage, and when the voltage adjustment of the first capacitor is completed to cause the second switching element to be turned OFF and at the same time, the energy stored in the inductor to be sent to the power storage capacitor through the first and second diodes, and replenish energy from the power storage capacitor to said load circuit to keep a load voltage constant by the third switching elements.

5. A power supply apparatus as set forth in claim 1, wherein said voltage stabilization means is a power storage capacitor, said load circuit is a parallel circuit of said smoothing capacitor and a load is connected in parallel to the power storage capacitor through a switching element, and further comprising means for adjusting an amount of energy to be supplied to the load from the power storage capacitor to keep a voltage across the load constant by the switching element.

6. A power supply apparatus as set forth in claim 1, wherein said control means connects between the output ends of said full-wave rectifier a plurality of circuits including a plurality of series circuits, each having the load circuit of the voltage stabilization means connected in parallel to the load and having a series circuit of the first energy storage means and first switching element to supply power to a plurality of the loads, voltages across said each energy storage means being adjusted on a time division basis to provide desired output voltages to the loads.

7. A power supply apparatus as set forth in claim 6, wherein one of said plurality of circuits including a plurality of series circuits, each having the load circuit of the voltage stabilization means connected in parallel to the load and having a series circuit of the first energy storage means and first switching element, is selected based on the input voltage and then is charged to reduce the voltage across the energy storage means.

8. A power supply apparatus as set forth in claim 6, wherein one of said plurality of series circuits each of which has a series circuit of the first energy storage means, and first switching element and the load circuit of the voltage stabilization means connected in parallel to the load, and which voltage appearing between its both ends is closer to the input voltage, is sequentially charged according to variation in the input voltage on a time division basis.

9. A power supply apparatus as set forth in claim 6, wherein power is supplied to a plurality of loads having desired voltages through one of the energy storage means.

10. A power supply apparatus as set forth in claim 1, wherein a plurality of parallel circuits each having the first switching element connected in series with the first energy storage means are connected to a single load circuit of the voltage stabilization means connected in parallel to the load to adjust voltages across said plurality of first energy storage means on a time division basis.

11. A power supply apparatus as set forth in claim 1, wherein a plurality of series circuits each having the first switching element connected in series with the first energy storage means are connected to a single load circuit of the voltage stabilization means connected in parallel to the load to adjust voltages across said plurality of first energy storage means on a time division basis.

12. A power supply apparatus as set forth in claim 1, wherein an inductor is inserted between the first switching element and first energy storage means, and a diode is provided as means for discharging the energy stored in said inductor until the operation of the first switching element is completed and after completion of the operation of the first switching element to further supply energy to the first energy storage means and load circuit.

13. A power supply apparatus as set forth in claim 1, wherein an inductor is inserted between the first energy storage means and the load circuit of the voltage stabilization means connected in parallel to the load, and a diode is provided as means for discharging the energy stored in said inductor until the operation of the first switching element is completed and after completion of the operation of the first switching element to further supply energy to the load circuit.

14. A power supply apparatus as set forth in claim 12, wherein a second diode is connected in parallel to a series circuit of the inductor and first energy storage means through the second switching element in energy discharge direction of the inductor to drive the second switching element at the time of discharging the energy stored in the inductor to supply the energy to the first energy storage means when the input voltage is higher than the set output voltage.

15. A power supply apparatus as set forth in claim 2, wherein the first energy storage means is the first capacitor, the control means includes the first capacitor connected at its one end to a first output end of the full-wave rectifier through the first switching element, an inductor connected at its one end to one end of the first capacitor through the second switching element, a first diode connected at its anode end to the other end of the inductor and connected at its cathode end to one end of the load circuit of the voltage stabilization means connected in parallel to the load, the load circuit being connected at the other end to a second output end of said full-wave rectifier, a third switching element connected between the other end of the first capacitor and one end of the inductor, a fourth switching element connected between the other end of the inductor and the second output end of the full-wave rectifier, the first capacitor being connected at the other end to a cathode end of a third diode, the load circuit being connected at its one end to an anode end of the third diode, a second diode connected at its cathode end to one end of the inductor, the second diode being connected at its anode end to the second output end of the full-wave rectifier to supply energy remaining in the inductor to the load circuit, said control means connects the inductor and first and third diodes to the first capacitor through the second switching element in series to adjust the voltage across the first capacitor and to temporarily store the energy in the inductor when the input voltage is higher than the set output voltage, connects first capacitor, second switching element, inductor and fourth switching element in series from the voltage stabilization means through the third diode to charge the first capacitor and adjust the voltage thereacross and to store the energy in the inductor when the input voltage is lower than the set output voltage, and supplies the energy stored in the inductor to the load circuit through the first and second diodes as soon as supply of the energy to the inductor is completed.

16. A power supply apparatus as set forth in claim 1, wherein a series circuit of the second switching element and second energy storage means is connected in parallel to a series circuit of the first switching element and first energy storage means, the first and second switching elements are alternately operated to continuously draw the input current to cause an envelope line of the input current to be proportional to the input voltage, voltage adjustment of the first and second energy storage means is alternately carried out with use of the same control means, an output voltage of the full-wave rectifier is connected to the first or second energy storage means in series through the first or second switching element to supply power to the load.

17. A power supply apparatus as set forth in claim 12, wherein a series circuit of the second switching element and second energy storage means is connected in parallel to a series circuit of the first switching element, inductor and first energy storage means, the first and second switching elements are combinedly operated to cause currents flowing therethrough to be combined to cause an envelop line of the input current to be proportional to the input voltage, voltage adjustment of the first and second energy storage means is alternately carried out with use of the same control means, an output voltage of the full-wave rectifier is connected to the first or second energy storage means in series through a series circuit of the first switching element and inductor or through second switching element to supply power to the load.

18. A power supply apparatus as set forth in claim 14, wherein a series circuit of the second switching element and second energy storage means is connected in parallel to a series circuit of the first switching element, inductor and first energy storage means, the first and second switching elements are combinedly operated to cause currents flowing therethrough to be combined to cause an envelop line of the input current to be proportional to the input voltage, voltage adjustment of the first and second energy storage means is alternately carried out with use of the same control means, an output voltage of the full-wave rectifier is connected to the first or second energy storage means in series through a series circuit of the first switching element and inductor or through second switching element to supply power to the load.

19. A power supply apparatus as set forth in claim 12, wherein the first inductor and means for discharging the energy stored in the first inductor are connected between the first switching element and first energy storage means, the second inductor and means for discharging the energy stored in the second inductor are connected between the second switching element and second energy storage means, the first and second switching elements are alternately operated to continuously draw the input current to cause an envelope line of the input current to be proportional to the input voltage, voltage adjustment of the first and second energy storage means is alternately carried out with use of the same control means, an output voltage of the full-wave rectifier is connected to the first or second energy storage means in series through the first switching element and first inductor or through the second switching element and second inductor to supply power to the load.

20. A power supply apparatus as set forth in claim 14, wherein the first inductor and means for discharging the energy stored in the first inductor are connected between the first switching element and first energy storage means, the second inductor and means for discharging the energy stored in the second inductor are connected between the second switching element and second energy storage means, the first and second switching elements are alternately operated to continuously draw the input current to cause an envelope line of the input current to be proportional to the input voltage, voltage adjustment of the first and second energy storage means is alternately carried out with use of the same control means, an output voltage of the full-wave rectifier is connected to the first or second energy storage means in series through the first switching element and first inductor or through the second switching element and second inductor to supply power to the load.

21. A power supply apparatus as set forth in claim 1, wherein the control means is provided so that an inductor is connected to a plurality of power supplies or a plurality of energy storage means through the switching elements, the energy storage means having a polarity opposite to a direction of a current flowing through the inductor is connected to the inductor when the switching elements are operated to transmit energy to the inductor simultaneously with completion of operation of the switching elements to limit the current flowing through the inductor and to charge the energy storage means.

22. A power supply apparatus as set forth in claim 3, wherein, prior to turning OFF of the second switching element, the third switching element is turned OFF while the second switching element is kept in its operation to terminate charging from the smoothing capacitor to the first capacitor and to cause the energy stored in the inductor to charge the first capacitor through the first diode.

23. A power supply apparatus as set forth in claim 1, wherein the first energy storage means is the first capacitor, the voltage stabilization means is the second capacitor, the control means includes an inductor connected at its one end to one end of the first capacitor and connected at the other end to an anode end of a first diode, the first diode being connected at its cathode end to the other end of the first capacitor through the second switching element, the first capacitor being connected at the other end to one end of the second capacitor, the inductor being connected at the other end to an anode end of a third diode, said third diode being connected at its cathode end to the other end of the first capacitor through a fourth switching element, the second capacitor being connected at the other end to an anode end of the second diode, the second diode being connected at its cathode end to an anode end of a fifth diode, said fifth diode being connected at its cathode end to one end of the second capacitor, a power storage capacitor being connected between the cathode end of the second diode and the cathode end of the third diode, a fourth diode being connected at its anode end to the anode end of the third diode, said fourth diode being connected at its cathode end to the cathode end of the second diode through a third switching element, said control means connects the first capacitor, inductor and first diode through the second switching element in series to temporarily store the energy in the inductor while adjusting the voltage across the first capacitor when the input voltage is higher than the set output voltage, connects the first capacitor, inductor and fourth diode to the power storage capacitor through the third and fourth switching elements to change the first capacitor and adjust the voltage thereacross and to store the energy in the inductor when the input voltage is lower than the set output voltage, while adjusting the voltage across the first capacitor limits a current flowing through the inductor, and supplies the energy stored in the inductor to the power storage capacitor through the third and fifth diodes and replenish energy from the power storage capacitor and to keep a load voltage constant by the fourth switching element as soon as the second, the third and fourth switching elements are turned OFF.

24. A power supply apparatus as set forth in claim 2, wherein a first energy storage means is a first capacitor, said control means includes said inductor connected at its one end to a first output end of said full-wave rectifier through a first switching element, the inductor being connected at the other end to one end of the first capacitor through a second switching element, the first capacitor being connected at the other end to one end of said load circuit of the voltage stabilization means connected in parallel to the load, the load circuit being connected at the other end to a second output end of the full-wave rectifier, the first capacitor being connected at the other end to a cathode end of a first diode, a junction point of one end of the inductor and the first switching element being connected to an anode end of the first diode through a third switching element, a fourth switching element being connected between the anode end of the first diode and the other end of the load circuit, a second diode being connected between the other end of the inductor and the second output end of the full-wave rectifier to supply energy remaining in the inductor, a third diode being connected between one end of the inductor and the other end of the load circuit, said control means connects the inductor and first diode to the first capacitor through the second and third switching elements in series to temporarily store energy in the inductor while adjusting the voltage across the first capacitor when the input voltage is higher than the set output voltage, connects the first capacitor and inductor to the voltage stabilization means through the second, third and fourth switching elements to store the energy in the inductor while changing the first capacitor and adjusting the voltage thereacross when the input voltage is lower than the set output voltage, and supplies the energy stored in the inductor to the load circuit through the second and first diodes and third switching element as soon as supply of the energy to the inductor is completed.

25. A power supply apparatus as set forth in claim 24, wherein said first to fourth switching elements are MOSFETs each having a parasitic diode and the third diode is replaced by said parasitic diode of the MOSFET.

26. A power supply apparatus as set forth in claim 1, wherein an input low-pass filter including at least one inductor and one capacitor is provided between the input power source and each constituent element.

* * * * *